United States Patent [19]
Akiyama et al.

[11] Patent Number: 5,982,120
[45] Date of Patent: *Nov. 9, 1999

[54] LIBRARY APPARATUS HAVING A MOTOR DRIVING CONTROL INCLUDING ABNORMAL MOTOR AND EXCESS CURRENT DETECTING CIRCUITS

[75] Inventors: Yoshiki Akiyama; Katsumi Inazawa; Ryuuichi Miyaguchi; Masahiko Sakaguchi; Tatsuya Ohmido; Hitomi Ono, all of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/854,501

[22] Filed: May 12, 1997

Related U.S. Application Data

[62] Division of application No. 08/460,211, Jun. 2, 1995, Pat. No. 5,767,647, which is a division of application No. 08/060,412, May 11, 1993, Pat. No. 5,511,183.

[51] Int. Cl.$^6$ .................................................. H02K 17/32
[52] U.S. Cl. ........................ 318/434; 388/815; 388/903; 361/31; 361/87
[58] Field of Search .................................. 361/45, 87, 93, 361/23, 31, 33, 44, 71, 75, 72; 318/434, 798, 806, 805, 803, 802, 478; 388/811–824, 903

[56] References Cited

U.S. PATENT DOCUMENTS

| | | | |
|---|---|---|---|
| 4,581,565 | 4/1986 | Van Pelt et al. | 318/294 |
| 4,622,500 | 11/1986 | Budelman, Jr. | 388/811 |
| 4,720,812 | 1/1988 | Kao et al. | 364/900 |
| 4,839,640 | 6/1989 | Ozer et al. | 340/825.31 |
| 4,864,511 | 9/1989 | Moy et al. | 364/478 |
| 4,873,453 | 10/1989 | Schmerda et al. | 307/130 |
| 4,875,000 | 10/1989 | Fry et al. | 318/798 |
| 4,939,652 | 7/1990 | Steiner | 364/424.04 |
| 4,953,054 | 8/1990 | Fetzer et al. | 361/45 |
| 4,994,934 | 2/1991 | Bouhenguel | 361/71 |
| 5,046,029 | 9/1991 | Ikeda | 364/561 |
| 5,089,958 | 2/1992 | Horton et al. | 395/575 |
| 5,095,438 | 3/1992 | Sasaki | 364/431.11 |
| 5,126,896 | 6/1992 | Yamagata | 360/78.04 |
| 5,184,257 | 2/1993 | Koga et al. | 360/77.05 |
| 5,274,584 | 12/1993 | Henderson et al. | 365/64 |
| 5,307,464 | 4/1994 | Akao et al. | 395/325 |
| 5,391,983 | 2/1995 | Lusignan et al. | 324/142 |

FOREIGN PATENT DOCUMENTS

| | | |
|---|---|---|
| 57-55465 | 4/1982 | Japan . |
| 173435 | 3/1989 | Japan . |
| 277921 | 3/1990 | Japan . |
| 442496 | 2/1992 | Japan . |
| 4229451 | 8/1992 | Japan . |
| 6049417 | 3/1995 | Japan . |

*Primary Examiner*—David Martin
*Attorney, Agent, or Firm*—Greer, Burns & Crain Ltd.

[57] ABSTRACT

A library apparatus having a motor driving control circuit including a processor, a motor driver circuit, a relay, a motor abnormal condition detection circuit, a current control circuit, an excess current detection circuit, and an abnormal current monitor circuit. The motor abnormal condition detection circuit is connected to the motor driver circuit, and detects an abnormal condition of at least one of the motor and the motor driver circuit. Upon detecting an abnormal condition, the motor abnormal condition detection circuit outputs a motor abnormal condition detection signal which prompts the current control circuit to regulate the current flowing through the motor driver circuit. If the current control circuit is unsuccessful, the excess current detection circuit outputs an excess current detection signal which triggers the relay to close the power source circuit of the motor driver circuit.

5 Claims, 47 Drawing Sheets

T1 : Excess current detection time
T2 : Relay open time
T3 : Time for which excess current flows

| Hmrfu | Hmrfl | Hmrbu | Hmrbl | Motor driving condition |
|---|---|---|---|---|
| O | 1 | O | O | Under dynamic brake |
| O | O | 1 | 1 | Reverse driving |
| 1 | 1 | O | O | Forward driving |
| O | O | O | O | Coast | ns # LIBRARY APPARATUS HAVING A MOTOR DRIVING CONTROL INCLUDING ABNORMAL MOTOR AND EXCESS CURRENT DETECTING CIRCUITS

This is a divisional of copending application Ser. No. 08/460,211 filed on Jun. 2, 1995, now U.S. Pat. No. 5,767,647, which in turn is a divisional of Ser. No. 08/060,412 filed on May 11, 1993 now issued as U.S. Pat. No. 5,511,183 on Apr. 23, 1996.

BACKGROUND OF THE INVENTION

1. Field of the Invention

This invention relates to an apparatus for controlling a non-volatile memory and applications of the apparatus to electronic computer peripheral equipments.

2. Description of the Related Art

In recent years, as continuous non-stopping operation of an electronic computer system proceeds, it is required for any of peripheral equipments of the electronic computer to be recovered rapidly after the it goes down. Further, as unmanning proceeds, it is required that any of the apparatus be recovered without intervention of a person. For example, in a magnetic tape apparatus or a magnetic disk apparatus, in order to achieve recovery rapidly after an accident of interruption of the power or service interruption occurs, while the apparatus is in an operating condition, data of the status of the apparatus are stored into a non-volatile memory. A NOVRAM (non-volatile S-RAM) is known as a non-volatile memory. When a NOVRAM is used, it is required to execute control of recalling, storage and so forth of data regularly in any condition of turning on of the power, turning off of the power, service interruption or instantaneous interruption of power.

SUMMARY OF THE INVENTION

It is an object of the present invention to provide a non-volatile memory controlling apparatus which is simple in circuit configuration and seldom malfunctions.

It is another object of the present invention to provide an electronic computer peripheral equipment which is suitable for application of a non-volatile memory.

According to an aspect of the present invention, there is provided a control apparatus for a non-volatile memory into which apparatus status data are stored, which comprises a control circuit for controlling the non-volatile memory, voltage monitor means for receiving supply of an arbitrary voltage and for monitoring the voltage to discriminate whether or not it is a lowest voltage necessary for operation of a circuit, and voltage regulation means for receiving supply of another voltage higher than the arbitrary voltage and for generating a voltage equal to the arbitrary voltage from the voltage supplied thereto and supplying the voltage thus generated to the non-volatile memory, the control apparatus executing reading out and writing of the apparatus status data from and into the non-volatile memory upon rise and drop of a power source voltage, respectively, the voltage regulation means supplying to the control circuit a voltage equal to the voltage supplied to the non-volatile memory, the control circuit generating a data reading signal and a data writing signal in response to a control signal from the voltage monitor means upon rise and drop of the power source voltage, respectively, reading out and writing of data from and into the non-volatile memory being controlled by the data reading signal and the data writing signal, respectively, generated by the control circuit.

According to another aspect of the present invention, a non-volatile memory is applied in various forms to electronic computer peripheral equipments.

The above and other objects, features and advantages of the present invention and the manner of realizing them will become more apparent, and the invention itself will best be understood, from a study of the following description and appended claims with reference to the attached drawings showing some preferred embodiments of the invention.

DESCRIPTION OF THE PREFERRED EMBODIMENTS

Figure 1:
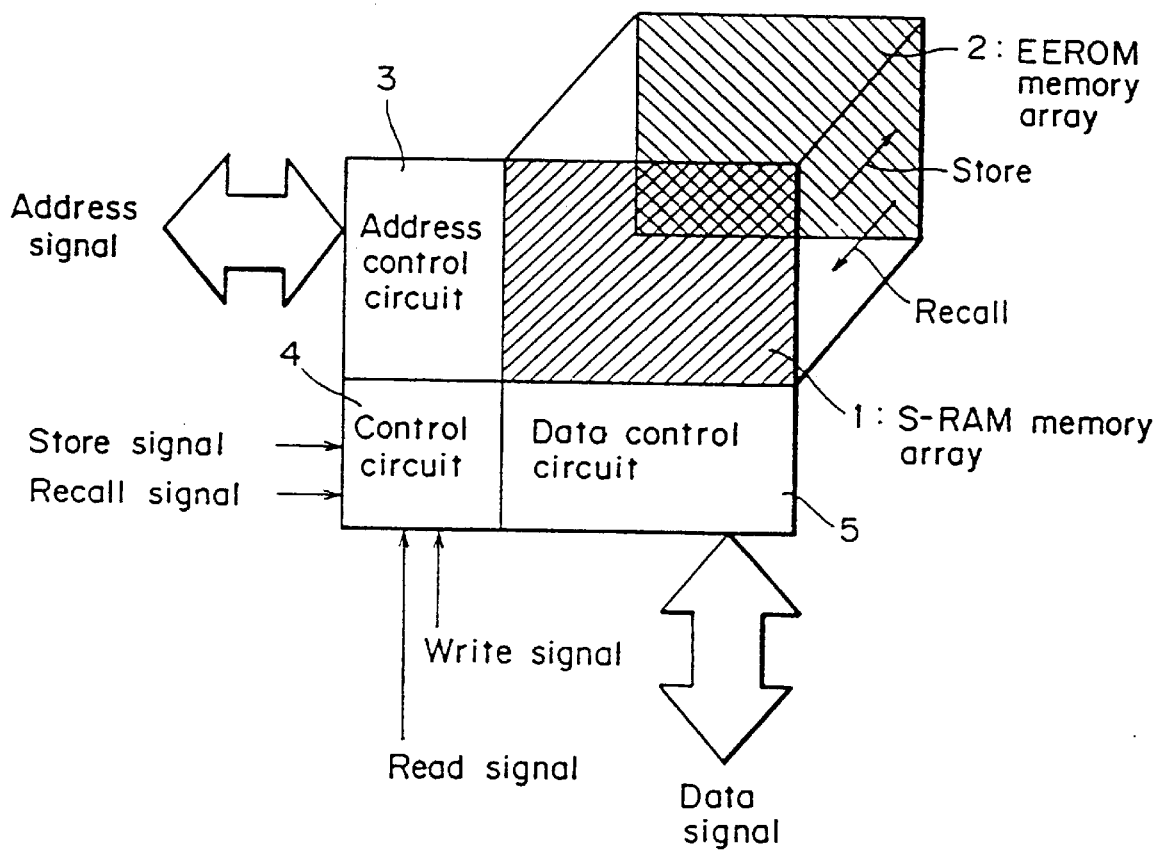
FIG. 1 is a diagrammatic view of a NOVRAM.

First, prior to description of preferred embodiments of the present invention, exemplary ones of conventional non-volatile memory controlling apparatus and conventional electronic computer peripheral equipments will be described with reference to FIGS. 1 to 5. Referring to FIGS. 1 to 5, reference numeral 1 denotes an S-RAM memory array, 2 an EEROM memory array, 3 an address control circuit, 4 a control circuit, 5 a data control circuit, 7 a magnetic tape apparatus, 8 a control circuit, 9 a NOVRAM, 10 a voltage regulation section, 11 a voltage monitor section, 12 a reset circuit, 13 a clock circuit, 14 a display control circuit, 15 an operation panel, 16 a read/write head, 17 a write control circuit, 18 a ROM, 19 a register, 20 a servo control circuit, 21 a read control circuit, 22 a motor driver circuit, 23 a detection circuit, 24 a motor, 25 a sensor, 26 an interface control circuit, reference characters FF1 and FF2 denote each a flip-flop, reference character OR1 denotes an OR circuit, NOT1 a NOT circuit, and NAND1 a NAND circuit.

Conventionally, in order for a peripheral equipment of an electronic computer to recover quickly when an accident of interruption of the power or service interruption occurs, the peripheral equipment itself must necessarily discriminate the status of the equipment while it remains in an operating condition, and to this end, a non-volatile memory is provided in the peripheral equipment. A NOVRAM (Non-Volatile Static Random Access Memory: non-volatile S-RAM) element is employed as such non-volatile memory for storing data of the status of a peripheral equipment therein.

A NOVRAM element will first be described with reference to FIG. 1. The NOVRAM element shown is constituted from an S-RAM (Static Random Access Memory) memory array 1, an EEROM (Electrically Erasable and Programmable Read Only Memory: EEPROM) memory array 2, an address control circuit 3, a control circuit 4 and a data control circuit 5. The control circuit 4 inputs a write signal and a read signal from the outside and further inputs a store signal and a recall signal and executes various controls in the element. The address control circuit 3 executes control of addresses of the memory arrays while the data control circuit 5 executes read/write control of data from/into the memory arrays. The NOVRAM element of such configuration can store data, which have been written into the S-RAM memory array 1 in response to a data signal and a write signal, instantaneously, into the EEROM memory array 2 in response to a store signal. Further, the NOVRAM element can recall data stored in the EEROM memory array 2 instantaneously into the S-RAM memory array 1 in response to a recall signal. The store signal and the recall signal individually are single pulse signals and can control a storing operation and a recalling operation, respectively, as described above.

Figure 2:
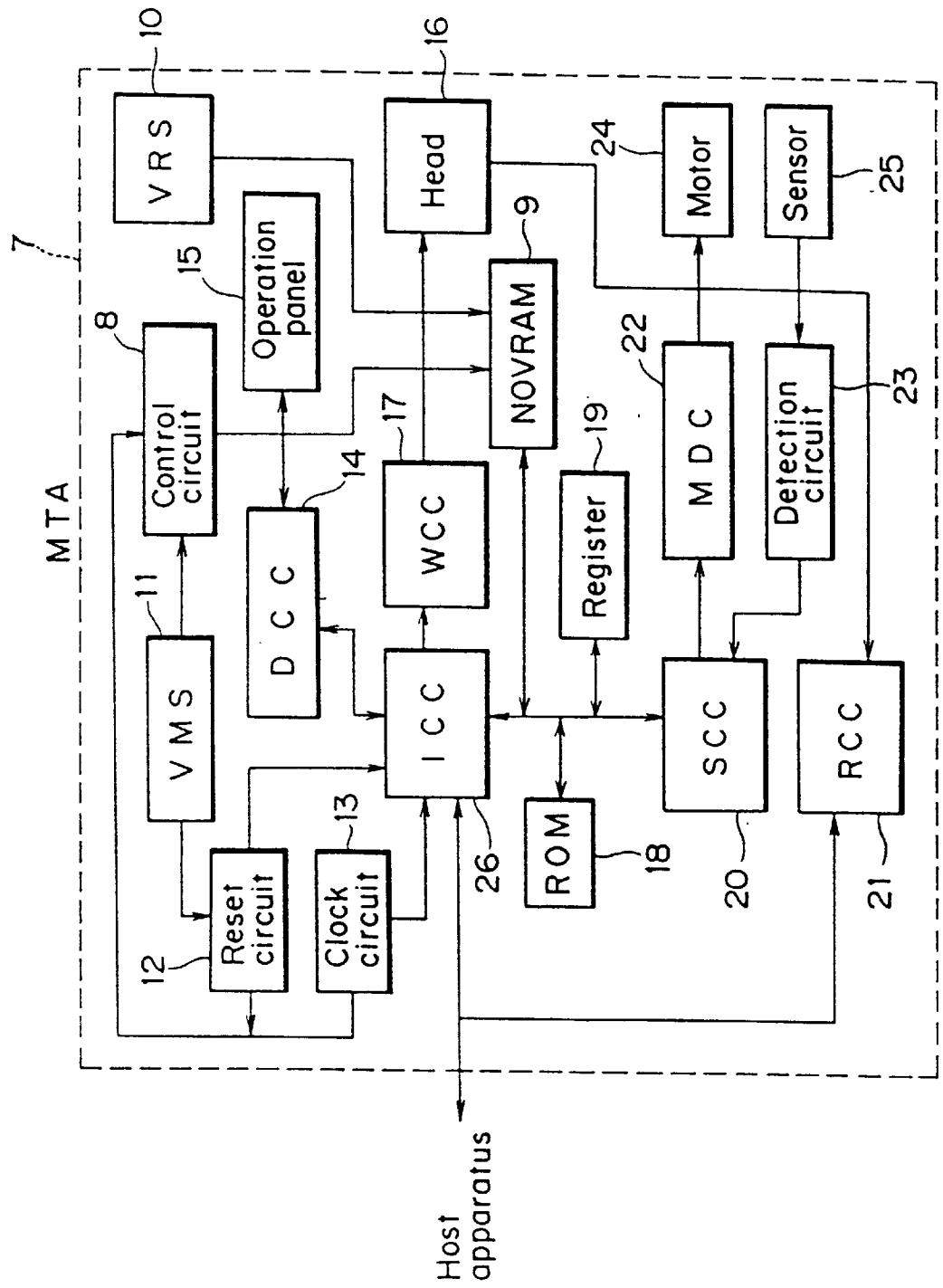
FIG. 2 is a schematic block diagram of a magnetic tape apparatus.

Subsequently, an exemplary one of magnetic tape apparatus in which a NOVRAM is employed will be described with reference to FIG. 2 which is a schematic block diagram of the magnetic tape apparatus. The magnetic tape apparatus shown includes a mechanism section and a control section for the mechanism section. The control section includes an interface control circuit 26, a servo control circuit 20, a write control circuit 17, a read control circuit 21 and a display control circuit 14. The control section further includes, as a countermeasure against an accident of service interruption or the like, such a NOVRAM 9 as described above and peripheral circuits of the NOVRAM 9.

The interface control circuit 26 is connected to a host controller of the magnetic tape apparatus and communicates read/write commands, data and so forth with the host controller. The interface control circuit 26 further communicates data with the servo control circuit 20, the write control circuit 17, the interface control circuit 14 and some other components of the magnetic tape apparatus. The servo control circuit 20 controls driving of a motor 24 of the mechanism section by way of a motor driver circuit 22 in accordance with data from the interface control circuit 26. In this instance, a detection circuit 23 detects a positional relationship of the mechanism section by means of a sensor 25, and the servo control circuit 20 fetches the detection information of the detection circuit 23 and executes servo control in accordance with the detection information. The display control circuit 14 displays data received from the interface control circuit 26 to call an attention of an operator. The read control circuit 21 reads data recorded on a magnetic tape recording medium by way of a head 16. The write control circuit 17 receives data from the interface control circuit 26 and records the received data onto a magnetic tape recording medium by way of the head 16.

Subsequently, the NOVRAM 9 and peripheral circuits of the NOVRAM 9 will be described. The NOVRAM 9 is a memory for storing therein such information including a transport distance of a tape, rewinding of a tape, a connection condition (on-line/off-line) to the host controller and an operation position of the mechanism section, as is necessary to discriminate the status of the magnetic tape apparatus itself. The information is written into and updated in the S-RAM memory array 1 by the interface control circuit 26 and the servo control circuit 20. A voltage control section 11 monitors to discriminate whether or not an arbitrary voltage supplied thereto is higher than a predetermined limit level. A reset circuit section 12 resets the entire control section of the magnetic tape apparatus when it receives from the voltage monitor section 11 a notification indicating that a minimum operation voltage of the circuitry is reached. A clock circuit 13 produces a store signal when the power is interrupted, and generates a system clock signal. A control circuit 8 executes recalling and storing control of data of the NOVRAM 9. It is to be noted that an arbitrary voltage +VccL is supplied from a power source not shown to the voltage monitor section 11, the reset circuit 12 and the control circuit 8. Another voltage +VccH higher than the voltage +VccL is supplied to a voltage regulation section 10, in which a voltage +Vcc equal to the voltage +VccL is produced from the voltage +VccH. The thus produced voltage +Vcc is supplied to the NOVRAM 9. The NOVRAM 9 is a non-volatile memory (non-volatile S-RAM) for storing therein the status of the apparatus when the power is available.

Figure 3:
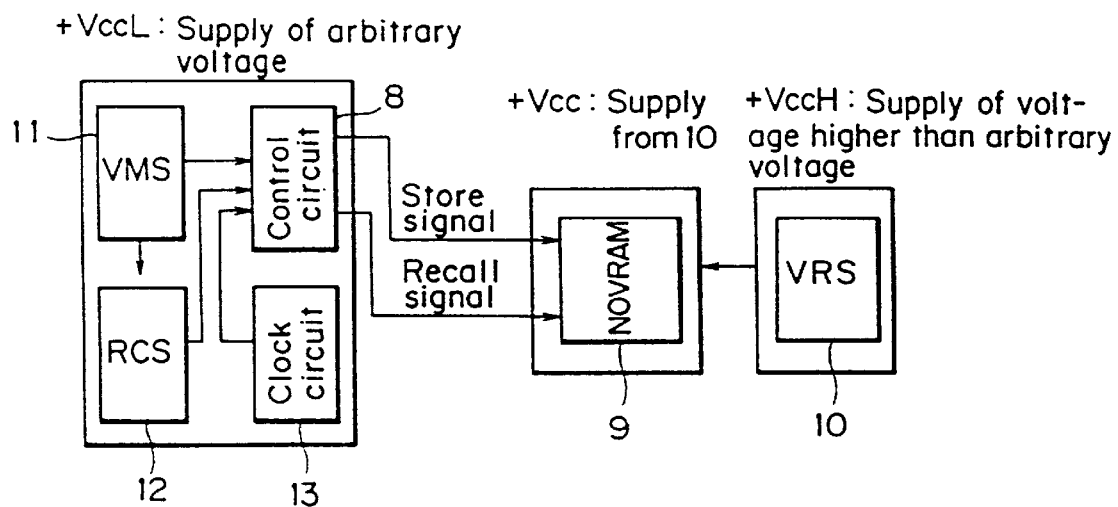
FIG. 3 is a block diagram showing a NOVRAM and peripheral circuits of the NOVRAM.
Figure 4:
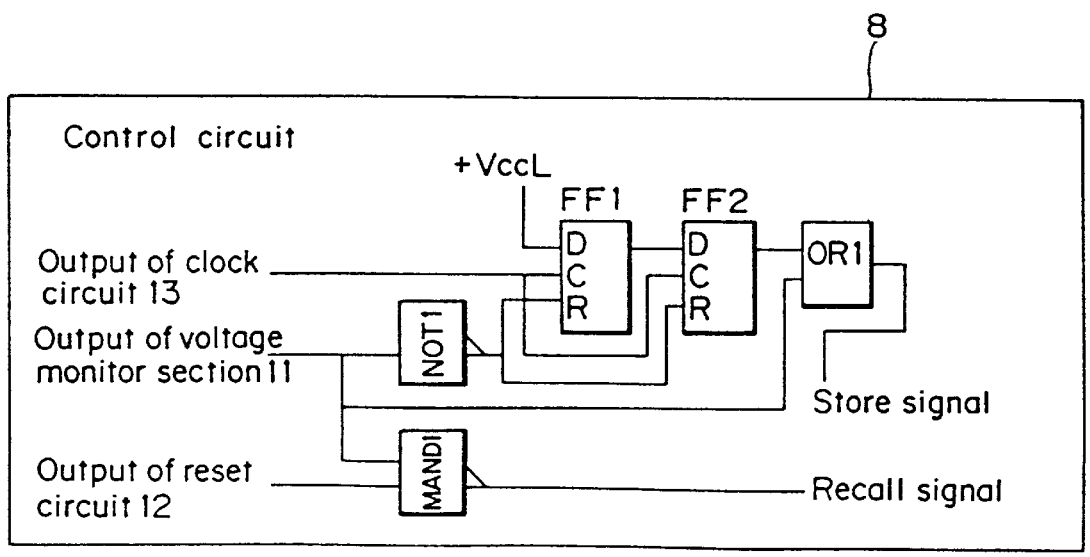
FIG. 4 is a block diagram showing a construction of a control circuit shown in FIG. 3.
Figure 5:
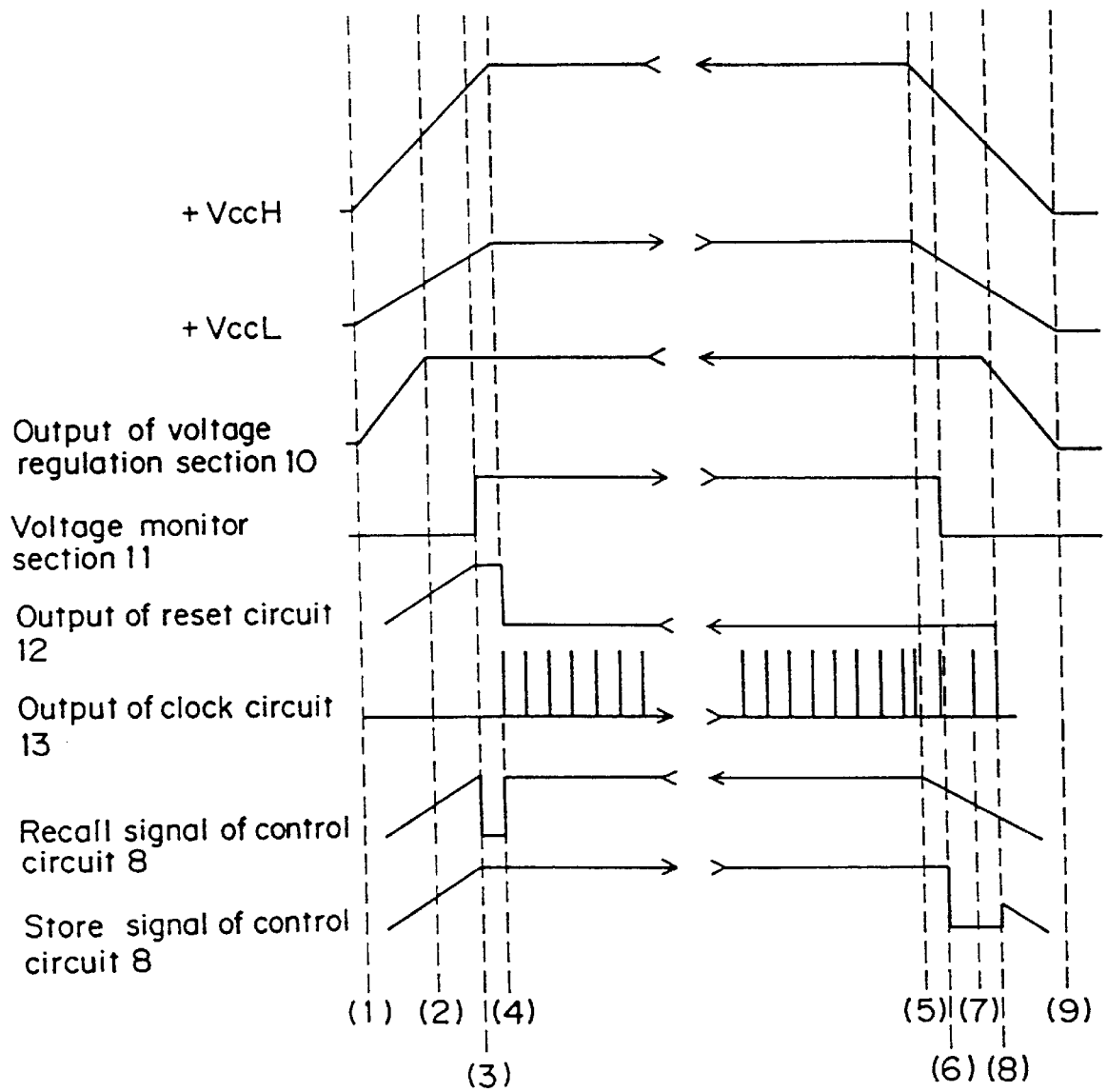
FIG. 5 is a timing chart showing operation of the circuit system shown in FIG. 3.

Subsequently, operation of the NOVRAM 9 and the peripheral circuit of the NOVRAM 9 will be described with reference to FIGS. 3, 4 and 5. The power is turned on at the time (1) in FIG. 5, and then at the time (2) in FIG. 5 which is a time before the minimum operation voltage of the circuitry is reached, the voltage regulation section 10, to which the voltage +VccH higher than the arbitrary voltage +VccL is supplied, supplies a predetermined voltage to the NOVRAM 9 so that the NOVRAM 9 is put into an operative condition. When the minimum operation voltage of the circuitry is reached at the time (3) later than the time (2), the output signal of the voltage monitor section 11 is changed over to an on-state. Consequently, the signal "1" is inputted to a NOT circuit NOT1 in the control circuit 8, and consequently, the NOT circuit NOT1 provides an output "0". As a result, a pair of flip-flops FF1 and FF2 receive "0" at the reset (R) inputs thereof and consequently are reset so that they now output "0". Further, since an OR circuit OR1 thus receives "1" from the voltage monitor section 11 and "0" from the flip-flop FF2, it outputs "1" and maintains it until the power is turned off. Further at the time (3), a NAND circuit NAND1 outputs "0" in response to the signal "1" from the voltage monitor section 11 and the output "1" from the reset circuit 12. The output of the reset circuit 12 changes over from "1" to "0" in response to a first clock after the time (3). Consequently, the input to the NAND circuit NAND1 from the reset circuit 12 changes over from "1" to "0", whereupon the output of the NAND circuit NAND1 changes over from "0" to "1". As a result, a recall signal to the NOVRAM 9 is produced. In response to the recall signal, data of the NOVRAM 9 are read out. From the data thus read out, the apparatus itself discriminates the status of the apparatus at the time when the power has been turned off precedently.

Subsequently, a data storing operation of the NOVRAM 9 will be described. The power is turned off at the time (5) in FIG. 5, and then at the time (6) at which the voltage becomes lower than the minimum operation voltage of the circuitry, the NOVRAM 9 is in an operable condition since the voltage regulation section 10 to which the high voltage +VccH is supplied supplies a voltage to the NOVRAM 9. Further, at the time (6), since the voltage monitor section 11 detects that the voltage is lower than the minimum operation voltage, the output signal of the voltage monitor section 11 is changed over to "0". Consequently, the input to the NOT circuit NOT1 of the control circuit 8 is changed over to "0", and the output of the NOT circuit NOT1 is changed over to "1" so that the flip-flops FF1 and FF2, which have been in their reset condition, are rendered operative. In this instance, the OR circuit OR1 outputs "0" as result of ORing of the output "0" of the flip-flop FF2 and the output "0" of the voltage monitor section 11. Thereafter, at the time (7), the input data to the flip-flop FF1 is changed over to "1" in response to an input of a clock thereto, but the flip-flop FF1 remains outputting "0". In this instance, since the output "0" of the flip-flop FF1 is supplied to the input of the flip-flop FF2, the flipflop FF2 outputs "0" in response to a clock inputted thereto, and consequently, the output of the OR circuit OR1 remains "0". At the time (8) after the time (7), the flip-flop FF1 outputs, in response to a clock inputted thereto, "1" since the input data to the flip-flop FF1 is "1". In this instance, since the output "1" of the flip-flop FF1 is supplied to the input of the flip-flop FF2, the flip-flop FF2 outputs, in response to a clock inputted thereto, "1" since the output "1" of the flip-flop FF1 is supplied to the flip-flop FF2, and the output "1" of the flip-flop FF2 is inputted to the OR circuit OR1 so that the OR circuit OR1 outputs "1". Consequently, a store pulse signal is produced for a period of time from the time (6) to the time (8). As a result of the storing operation described above, under the control of the control circuit 8, data of the S-RAM memory array of the NOVRAM 9 are stored into the EEROM memory array 2, and then the voltage to be supplied to the NOVRAM 9 is held for several milliseconds, whereafter the voltage is reduced to zero volt at the time (9).

The prior art non-volatile memory controlling apparatus and peripheral equipment described above have such subjects to be solved as described below:

a. In peripheral equipments such as a magnetic tape apparatus, in order to achieve recovery rapidly after an accident such as service interruption, a NOVRAM, which is a non-volatile memory, is used, and information of the status of the apparatus is stored into the NOVRAM. In this instance, since the voltage supplied to a control circuit particularly upon data writing operation into the NOVRAM drops momentarily, the circuit becomes unstable in operation so that it may malfunction (refer to the times (6) to (8) in FIG. 5).

b. A clock signal is used in order to write apparatus information and some other information into the NOVRAM or to read out such apparatus information from the NOVRAM. Accordingly, the circuit is complicated.

c. Operation of the apparatus is unstable since information is written into or read out from the NOVRAM while the supply voltage to the control circuit and so forth is in an unstable condition. Accordingly, reading out from or writing into the NOVRAM is not performed normally, and also, the reliability in processing for recovery of the apparatus after an accident such as service interruption is low.

An embodiment of the present invention, which will be described below, is provided in order to solve the subjects of the prior art non-volatile memory controlling apparatus and peripheral equipment described above and to stabilize a storing operation and a recalling operation of data into and from a NOVRAM to eliminate a malfunction while simplifying the circuit configuration.

Figure 6:
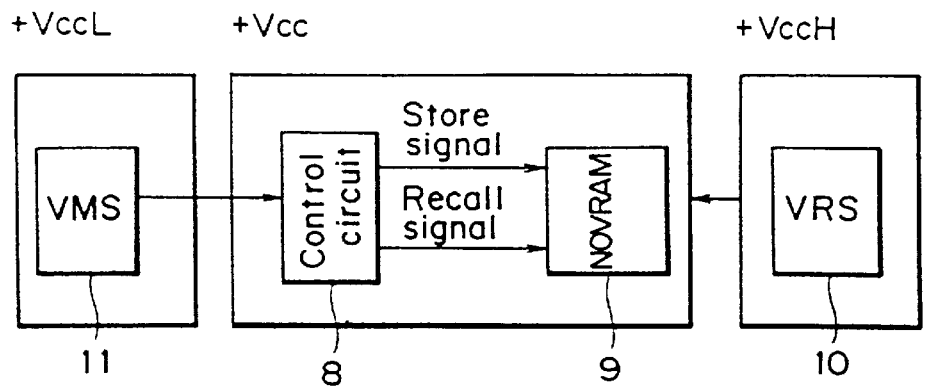
FIG. 6 is a block diagram of a non-volatile memory controlling apparatus of the present invention.
Figure 7:
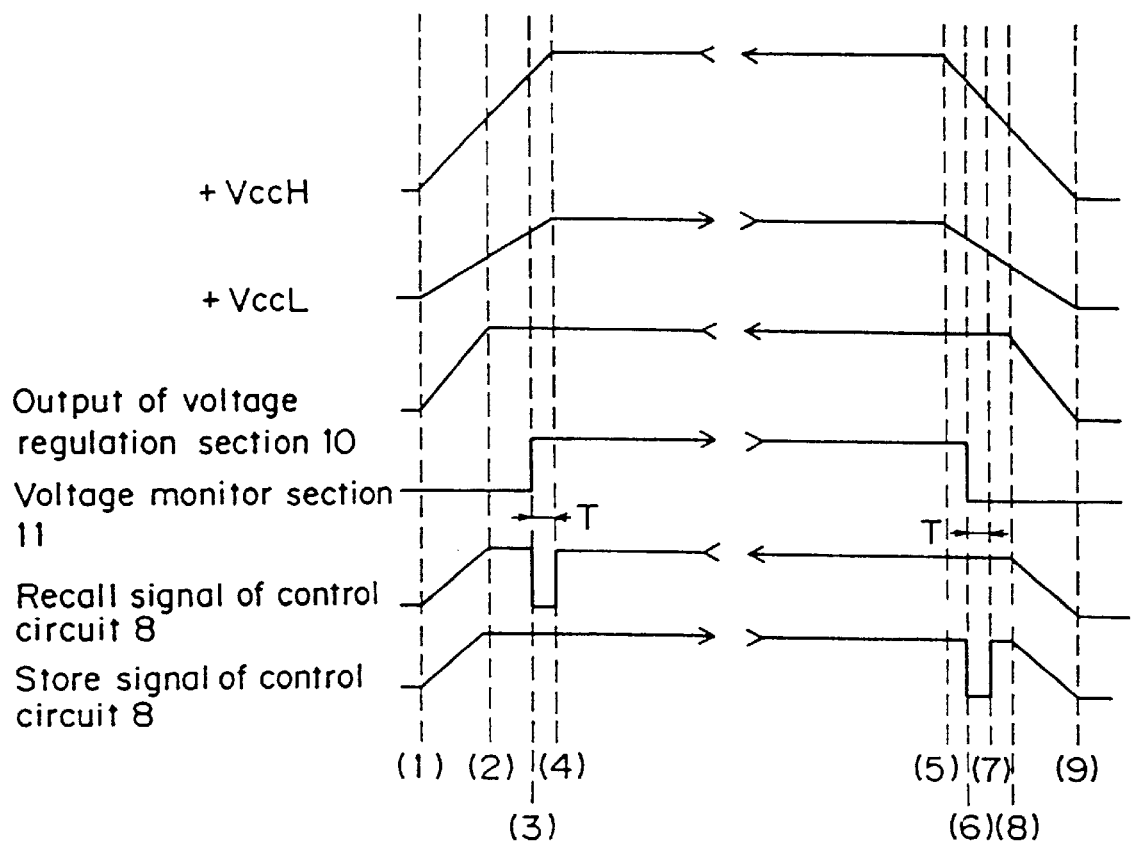
FIG. 7 is a timing chart illustrating operation of the non-volatile memory controlling apparatus shown in FIG. 6.

FIG. 6 is a block diagram of a non-volatile memory controlling apparatus according to the present invention, and FIG. 7 is a timing chart illustrating operation of the non-volatile memory controlling apparatus of FIG. 6. The embodiment of the present invention may have the following various forms in order to solve the subjects described above.

In a first form, components of the non-volatile memory controlling apparatus of FIG. 6 operate in the following manner. Referring to FIGS. 6 and 7, a control circuit 8 controls a non-volatile memory 9. A voltage monitor section 11, to which power of an arbitrary voltage +VccL is supplied, monitors to discriminate whether or not the voltage supplied thereto is equal to or higher than a minimum voltage necessary for operation of the circuitry. A voltage regulation section 10, to which a voltage +VccH higher than the arbitrary voltage +VccL is supplied, generates, from the voltage +VccH, and supplies a voltage +Vcc equal to the arbitrary voltage +VccL to the non-volatile memory 9. The non-volatile memory controlling apparatus performs reading out and writing of data from and into the non-volatile memory 9 when the power source voltage rises and drops, respectively. The power of the voltage +Vcc equal to that to the non-volatile memory 9 is supplied from the voltage regulation section 10 to the control circuit 8. The control circuit 8 can generate a data reading signal and a data writing signal only in response to a control signal from the voltage monitor section 11 when the power source voltage rises and drops, respectively.

Reading out control and writing control of data into and from the non-volatile memory 9 are performed in response to the signals thus generated.

A second form is a modification to and is different from the first form in that the control circuit 8 is modified so that it receives, as an input signal, a control signal outputted from the voltage monitor section 11 and generates a single signal in response to a variation of the input signal.

A third form is a modification to and is different from the first and second forms in that a NOVRAM is employed as the non-volatile memory 9 and the control circuit 8 generates and outputs a recall signal and a stored signal for reading out and writing data from and into the NOVRAM to control reading out and writing of data from and into the NOVRAM, respectively.

Operation of the forms of the non-volatile memory controlling apparatus will be described subsequently with reference to FIGS. 6 and 7. As seen from FIG. 6, the voltage monitor section 11 outputs a signal when the voltage supplied thereto reaches a voltage equal to or higher than a minimum voltage at which the circuitry operates, and it operates when the arbitrary voltage +VccL is supplied thereto. When the voltage +VccH higher than the arbitrary voltage +VccL is supplied to the voltage regulation section 10, the voltage regulation section 10 generates, from the voltage supplied thereto, the voltage +Vcc equal to the arbitrary voltage +VccL and supplies it to the control circuit 8 and the NOVRAM 9 (VccL=Vcc). The NOVRAM 9 is supplied with the power (voltage +Vcc) from the voltage regulation section 10 and stores information of parameters of the status of the apparatus therein. The control circuit 8 controls recalling and storing operations of data from and into the NOVRAM 9 and produces a single signal in response to an output signal of the voltage monitor section 11. The control circuit 8 is supplied with the power of +Vcc from the voltage regulation section 10.

Referring now to FIG. 7, when the power is turned on at the time (1), the arbitrary voltage +VccL supplied to the voltage monitor section 11 and the voltage +VccH higher than the arbitrary voltage supplied to the voltage regulation section 10 rise. Then at the time (2) sufficiently prior to detection of the lower limit voltage by the voltage monitor section 11, a recall signal and a store signal have been settled, and then at the time (3), the recall signal is outputted from the control circuit 8 in response to a variation of the output signal of the voltage monitor section 11. Also upon turning off of the power, similarly the arbitrary voltage +VccL drops at the time (5), and then when the time (6) is reached, the output signal of the voltage monitor section 11 changes. Then, at the time (7) after lapse of an interval of time T, the store signal changes and a pulse is produced. At the time (8) after lapse of a sufficient interval of time after the store signal has been outputted from the control circuit 8, the voltage supplied to the NOVRAM 9 and the control circuit 8 drops until it becomes equal to zero volt at the time (9). According to the operations described above, a storing operation and a recalling operation into and from the NOVRAM can be performed while the voltage of the power source remains stable. Accordingly, no malfunction will occur, and stabilized writing and reading out of apparatus information can be achieved. Further, a clock signal which is required in a conventional non-volatile memory controlling apparatus is unnecessary, and consequently, also the circuit configuration is simplified.

In the following, a more detailed configuration of the embodiment of the present invention will described.

Figure 8:
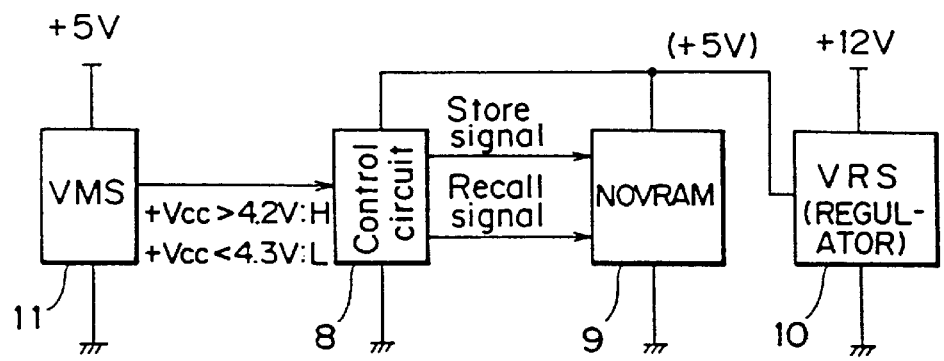
FIG. 8 is a block diagram showing a NOVRAM and peripheral circuits of the NOVRAM in the non-volatile memory controlling apparatus of FIG. 6.
Figure 9:
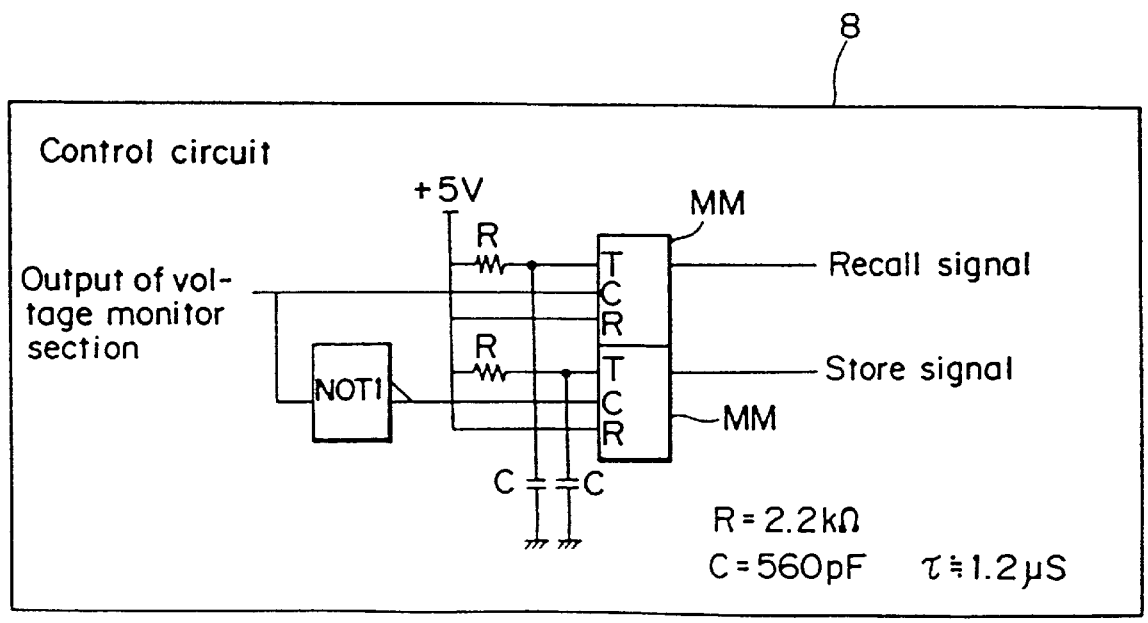
FIG. 9 is a circuit diagram of a control circuit shown in FIG. 8.

FIG. 8 shows a NOVRAM and peripheral circuits of the NOVRAM in the configuration described above, and FIG. 9 shows a more detailed construction of a control circuit for the NOVRAM of FIG. 8. Referring to FIGS. 8 and 9, reference character MM denotes a monostable multivibrator, R a resistor, and C a capacitor. The circuitry shown in FIG. 8 is applied to a magnetic tape apparatus similar to the conventional magnetic tape apparatus shown in FIG. 2, and also the NOVRAM has a similar construction to that of the conventional NOVRAM shown in FIG. 1. The description given hereinabove with reference to FIGS. 1 and 2 is applied also to the present embodiment and detailed description is omitted herein.

A voltage regulation section 10 is connected to a power source of +12 V (+VccH) and regulates the voltage of +12 V to generate and supply a voltage of +5 V (+Vcc) to a control circuit 8 and a NOVRAM 9. The control circuit 8 outputs a single pulse signal in response to a change of an input signal thereto and is constructed, for example, in such a manner as shown in FIG. 9. In particular, referring to FIG. 9, the control circuit 8 is constituted from a pair of monostable multivibrators MM, a NOT circuit NOT1 and some other elements, and outputs a single pulse signal in response to a change of an input signal thereto. A resistor R and a capacitor C are connected to each of the monostable multivibrators MM of the control circuit 8, and the pulse width τ of an output pulse of each of the monostable multivibrators MM is determined from a time constant of the resistor R and the capacitor C. The power of +5 V (+VccL) is supplied to a voltage monitor section 11, and the voltage monitor section 11 normally monitors the input voltage similarly as in the conventional magnetic tape apparatus.

Figure 10:
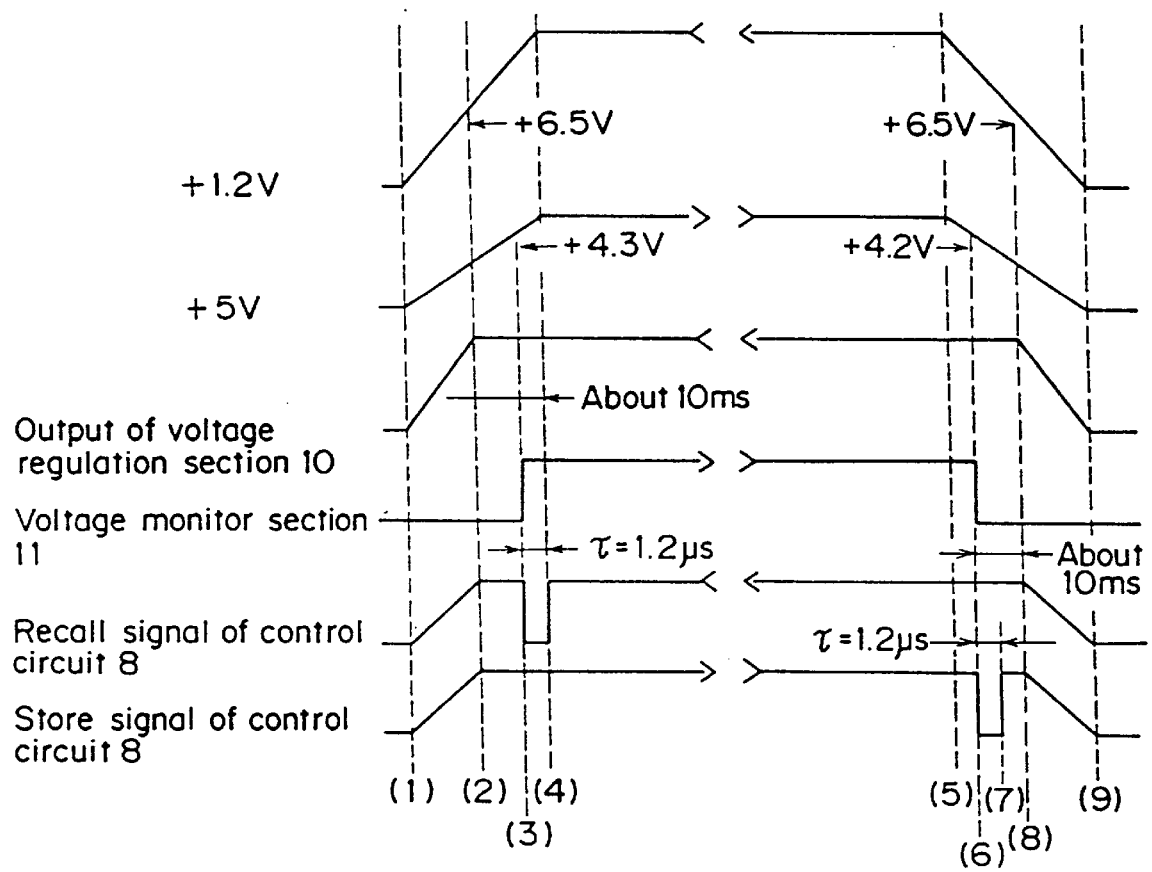
FIG. 10 is a timing chart illustrating operation of the circuitry shown in FIG. 8.

Subsequently, operation of the circuitry shown in FIGS. 8 and 9 will be described with reference to FIG. 10. It is assumed that the power is first turned on at the time (1). Consequently, the power of the voltages of +5 V and +12 V rise successively. In response to such rise, also the output of the voltage regulation section (regulator) 10 and the outputs (recall or store signal) of the monostable multivibrators MM of the control circuit 8 rise. Then at the time (2), the +12 V power reaches about +6.5 V so that the output of the voltage regulation section 10 and the outputs of the monostable multivibrators MM are settled. Thereafter, at the time (3), the +5 V power reaches +4.3 V, and thereupon, the voltage monitor section 11 detects the lower limit operation voltage. In response to a detection signal from the voltage monitor section 11 then, the clock input to the recall signal side monostable multivibrator MM of the control circuit 8 changes from "0" to "1", and a recall pulse is outputted in response to the rising edge of the clock signal. The recall pulse is a pulse outputted with the duration from the time (3) to the time (4) in FIG. 10, and for example, when the resistance of the resistors R is 2.2 kΩ and the capacitance of the capacitors C is 560 pF, the pulse width τ is about τ=1.2 μS. Consequently, data stored in advance are recalled before stabilized conditions of the +5 V and +12 V power supplies are established at the time (4).

Processing upon turning off of the power is such as follows. After the time (5), the +5 V and +12 V power sources drop gradually, and at the time (6) at which the +5 V power supply drops to +4.5 V, the voltage monitor section 11 detects that the voltage supplied thereto have become lower than the lower limit operation voltage. Thereupon, the input to the NOT circuit NOT1 in the control circuit 8 changes from "1" to "0" while the output of the NOT circuit NOT1 changes from "0" to "1". In response to the rising edge of the clock signal, the store signal side monostable multivibrator MM operates to output a store pulse. In this instance, the pulse width τ of the pulse which has the duration from the time (6) to the time (7) is τ=1.2 μS similarly as described above. Meanwhile, the voltage of +5 V is supplied to the NOVRAM 9 and the control circuit 8, and at the time (8) at which the +5 V and +12 V power sources drop lower than +6 V, the +5 V power source begins to drop similarly. Thereafter, at the time (9), the +5 V and +12 V power sources drop to 0 V. Thus, a storing operation of data is performed with certainty for an interval of time from the time (5) to the time (8).

The present invention can be embodied, in addition to the embodiment described above, in the following manner.

1. The present invention can be applied not only to a magnetic tape apparatus, but also to peripheral equipments of an electronic computer such as, for example, a magnetic disk apparatus and an optical disk apparatus.

2. A control circuit for controlling a non-volatile memory need not include a monostable multivibrator but may include any circuit only if it outputs a single signal in response to a change of an input signal.

As described above, according to the embodiment of the present invention, the following advantages can be anticipated:

1. Upon dropping and rising of the voltage when the power is turned off and on, a writing operation and a reading out operation of data into and from a NOVRAM, respectively, are stabilized, and a normal operation is always assured.

2. In any condition of turning on or off of the power, service interruption or instantaneous interruption of the power, recalling or storing control of data can always be performed normally.

3. The apparatus can be recovered rapidly with certainty from an accident of service interruption or the like using data of a NOVRAM.

4. The circuit configuration is simplified.

5. The reliability in data writing and reading out operations of data into and from a NOVRAM of a peripheral equipment such as a magnetic tape apparatus is improved.

Subsequently, a magnetic tape library apparatus to which the present invention is applied will be described. The embodiment of the present invention relates to a magnetic tape library apparatus which includes a cartridge loading/unloading mechanism (CAS) for a cartridge type recording medium, a cartridge storage cell, a magnetic tape apparatus (MTU), an accessor mechanism section, an accessor control section and so forth and automatically performs mounting and dismounting, storage, recording/reproduction and so forth of a cartridge type recording medium. More specifically, the present embodiment relates to a magnetic tape library apparatus which makes it possible to detect an abnormal condition of the apparatus by initial diagnosis processing upon turning on of the power and an abnormal condition detecting method for such magnetic tape library apparatus.

An exemplary one of conventional magnetic tape library apparatus will first be described with reference to FIGS. 11 to 15. Reference numeral 101 denotes a magnetic tape library apparatus, 102 a magnetic tape apparatus (MTU), 103 a magnetic tape controller, 104 a cartridge storage cell, 105 an accessor mechanism section, 106 an accessor power source section, 107 an accessor control section, 108 an accessor controller (ARC), 109 an accessor mechanism controller (AMC), 110 a host apparatus (HOST), 112 a microprocessor (MPU), 113 a program memory section, 114 a communication memory, 115 a non-volatile memory, 116 another microprocessor (MPU), 117 a program memory section, 118 an I/O (input/output) port, 119 a servo control circuit, 120 a motor driver circuit, 122 a cartridge transport section, 123 a base, 124 a cartridge transport mechanism section, 125 a hand mechanism section, 126 a bar code scanner, 127 a tray, 128 a transport motor, 129 an accommodation rack, and 130 a cartridge type recording medium.

Description of the Magnetic Tape Library Apparatus

Figure 11:
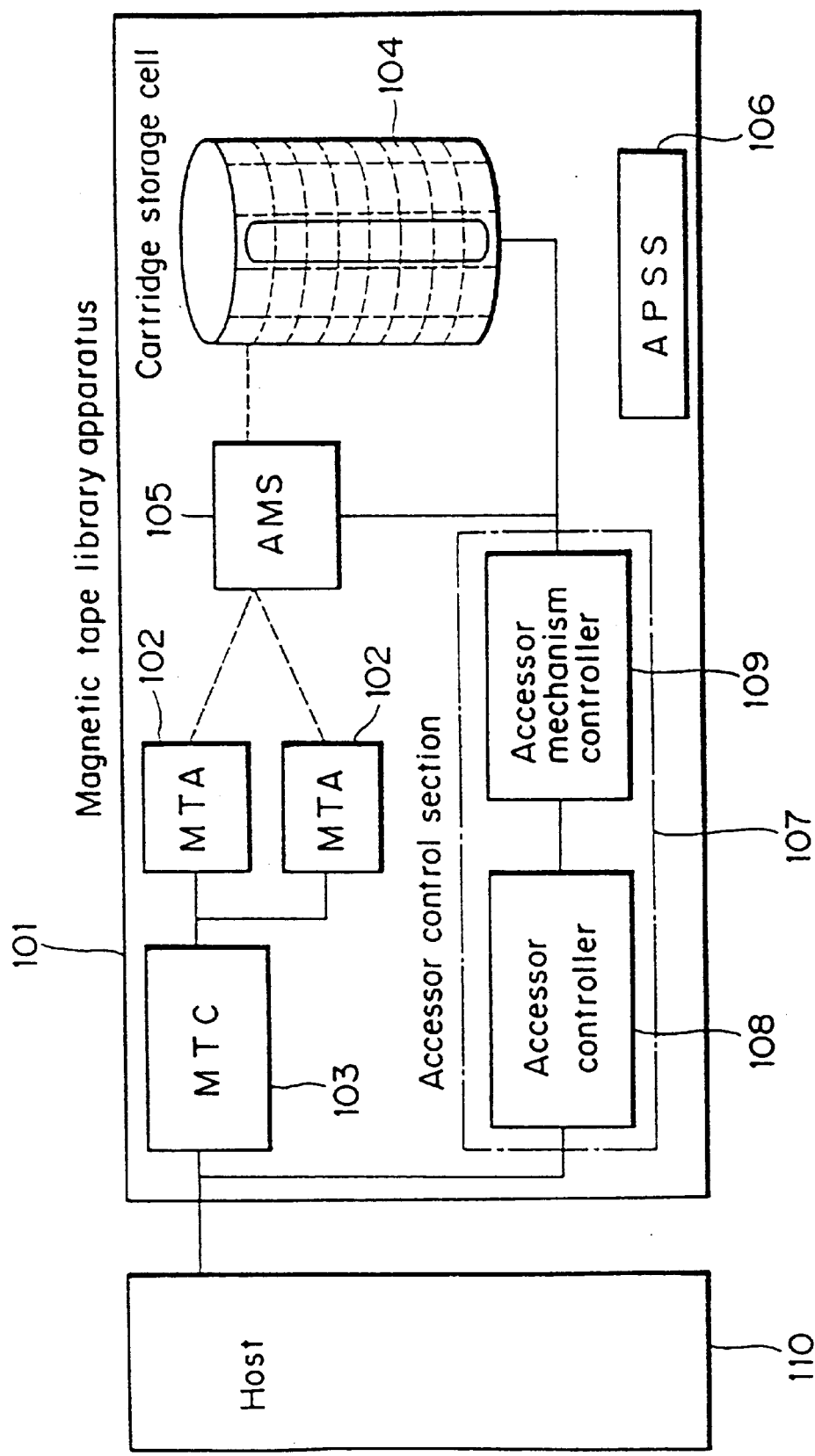
FIG. 11 is a block diagram of a magnetic tape library apparatus.

FIG. 11 is a block diagram of a magnetic tape library apparatus. The magnetic tape library apparatus 101 includes a plurality of magnetic tape apparatus (MTU) 102 for recording and/or reproducing a cartridge type magnetic tape (hereinafter referred to as "cartridge type recording medium" or simply as "cartridge"), a magnetic tape controller 103 for controlling the magnetic tape apparatus 102, a cartridge storage cell 104 for storing a plurality of cartridges therein, an accessor mechanism section 105 for transporting a cartridge, an accessor control section 107 for controlling the accessor mechanism section 105 and so forth, and an accessor power source section 106 for producing a necessary voltage and supplying the power of the necessary voltage to the accessor mechanism section 105, the accessor control section 107 and so forth. The accessor control section 107 includes an accessor controller (ARC) 108, and an accessor mechanism controller (AMC) 109. The accessor controller (ARC) 108 communicates with a host apparatus 110 and controls various components of the magnetic tape library apparatus 101 (for example, control of an accessing position when the host apparatus 110 tries to access a magnetic recording medium). The accessor mechanism controller (AMC) 109 controls the accessor mechanism section 105 in response to an instruction from the accessor controller 108 and controls driving of a sel-motor to rotate the cartridge storage cell 104. It is to be noted that the accessor power source section 106 prepares a power source of the voltage of 24 V and another power source of the voltage of 5 V. Thus, the accessor power source section 106 supplies the power source of the voltage of 24 V to the cartridge storage cell 104 and the accessor mechanism section 105 (mechanical elements such as a motor) while it supplies the power source of the voltage of 5 V (power source for control) to the accessor control section 107.

Description of the Accessor Control Section

Figure 12:
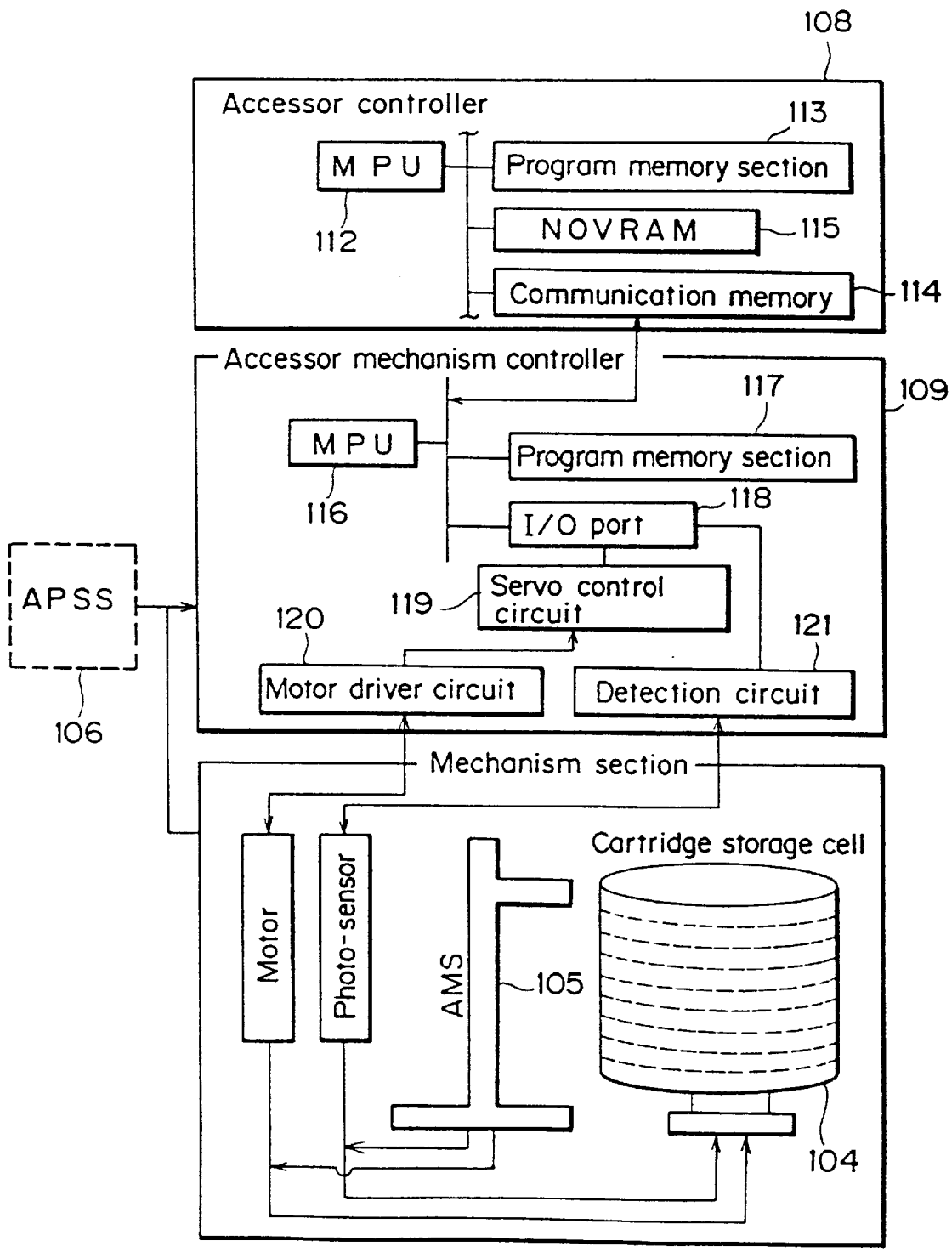
FIG. 12 is a diagrammatic view showing an accessor control section of the magnetic tape library apparatus shown in FIG. 11.

FIG. 12 is a diagrammatic view of the accessor control section 107. The accessor control section 107 includes the accessor controller 108 and the accessor mechanism controller 109. The accessor controller 108 includes an MPU 112, a program memory section 113, a communication memory 114 and a non-volatile memory 115. Meanwhile, the accessor mechanism controller 109 includes an MPU 116, a program memory section 117, an I/O port 118, a servo control circuit 119, a motor driver circuit 120 and a detection circuit 121. The MPU 112 performs various communications with the host apparatus 110 and executes various controls of the accessor. The communication memory 114 performs reading/writing of data when communications are performed between the accessor controller 108 and the accessor mechanism controller 109 (between the MPUs of them). The program memory section 113 stores microprograms to be executed by the MPU 112 while the program memory section 117 stores microprograms to be executed by the MPU 116 therein. The I/O port 118 is provided for connection to various I/O equipments, and the non-volatile memory 115 stores information of various setting parameters of the apparatus therein. The motor driver circuit 120 drives a motor of the accessor mechanism section 105, the sel-motor of the cartridge storage cell 104, and so forth. The servo control circuit 119 performs servo control of the motors. The detection circuit 121 detects sensor signals of various photosensors of the accessor mechanism section 105 and photosensors of the cartridge storage cell 104.

Description of the Cartridge Transport Section

Figure 13:
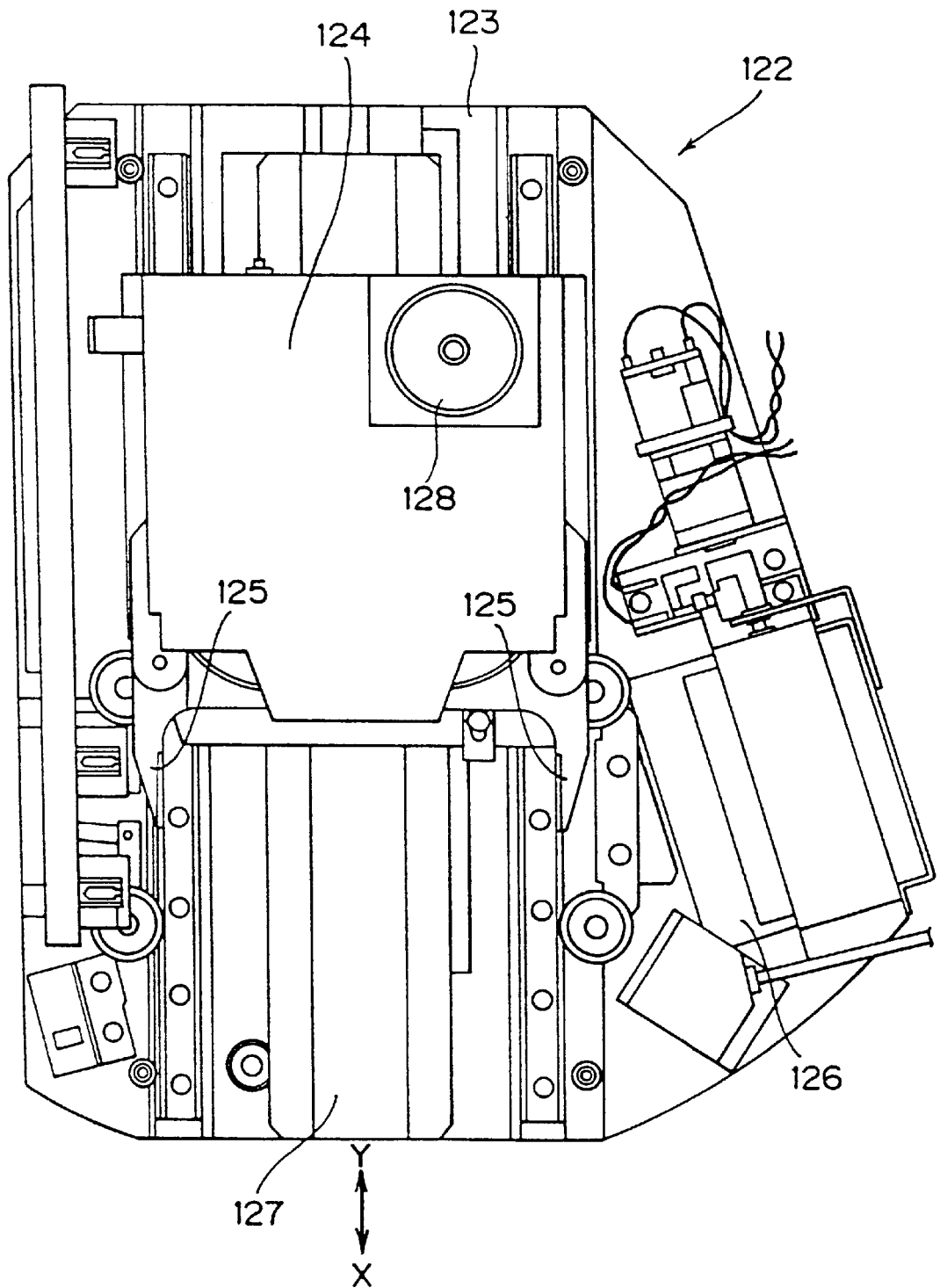
FIG. 13 is a plan view of a cartridge transport section of the magnetic tape library apparatus shown in FIG. 11.

FIG. 13 is a plan view of a cartridge transport section. The accessor mechanism section 105 includes a cartridge transport section 122 which transports a cartridge to a designated target position and inserts and/or takes out a cartridge into or from the cartridge storage cell 104 or a magnetic tape apparatus 102. The cartridge transport section 122 is adapted to make a turning movement in a horizontal plane and a movement in a vertical direction (upward/downward movement) to be positioned to and access the cartridge storage cell 104, the magnetic tape apparatus 102 or a cartridge charging/discharging mechanism (not shown). In this instance, the servo control circuit 119 connected to the I/O port 118 and the motor driver circuit 120 control and drive the motor under the control of the MPU 116 in the accessor mechanism controller 109 to drive the cartridge transport section 122. As shown in FIG. 13, a cartridge transport mechanism section 124, a hand mechanism section 125, a bar code scanner 126 and a tray (auxiliary recording medium transport mechanism) 127 are provided on a base 123 of the cartridge transport section 122. Meanwhile, a transport motor 128 is provided on the cartridge transport mechanism section 124 so that the cartridge transport mechanism section 124 may be driven to move in the directions indicated by a double-sided arrow mark X-Y in FIG. 13 by the transport motor 128. The hand mechanism section 125 is provided to handle a cartridge and is driven by the cartridge transport mechanism 124 to move in the forward and backward directions, that is, in the X-Y directions. The bar code scanner 126 reads a bar code from a bar code label applied to a side face of a cartridge. The tray 127 is an auxiliary mechanism for supporting a cartridge from below when the cartridge is grasped by the hand mechanism section 125. The tray 127 is driven by the cartridge transport mechanism section 124. It is to be noted that the hand mechanism section 124 and the tray 127 are driven and controlled independently of each other.

Description of Insertion of a Cartridge into the Cartridge Storage Cell

Figure 14:
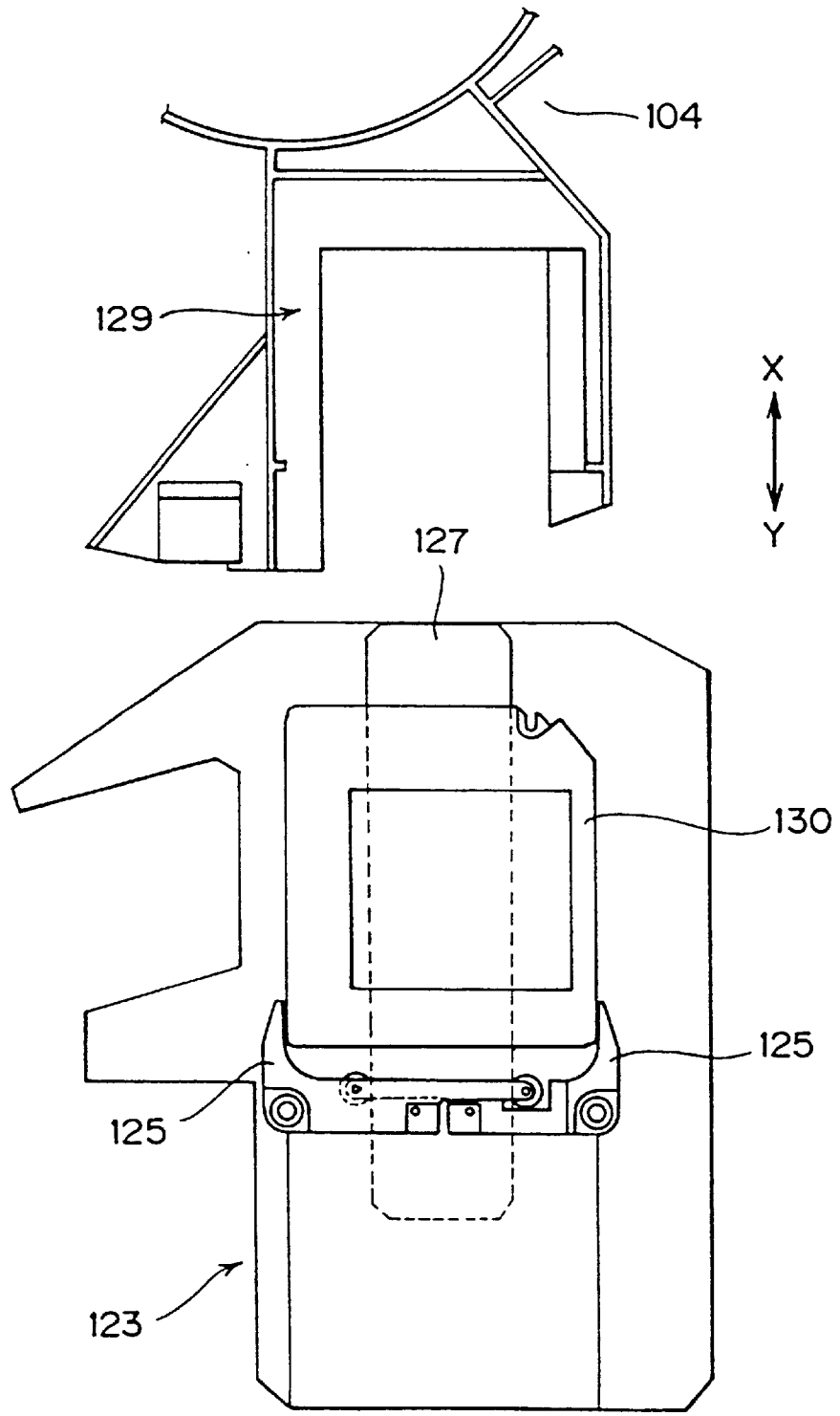
FIGS. 14 and 15 are schematic views showing a cartridge at different stages during insertion into a cartridge storage cell by the cartridge transport section shown in FIG. 13.
Figure 15:
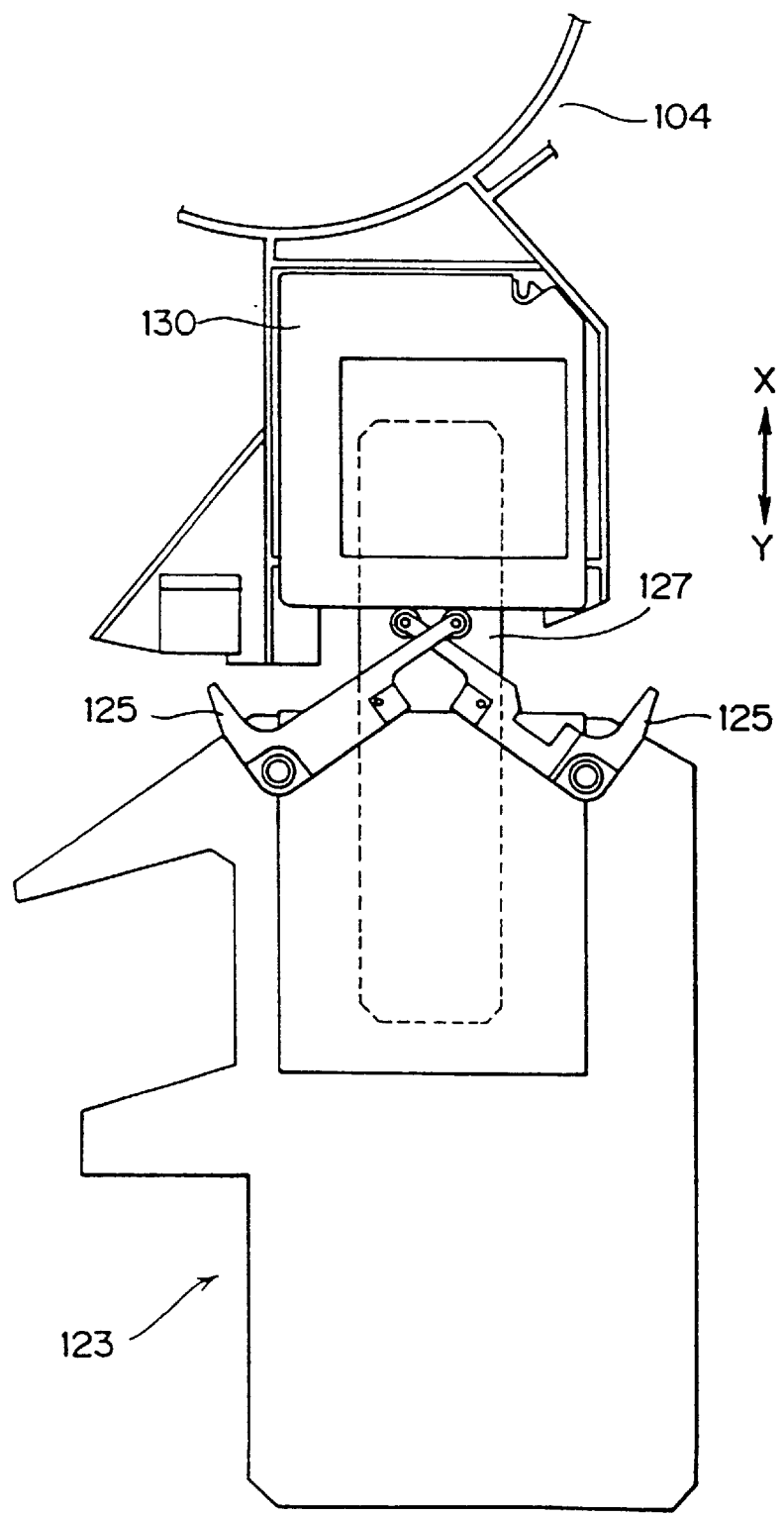

FIGS. 14 and 15 are schematic views showing a cartridge at different stages during insertion into the cartridge storage cell. Here, operation when the cartridge transport section 122 transports a cartridge, which has been received from the cartridge charging/discharging mechanism (not shown), and inserts it into the cartridge storage cell 104 will be described. Referring to FIGS. 14 and 15, a plurality of accommodation racks 129 each for storing a cartridge 130 thereon are provided on the cartridge storage cell 104. In order to insert a cartridge into a particular accommodation rack 129, the cartridge transport section 122 is moved in a vertical direction and a horizontal direction so that it is positioned to a designated position. In this instance, in the cartridge transport section 122, the hand mechanism section 125 grasps the cartridge 130 at its home position as shown in FIG. 14 and transports it to the designated position of the cartridge storage cell 104. Thereafter, the cartridge transport mechanism section 124 is driven to move the hand mechanism section 125 in the direction of the arrow mark X in FIG. 15 to move the cartridge 130 toward the particular accommodation rack 129. In this instance, the tray 127 is inserted into the inside of the accommodation rack 129, and then the hand mechanism section 125 is opened and the cartridge 130 is pushed onto the accommodation rack 129. After completion of such insertion of the cartridge 130, the hand mechanism 125 is closed, and then the hand mechanism section 125 is pulled back in the direction indicated by the arrow mark Y in FIG. 1.5 to return to the home position.

Description of Processing of the Accessor Control Section

When the power is turned on, the MPU 112 of the accessor controller 108 executes a diagnosis (initial diagnosis) and initialization of the accessor controller 108. Further, when the power is turned on, the MPU 116 of the accessor mechanism controller 109 executes a diagnosis and initialization of the accessor mechanism controller 109 and then executes a diagnosis and initialization of the mechanism section. In the diagnosis and initialization of the mechanism section, the MPU 116 of the accessor mechanism controller 109 first executes checking of operation of various sensors (photosensors and so forth) and various mechanisms of the cartridge transport section 122 provided on the accessor mechanism section 105 and then executes a diagnosis and initialization of the mechanisms for moving a cartridge 130. In such diagnosis and initialization, if the diagnosis of the cartridge transport section 122 comes to an end normally, then the diagnosis of the driving section for moving a cartridge is performed. Thereupon, however, the cartridge transport mechanism section 124 is driven to return the hand mechanism section 125 to the home position without fail. This is intended to prevent the cartridge mechanism section 122 from interfering with any other mechanism when the cartridge mechanism section 122 is moved.

The conventional magnetic tape library apparatus having such construction as described above has the following subjects to be solved. In particular, although an initial diagnosis and initialization of the apparatus including the control systems are executed when the power is turned on, it is quite unknown whether or not a cartridge 130 is present in the cartridge transport section 122 then. For example, if the power source suffers from and is interrupted by some trouble when a cartridge 130 is being inserted into the cartridge storage cell 104 by the cartridge transport section 122 or if a cartridge is released from the hand mechanism section 125 during interruption of the power supply, although the cartridge 130 is present on the cartridge transport section 122, the condition wherein the hand mechanism section 125 grasps no cartridge thereon occurs. If an initial diagnosis is executed when the power is turn on again in this condition, then the sensor of the cartridge transport section 122 cannot detect the condition wherein the cartridge is grasped, and consequently, the MPU 116 of the accessor mechanism controller will discriminate that no cartridge is present on the cartridge transport section 122. Accordingly, if the cartridge transport section 122 is moved based on a result of an initial diagnosis of the other mechanism sections, then there is the possibility that the cartridge may interfere with some other mechanism so that the cartridge or the mechanism may be damaged.

A magnetic tape library apparatus according to the present invention is provided in order to solve the subject of the conventional magnetic tape library apparatus described above and discriminate presence of a cartridge in an initial diagnosis upon turning on of the power to detect an abnormal condition of the apparatus with certainty to prevent an otherwise possible accident of damage to a cartridge or a mechanism of the apparatus.

Figure 16:
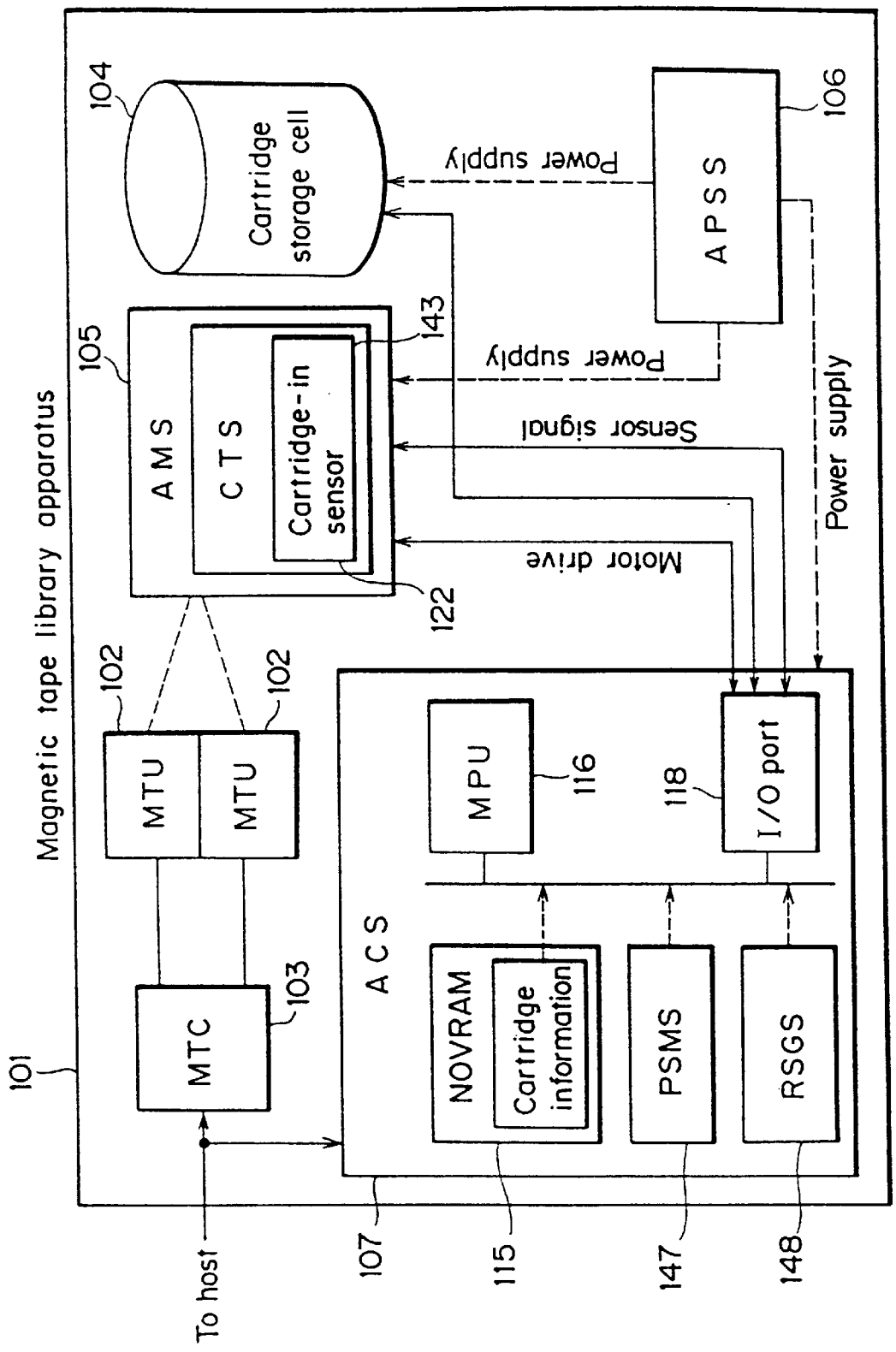
FIG. 16 is a block diagram of a magnetic tape library apparatus to which the present invention is applied.

FIG. 16 is a block diagram of the magnetic tape library apparatus of the present invention. In FIG. 16, same or corresponding elements to those of FIGS. 12 to 15 are denoted by same reference numerals. Referring to FIG. 16, reference numeral 143 denotes a cartridge-in sensor, 147 a power source monitor section, and 148 a reset signal generation section.

In a first form of the magnetic tape library apparatus, the magnetic tape library apparatus includes a charging/discharging mechanism (not shown) for a cartridge, a cartridge storage cell 104 which can accommodate a plurality of cartridges therein, a recording/reproducing apparatus 102 for recording and/or reproducing data onto and/or from a cartridge, an accessor mechanism section 105 having a cartridge transport section 122 for transporting a cartridge and adapted to access the cartridge storage cell 104 and the recording/reproducing apparatus 102, and an accessor control section 107 for controlling the accessor mechanism section 105. A sensor (cartridge-in sensor) 143 for detecting whether or not the cartridge transport section 122 grasps a cartridge thereon is provided on the cartridge transport section 122. The accessor control section 107 includes a non-volatile memory 115 and a processor (MPU) 116. The non-volatile memory 115 stores therein "cartridge information" indicating whether or not a cartridge is grasped in the accessor transport section 122. The processor 116 stores, upon interruption of the power supply, "cartridge information" into the non-volatile memory 115, and compares, upon initial diagnosing processing after turning on of the power again, the "cartridge information" stored in the non-volatile memory 115 with "sensor information" received from the sensor 143. Then, when the result of the comparison indicates a difference, the processor 116 determines an abnormal condition of the apparatus and delivers an error report to a host apparatus.

In a second form of the magnetic tape library apparatus of the present invention, the following processes 1 to 3 are executed by the processor 116 in the accessor control section 107 in the first form described above in order to detect an abnormal condition of the apparatus.

1. Upon interruption of the power, "cartridge information" indicating whether or not a cartridge is grasped in the cartridge transport section 122 is written into the non-volatile memory 115.

2. In initial diagnosing processing upon subsequent turning on of the power, the "cartridge information" of the non-volatile memory 115 is read out and "sensor information" of the sensor (cartridge-in sensor) 143 provided on the cartridge transport section 122 is fetched and compared with the "cartridge information" thus read out.

3. When the result of the comparison reveals a difference, the processor 116 determines that the apparatus is in an abnormal condition and delivers an error report to the host apparatus.

In a third form of the magnetic tape library apparatus of the present invention, when the initial diagnosing processing upon turning on of the power in the second form described above reveals either 1. that the cartridge-in sensor 143 indicates "presence of no cartridge" while the "cartridge information" of the non-volatile memory 115 indicates that "a cartridge is present in the cartridge transport section" or 2. that the cartridge-in sensor 143 indicates "presence of a cartridge" while the "cartridge information" of the non-volatile memory 115 indicates that "no cartridge is present in the cartridge transport section", the processor 116 determines an abnormal condition of the apparatus and delivers an error report to the host apparatus.

A fourth form of the magnetic tape library apparatus of the present invention is constructed such that, when the processor 116 provided in the accessor control section 107 discriminates a difference of the "cartridge information" and determines an abnormal condition of the apparatus in the second form described above, subsequent operation of the mechanism section is not performed and recovering processing of the apparatus is inhibited.

Operation of the forms described above will be described subsequently with reference to FIG. 16. The MPU 116 of the accessor control section 107 drives the motor by way of a servo control section not shown to operate the accessor mechanism section 105. By this operation, for example, the cartridge transport section 122 of the accessor mechanism section 105 grasps and transports a cartridge to a target position and inserts it into an accommodation rack of the cartridge storage cell 104. If the power is interrupted at an accessor power source section 106 during such operation of the accessor mechanism section 105, the power interruption is detected by a power source monitor section 147.

Thereupon, "cartridge information" indicating whether or not a cartridge is grasped in the cartridge transport section 122 (presence or absence of a cartridge) is written into the non-volatile memory 115 by the processor (MPU) 116 of the accessor control section 107. Thereafter, when the power is turned on again and then a reset signal generation section 148 detects that the power source voltage has becomes stabilized, the reset signal generation section 148 generates a reset signal. In response to the reset signal, the accessor control section 107 is reset and then executes initial diagnosing processing for turning on of the power. In the initial diagnosing processing, the MPU 116 compares the "cartridge information" stored in the non-volatile memory 115 with "error information" fetched from the cartridge-in sensor 143 to detect whether or not there is a different between them. If the result of the detection reveals a difference between them, the MPU 116 determines that the apparatus is in an abnormal condition, and delivers an error report to the host apparatus. Further, in this instance, operation of the mechanism section is not performed to inhibit recovery of the apparatus. Since it can be detected always with accuracy whether or not a cartridge is grasped in the hand mechanism section of the cartridge transport section (presence or absence of a cartridge) in such a manner as described above, when the apparatus is in an abnormal condition, it can be prevented to render the mechanism section operative in error to cause damage to the mechanism section or the cartridge.

In the following, a detailed construction of the magnetic tape library apparatus of the present invention will be described. Referring to FIGS. 17 to 26, same or corresponding elements to those of FIGS. 11 go 16 are denoted by same reference numerals. Further, reference numerals 132 and 133 denote each an operator panel, reference numeral 134 denotes an inlet opening, 135 an outlet opening, 136 a cartridge charging/discharging mechanism (CAS), 137 a control unit, 138 a sel-motor, 139 a positioning mechanism, 140 a position correction sensor, 142 a tray motor, 144 a power source apparatus, 145 a NOVRAM, 146 an I/O port, 149 a communication LSI, 151 an S-RAM array, 152 an EEROM array, 153 an address control circuit, and 154 a control circuit.

Description of the Magnetic Tape Library Apparatus

Figure 17:
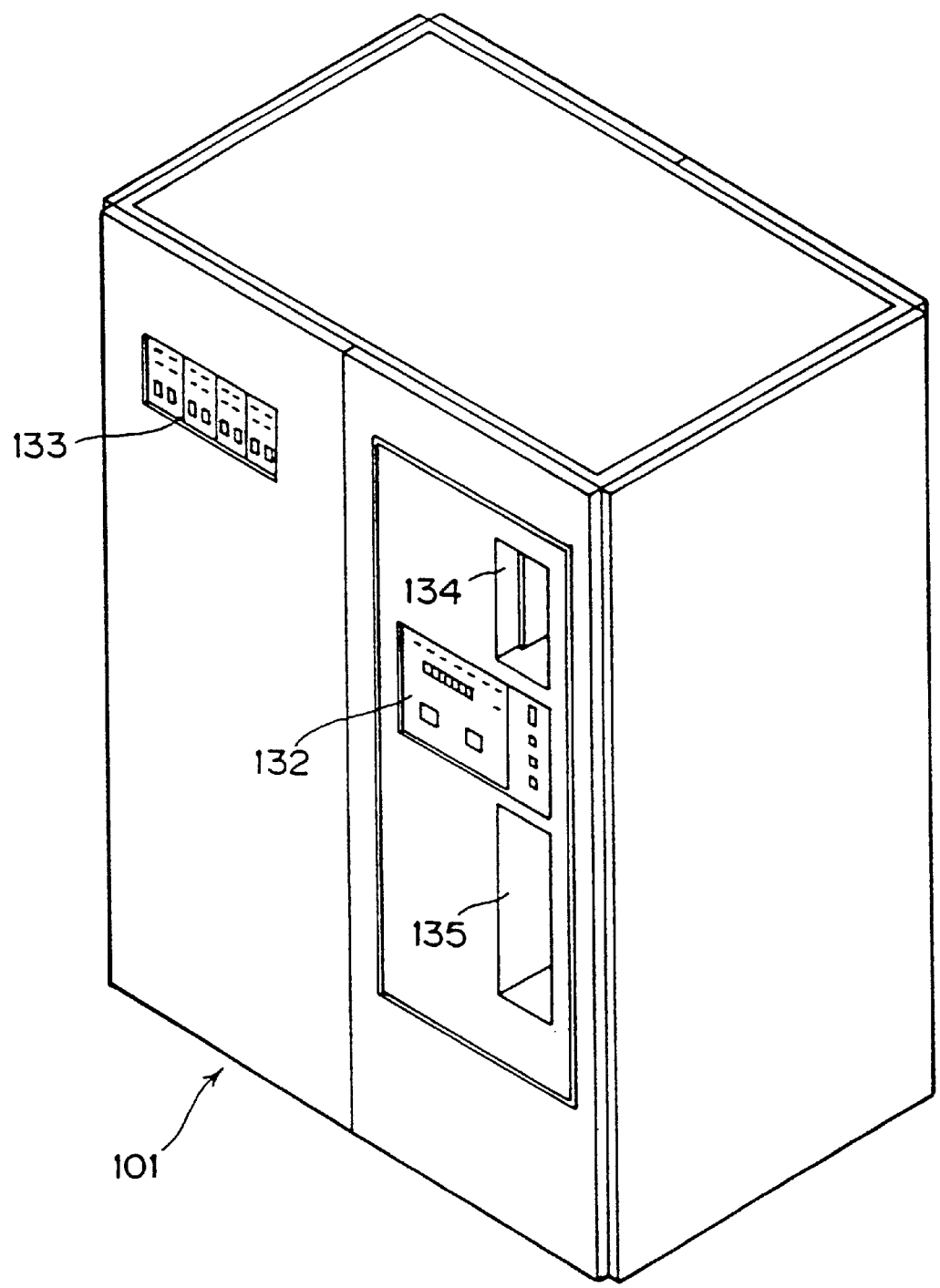
FIG. 17 is a perspective view of a magnetic tape library apparatus.

FIG. 17 is a perspective view of the magnetic tape library apparatus. Referring to FIG. 17, a pair of operator panels 132 and 133 are provided on a front wall of the magnetic tape library apparatus 101 so that they can be manually operated by an operator. Further, an inlet opening 134 and an outlet opening 135 into or from the cartridge charging/discharging mechanism are provided in the front wall of the magnetic tape library apparatus 101 so that a cartridge may be thrown into or a cartridge after use may be taken out from the magnetic tape library apparatus 101.

Figure 18:
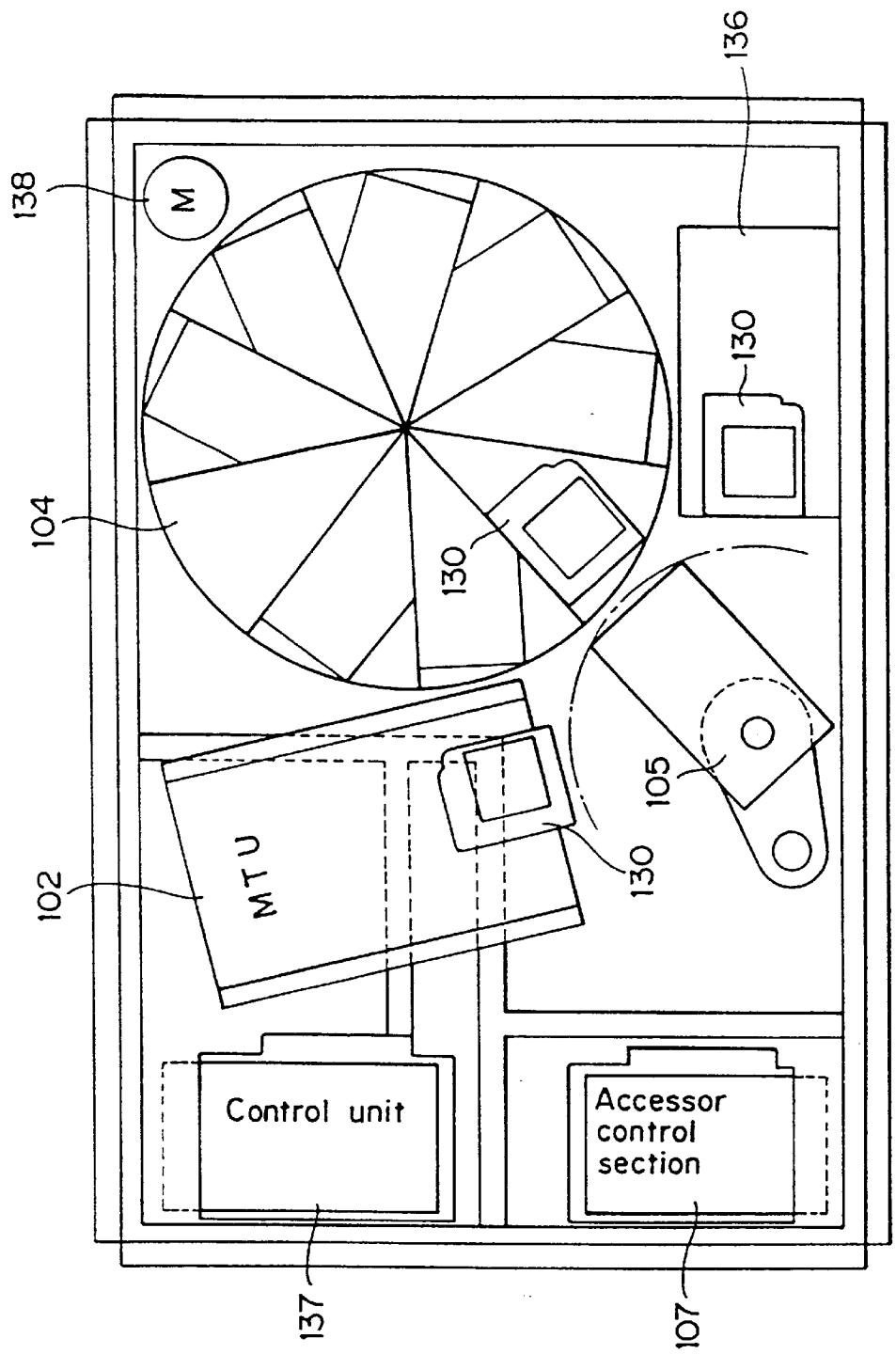
FIG. 18 is a plan view showing an internal structure of the magnetic tape library apparatus shown in FIG. 17.

Description of the Internal Structure of the Magnetic Tape Library Apparatus FIG. 18 is a plan view of the internal structure of the magnetic tape library apparatus 101. Referring to FIG. 18, the magnetic tape library apparatus 101 includes a cartridge storage cell 104 for accommodating a plurality of cartridges 130 therein, a plurality of magnetic tape units (MTU) 102, an accessor mechanism section 105, an accessor control section 107 for controlling the accessor mechanism 105, a cartridge charging/discharging mechanism (CAS) 136, and a control unit 137 for controlling the entire apparatus. The cartridge storage cell 104 is adapted to accommodate a plurality of cartridges 130 therein and is driven to rotate to a predetermined position by a sel-motor (M) 138. The cartridge charging/discharging mechanism 136 performs processing to separate cartridges thrown in from the outside by an operator from each other, to transport a cartridge 130 to a position at which the cartridge 130 is to be delivered to the accessor mechanism section 105 and to transport a cartridge 130 received from the accessor mechanism section 105 to discharge the same to the outside. The accessor mechanism section 105 receives a cartridge transported by the cartridge charging/discharging mechanism 136 and transports the cartridge 130 to insert it into the cartridge storage cell 104, takes out a cartridge 130 from within the cartridge storage cell 104 and loads it into one of the magnetic tape units 102 or takes out a cartridge 130 from one of the magnetic tape units 102 and inserts it into the cartridge storage cell 104. The accessor control section 107 controls the accessor mechanism section 105 and the cartridge storage cell 104. An accessor is constituted from the accessor control section 107 and the accessor mechanism section 105.

Figure 19:
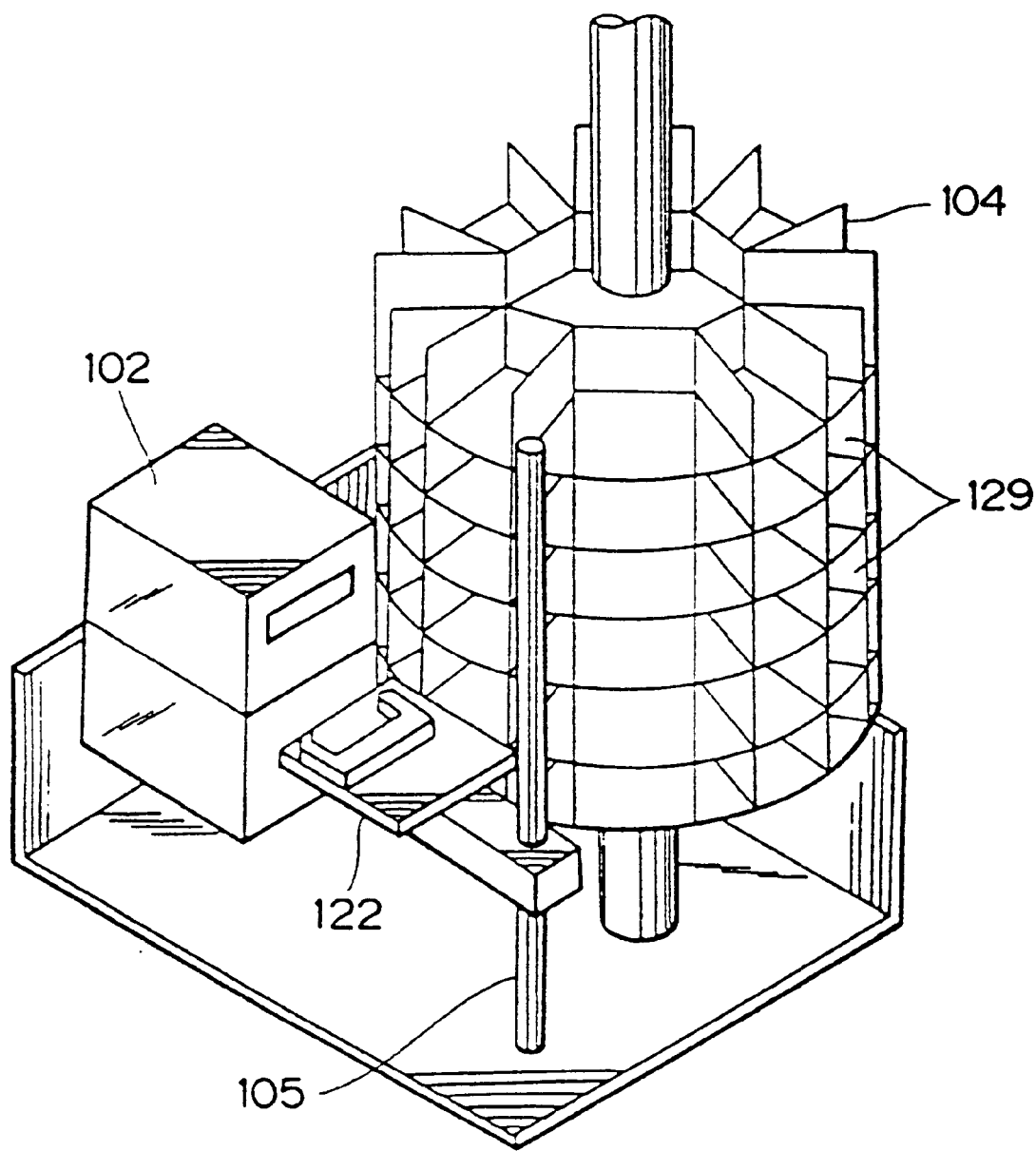
FIG. 19 is a perspective view of the internal structure shown in FIG. 18.

FIG. 19 is a perspective view of the internal structure of the magnetic tape library apparatus 101. The cartridge storage cell 104 is provided in the inside of the magnetic tape library apparatus 101 and has a plurality of accommodating racks 129 for accommodating a plurality of cartridges therein, and the magnetic tape units 102 are provided in the proximity of the cartridge storage cell 104 in the inside of the magnetic tape library apparatus 101. The accessor mechanism section 105 is provided in the proximity of the cartridge storage cell 104 and the magnetic tape units 102, and a cartridge transport section 122 for transporting or handling a cartridge is provided on the accessor mechanism section 105.

Description of the Cartridge Transport Section

Figure 20:
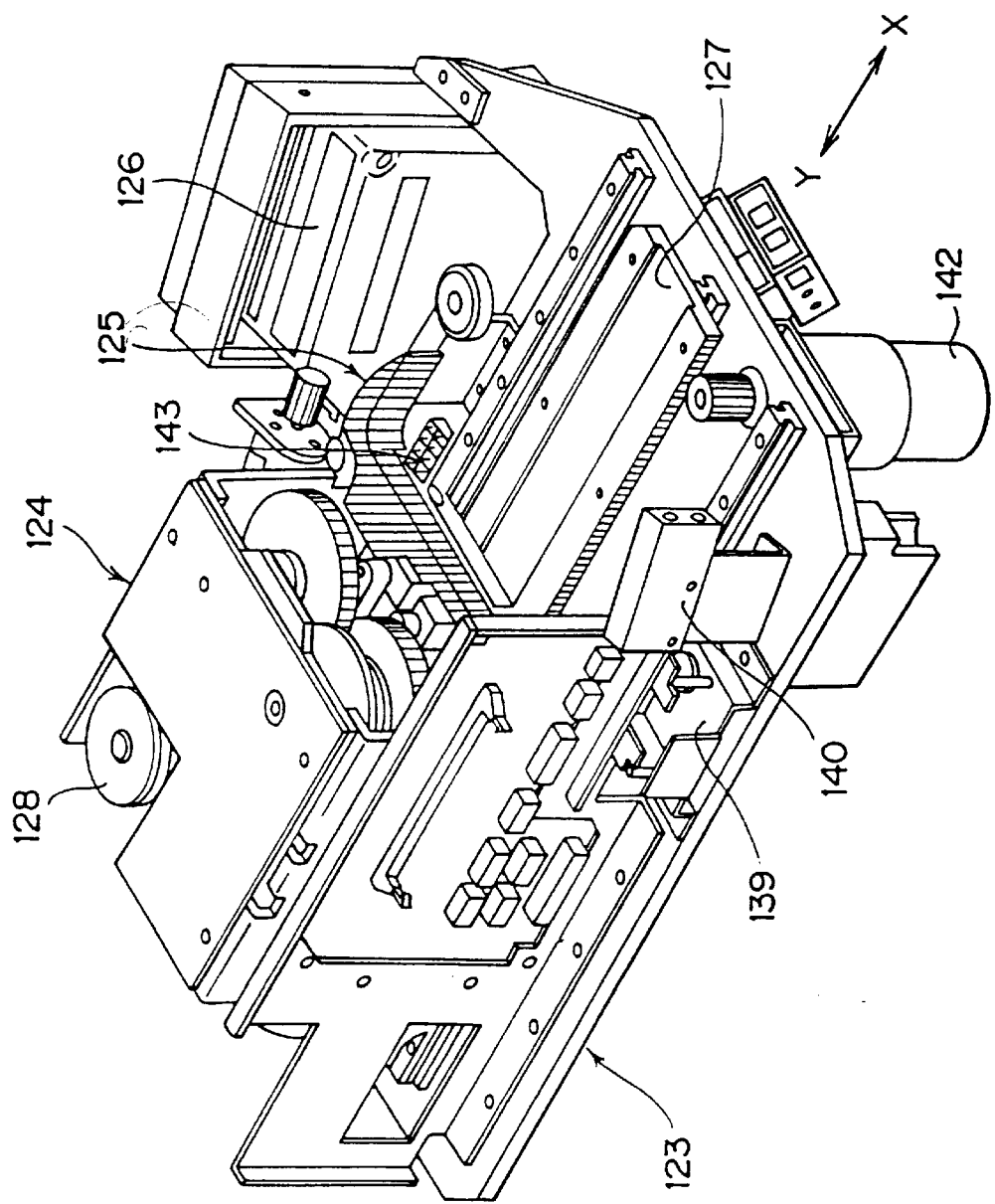
FIG. 20 is a perspective view of a cartridge transport section of the magnetic tape library apparatus of FIG. 17.

FIG. 20 is a perspective view of the cartridge transport section 122. A cartridge transport mechanism section 124, a hand mechanism section 125, a positioning mechanism 139, a position correction sensor 140, a bar code scanner 126, a tray 127, a tray motor 142 and a cartridge-in sensor 143 are provided on a base 123 of the cartridge transport section 122. Further, a transport motor 128 is provided on the cartridge transport mechanism section 124 so that the cartridge transport mechanism 124 may be driven to move in directions indicated by a double-sided arrow mark X-Y in FIG. 20 by the transport motor 128. The cartridge-in sensor 143 either detects whether or not the hand mechanism section 125 grasps a cartridge thereon or detects whether or not a cartridge is present at a position at which the hand mechanism section 125 is to grasp a cartridge. For example, a photosensor may be employed as the cartridge-in sensor 143. The hand mechanism section 125 handles a cartridge and is driven by the cartridge transport mechanism section 124 to move in the forward and backward directions (directions indicated by the arrow mark X-Y in FIG. 20).

Figure 21:
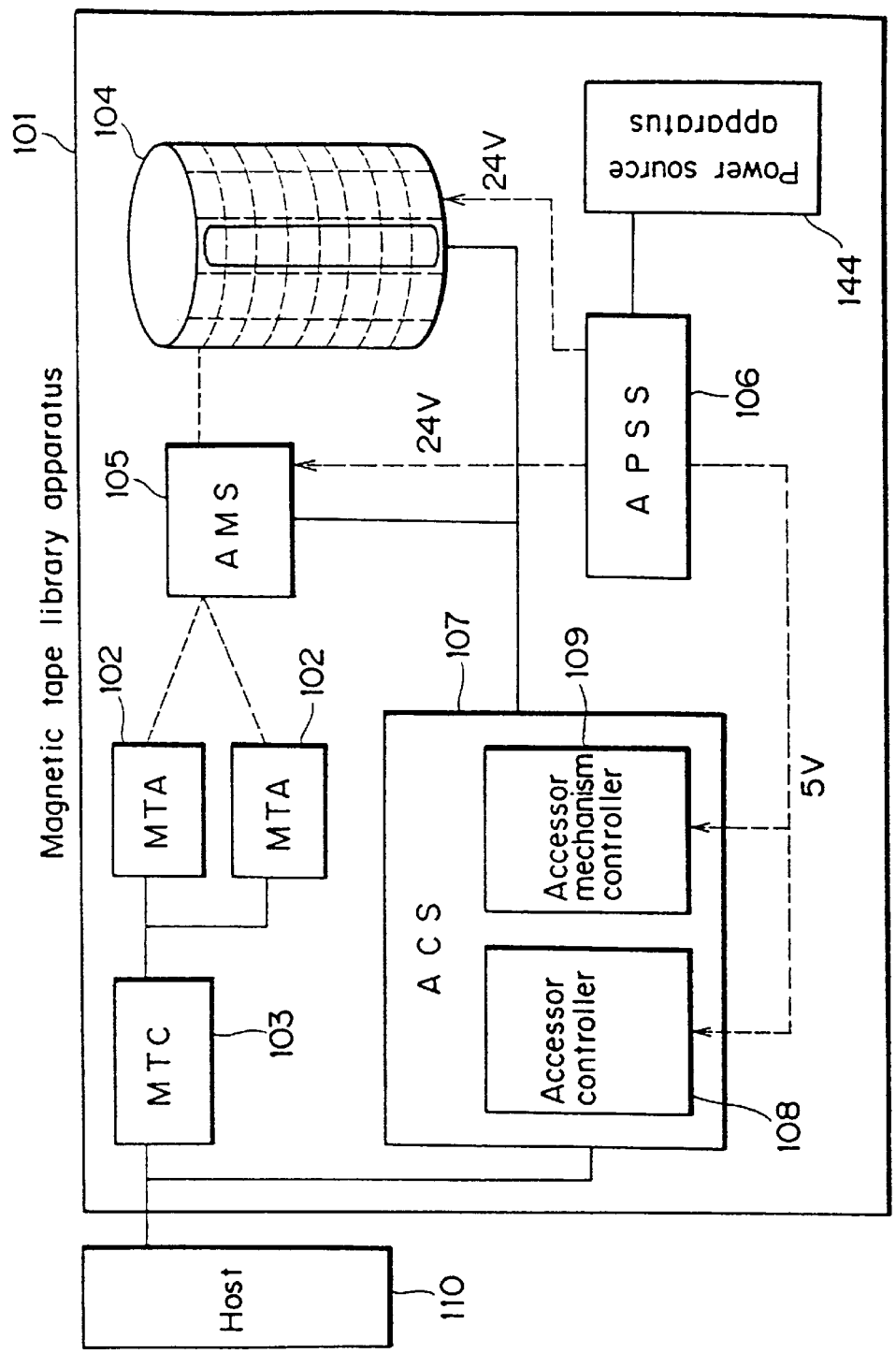
FIG. 21 is a block diagram of a magnetic tape library apparatus according to the present invention.

Description of the Magnetic Tape Library Apparatus and the Power Source Therefor FIG. 21 is a block diagram of the magnetic tape library apparatus 101. The magnetic tape library apparatus 101 includes, as described hereinabove, a plurality of magnetic tape units 102, a magnetic tape controller 103, an accessor mechanism section 105, an accessor control section 107, an accessor power source section 106 and a power source apparatus 144. The accessor control section 107 includes an accessor controller 108, and an accessor mechanism controller 109. In the magnetic tape library apparatus of the construction described above, the power source apparatus 144 is connected to a commercial power supply (for example, 100 V/200 V) and distributes the power to various power source sections. The accessor power source section 106 converts the power supplied thereto from the power source apparatus 144 into the power of the voltage of 24 V and the power of the voltage of 5 V, which are used as the power sources for the accessor, the cartridge storage cell 104 and so forth. The accessor mechanism section 105 and the cartridge storage cell 104 are supplied with the power from the power source of 24 V of the accessor power source section 106 while the accessor control section 107 is supplied with the power from the 5 V power source of the accessor power source section 106.

Description of the Accessor Control Section

Figure 22:
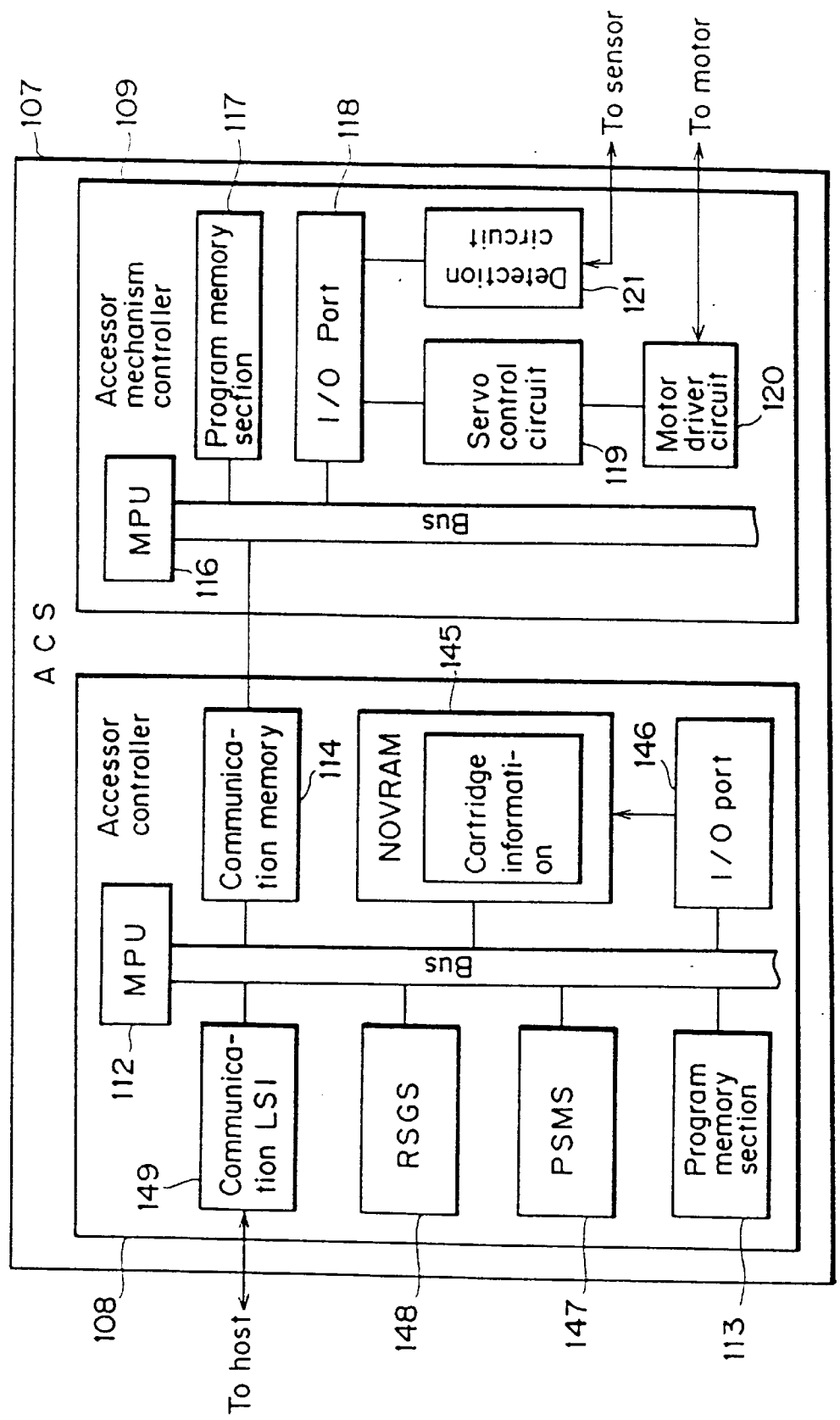
FIG. 22 is a block diagram of an accessor control section of the magnetic tape library apparatus of FIG. 21.

FIG. 22 is a block diagram of the accessor control section 107. Referring to FIG. 22, the accessor control section 107 includes the accessor controller 108 and the accessor mechanism controller 109. The accessor controller 108 includes an MPU 112, a communication LSI 149, a reset signal generation section 148, a program memory section 113, a communication memory 114, an I/O port 146, a NOVRAM (non-volatile memory) 145 and a power source monitor section 147. Meanwhile, the accessor mechanism controller 109 includes an MPU 116, a program memory section 117, an I/O port 118, a servo control circuit 119, a motor driver circuit 120 and a detection circuit 121. The MPU 112 performs various communications with a host apparatus 110 (FIG. 21) and executes various controls of the accessor controller 108. The communication memory 114 performs reading/writing of data when communications are performed between the accessor controller 108 and the accessor mechanism controller 109 (between the MPUs of them). The program memory section 113 stores therein microprograms to be executed by the MPU112 while the program memory section 117 stores therein microprograms to be executed by the MPU 116. The I/O ports 118 and 146 are provided for connection to various I/O equipments. The motor driver circuit 120 drives the motor of the accessor mechanism section 105, the sel-motor 138 of the cartridge storage cell 104, and so forth. The servo control circuit 119 executes servo control of the motors by way of the motor driver circuit 120. The detection circuit 121 detects sensor signals of various photosensors of the accessor mechanism section 105 and photosensors of the cartridge storage cell 104. For example, a sensor signal of the cartridge-in sensor 143 of FIG. 20 is transmitted by way of the I/O port 118 to the MPU 116, in which it is thereafter processed. The NOVRAM 145 is a kind of non-volatile memory (hereinafter described in detail) which is read/written by the MPU 112, and stores "apparatus setting information", "cartridge information" and so forth therein. The communication LSI 149 performs various communication controls with the accessor power source section 106, and for example, when the power source is interrupted, the communication LSI 149 notifies the MPU 112 of such power source interruption (notification of interruption). The reset signal generation section 148 monitors the apparatus power source (voltage 5 V) supplied to the accessor control section 107 and generates a reset signal to a logic circuit (not shown) when the power is turned on and the voltage becomes stabilized. It is to be noted that, when a reset signal is generated to the logic circuit, the entire apparatus is reset and an initial diagnosis/initialization is performed with the MPUs 112 and 116.

Description of the NOVRAM

Figure 23A:
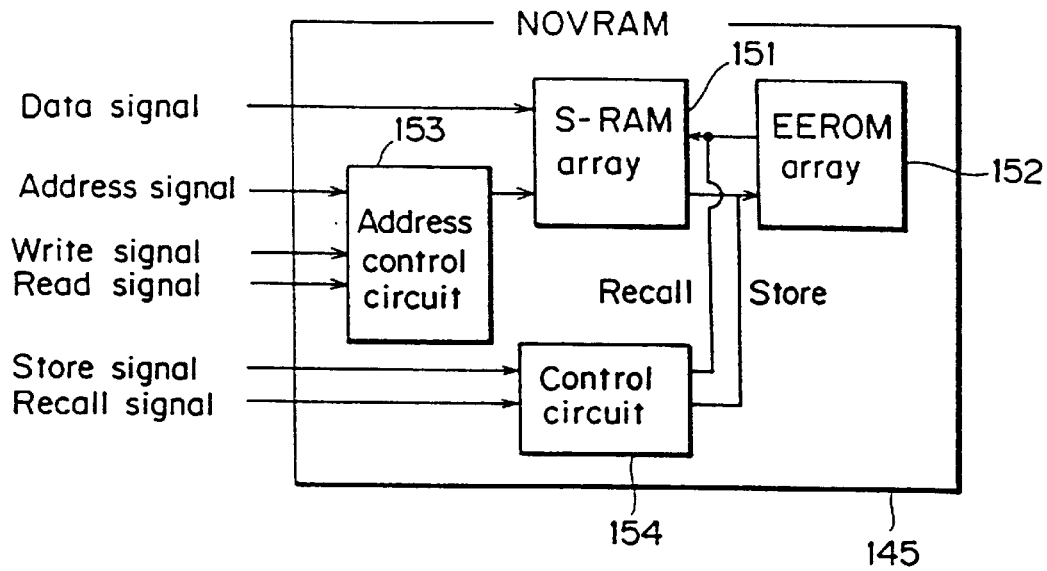
FIG. 23A is a block diagram of a NOVRAM of the accessor control section of FIG. 22.
Figure 23B:
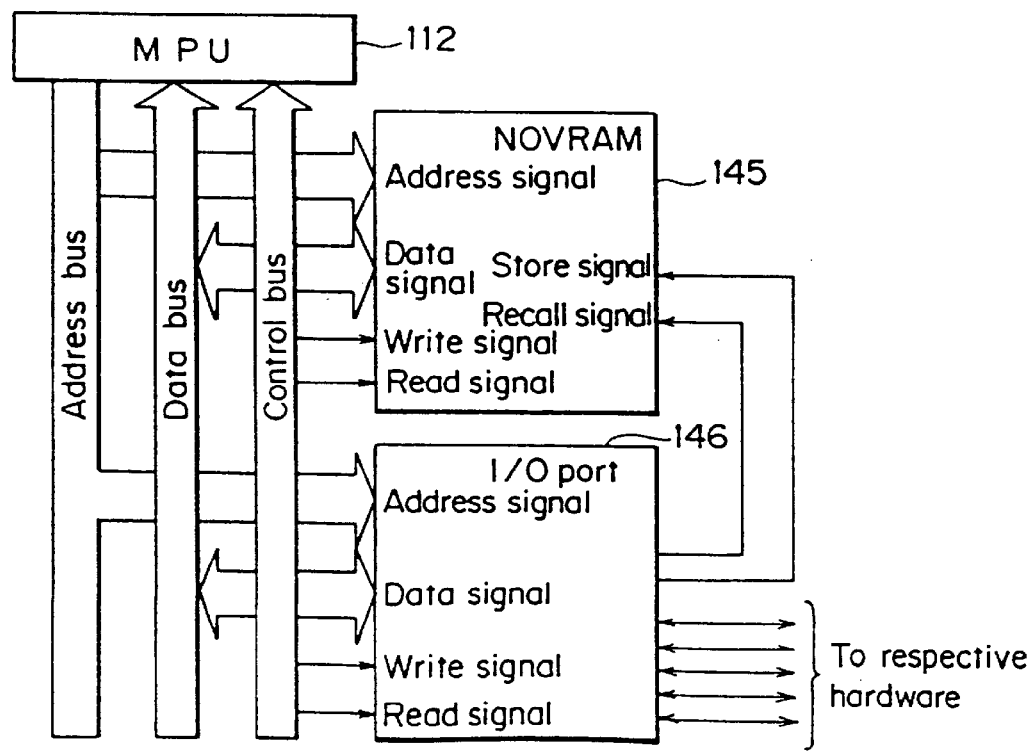
FIG. 23B is a block diagram showing the NOVRAM of FIG. 23A and peripheral circuits of the NOVRAM.

FIG. 23A is a block diagram showing the NOVRAM, and FIG. 23B is a block diagram showing connection among the NOVRAM, the MPU and the I/O port. The NOVRAM (for example, X2212 by XiCOR) is an element called non-volatile S-RAM element. Referring first to FIG. 23A, the NOVRAM 145 includes an S-RAM array 151, an EEROM array 152, an address control circuit 153, and a control circuit 154. The address control circuit 153 controls writing/reading of data into/from an address of the S-RAM array 151 in response to selection of a write/read signal. For example, when an address signal and a write signal are transmitted to the address control circuit 153 while a data signal is transmitted to the S-RAM array 151, the data are written into the S-RAM array 151. On the other hand, when an address signal and a read signal are transmitted to the address control circuit 153, data can be read out from the S-RAM array 151. The control circuit 154 controls, in response to selection of a store/recall signal so that either data of the S-RAM array 151 are read out and written instantaneously into the EEROM array 152 (in the case of store) or reversely data of the EEROM array 152 are read out and written instantaneously into the S-RAM array 151 (in the case of recall). When the NOVRAM 145 of such construction is provided in the accessor controller 108 of FIG. 22, it is connected to the components of the accessor controller 108 in such a manner as shown in FIG. 23B.

Referring now to FIG. 23B, an address signal, a data signal, a write signal and a read signal of the NOVRAM 145 are transmitted by way of buses (an address bus, a data bus and a control bus) of the MPU 112. The signals are transmitted also to the I/O port 146. For example, the address signal is transmitted from the MPU 112 to the NOVRAM 145 by way of the address bus while the write signal and the read signal are transmitted from the MPU 112 to the NOVRAM 145 by way of the control bus. Further, the data signal is transferred between the MPU 112 and the NOVRAM 145 by way of the data bus. Further, a store signal and a recall signal are transmitted from the I/O port 146 to the NOVRAM 145 under the control of the MPU 112.

Processing (recalling/storing and so forth) upon turning on and off of the power where the NOVRAM 145 of such construction described above is provided in the accessor controller 108 of FIG. 22 is such as follows:

1. Processing upon Turning on of the Power:

After the power of the accessor power source section 106 (refer to FIG. 21) is turned on and the voltage of the power becomes stabilized, the reset signal generation section 148 of the accessor controller 108 (refer to FIG. 22) generates a reset signal to the logic circuit. In response to the reset signal, the MPU 112 of the accessor controller 108 executes an initial diagnosis/initialization. Upon such initial diagnosis, the MPU 112 generates and transmits a recall signal to the NOVRAM 145 by way of the I/O port 146. When the recall signal is inputted to the NOVRAM 145, the control circuit 154 executes recalling control of data. In particular, the control circuit 154 of the NOVRAM 145 executes control to write (recall) data stored in the EEROM array 152 into the S-RAM array 151. Thereafter, the MPU 112 reads out data from the S-RAM array 151 and places them into the communication memory 114. Upon such reading out of data, the MPU 112 transmits a read signal and an address signal to the address control circuit 153.

2. Processing upon Turning Off of the Power

When the power to the accessor power source section 106 is turned off, the power source monitor section 147 in the accessor controller 108 detects the interruption of the power and generates an interrupt signal to the MPU 112 in the accessor controller 108 before the voltage drops. It is to be noted that a fixed time is compensated for until the voltage drops. In response to the interrupt signal, the MPU 112 executes control to transmit data of apparatus information and so forth (data read out from the communication memory 114) to the NOVRAM 145 so as to be written into the S-RAM array 151. Upon such writing, the MPU 112 transmits a write signal and an address signal to the address control circuit 153 of the NOVRAM 145. Thereafter, the MPU 112 generates and transmits a store signal to the NOVRAM 145 by way of the I/O port 146. When the signal is inputted from the I/O port 146 to the NOVRAM 145, the control circuit 154 executes control to write (store) data of the S-RAM array 151 into the EEROM array 152. Consequently, the data are stored into the EEROM array 152. It is to be noted that the processing upon turning off of the power is ended completely before the voltage drops after the power source monitor section 147 detects the interruption of the power and generates an interrupt signal to the MPU 112.

Description of Processing of the Accessor Controller

Figure 24A:
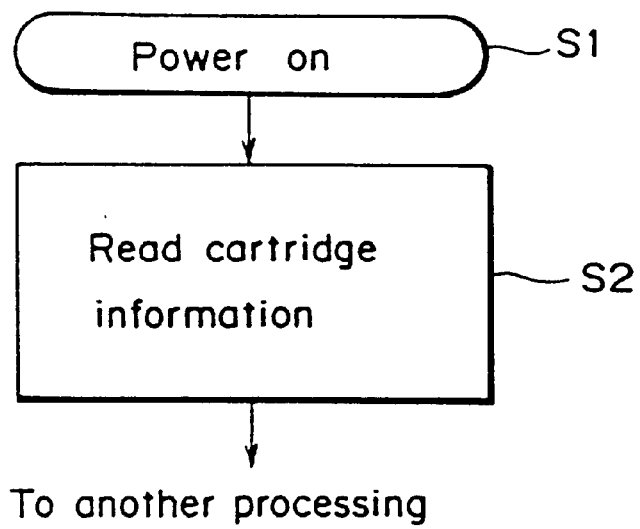
FIGS. 24A and 24B are flow charts illustrating processing of an accessor controller of the accessor control section of FIG. 22.
Figure 24B:
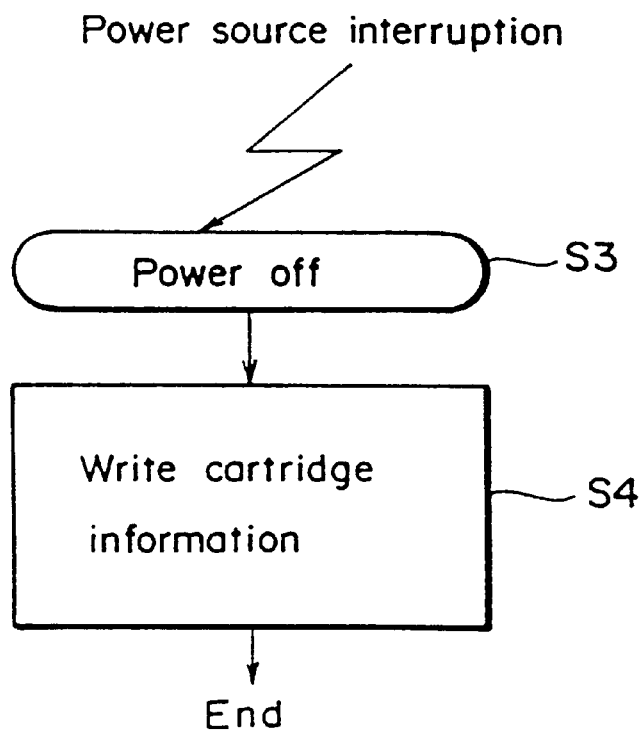

FIGS. 24A and 24B are flow charts of processing of the accessor controller. In the following, processing of the accessor controller will be described with reference to the flow charts. It is to be noted that reference characters Sl to S4 in FIGS. 23A and 23B denote processing steps.

1. Description of Processing upon Turning on of the Power (Refer to FIG. 24A):

When the power to the accessor power source section 106 is turned on and the voltage becomes stabilized, the reset signal generation section 148 of the accessor controller 108 generates a reset signal to the logic circuit (step S1). In response to the reset signal, the MPU 112 of the accessor controller 108 executes an initial diagnosis/initialization. Upon such initial diagnosis, the MPU 112 reads out information of the cartridge transport section from the NOVRAM 145 and places the same into the communication memory 114 (step S2). The MPU 112 thereafter executes some other processing.

2. Description of Processing upon Turning off of the Power (Refer to FIG. 24B):

When the power to the accessor power source section 106 is turned off, the power source monitor section 147 detects such interruption of the power and notifies the MPU 112 of the power interruption (step S3). Upon reception of the notification, the MPU 112 reads information regarding a cartridge and written in the communication memory 114 (information written by the MPU 116 of the accessor mechanism controller) and writes the information into the NOVRAM 145 (step S4). Thereafter, the MPU 112 waits interruption of the power.

Description of Processing of the Accessor Mechanism Controller

Figure 25:
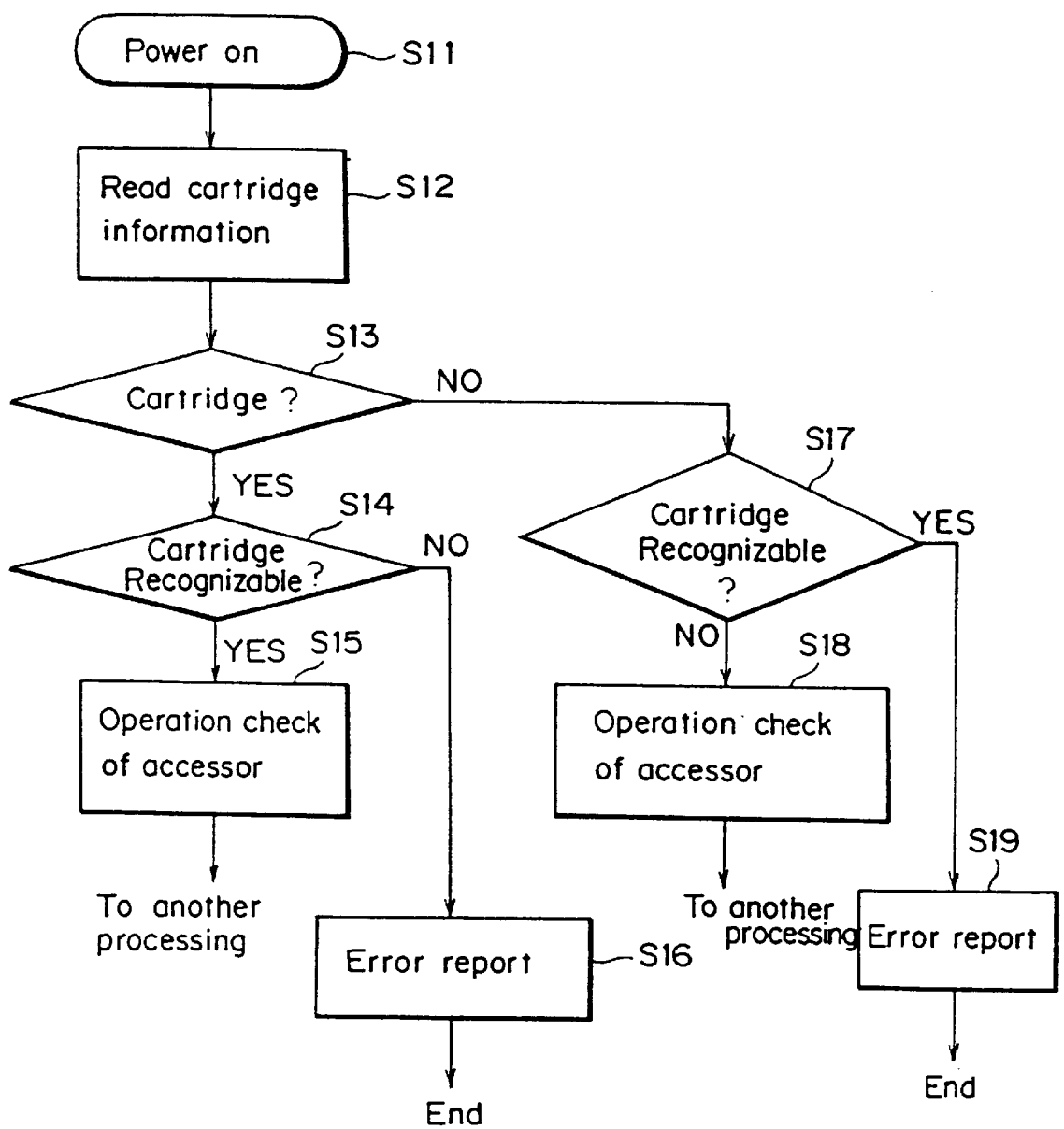
FIGS. 25 and 26 are flow charts illustrating processing of the accessor controller of the accessor control section of FIG. 22.
Figure 26:
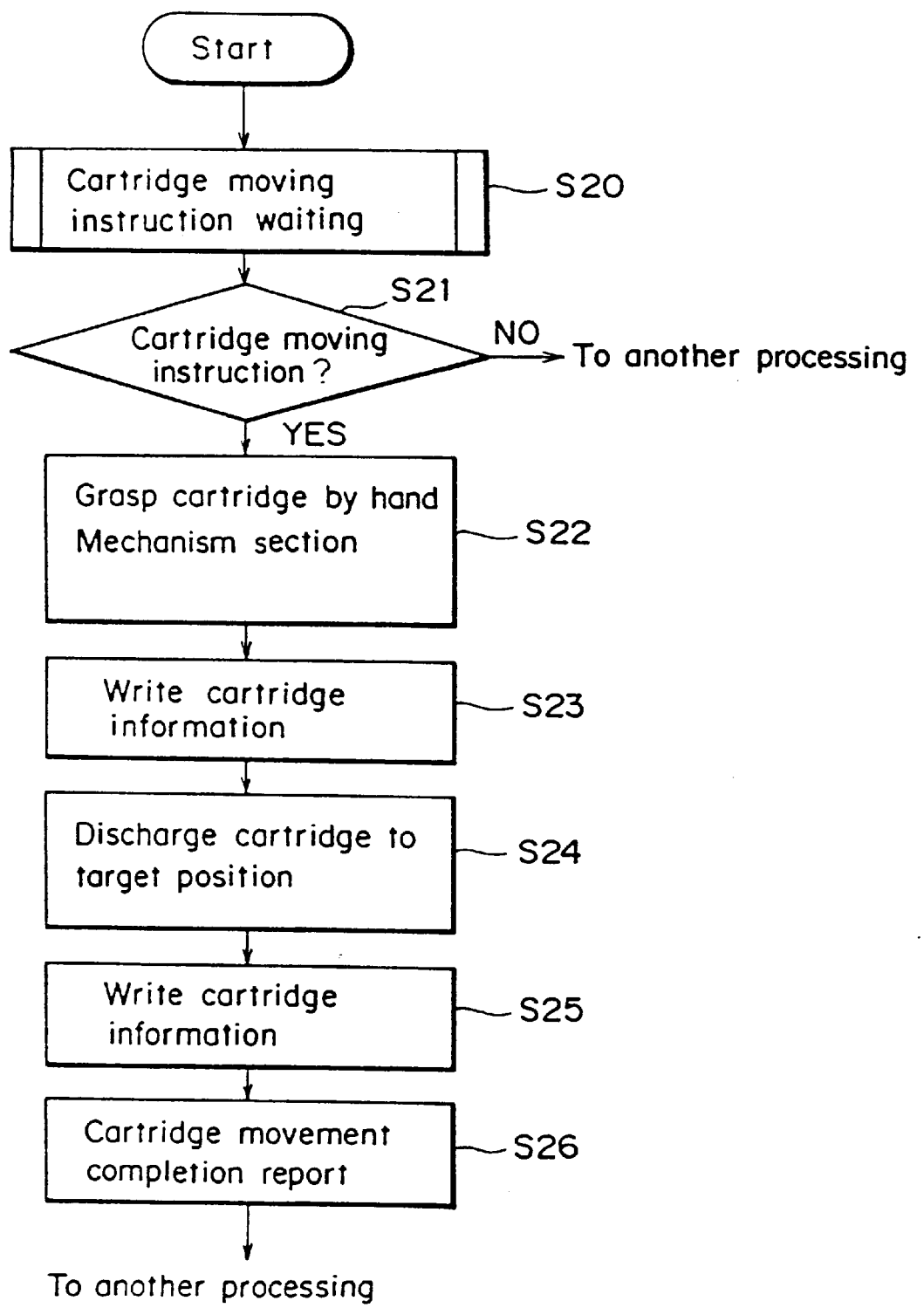

FIGS. 25 and 26 are flow charts illustrating processing of the accessor mechanism controller. The processing of the accessor mechanism controller will be described subsequently with reference to the flow charts. It is to be noted that reference characters S11 to S26 denote processing steps in FIGS. 25 and 26.

1. Description of Initial Diagnosing Processing upon Turning on of the Power (Refer to FIG. 25):

When the power is turned on by the accessor power source section 106 (step S11), the accessor controller 108 executes an initial diagnosis and initialization. Thereupon, in response to an instruction from the accessor controller 108, also the accessor mechanism controller 109 executes an initial diagnosis and initialization. Upon such initial diagnosis, the MPU 116 of the accessor mechanism controller 109 reads out information from the communication memory 114 ("cartridge information" read out from the NOVRAM 145 and written into the communication memory 114 by the MPU 112) (step S12). Then, the MPU 116 determines, from the "cartridge information" thus read out, whether "a cartridge" or "no cartridge" is present in the cartridge transport section 122 (step S13). When the result of the determination is that "a cartridge" is present, the MPU 116 determines, from a detection signal of the cartridge-in sensor 143 provided in the cartridge transport section 122, whether or not presence of a cartridge can be discriminated (step S14). If a cartridge can be discriminated by the processing at step S14, then this means that a cartridge is present in the cartridge transport section 122 and is grasped by the hand mechanism section 125. Accordingly, since this is a normal condition, the MPU 116 executes checking of operation of the accessor while the cartridge is grasped by the hand mechanism section 125 (step S15). When a cartridge cannot be recognized from the detection signal of the cartridge-in sensor 143 by the processing at step S14, this means that a cartridge is present in the cartridge transport section 122 but is not grasped by the hand mechanism section 125. Accordingly, in this instance, since there is the possibility that the apparatus or the cartridge may be damaged, the MPU 116 transmits an error report to the host accessor controller 108 (step S16). Thereafter, the MPU 116 inhibits a subsequent recovering operation of the apparatus in order to prevent otherwise possible damage to the mechanism section and so forth. The error report is received by the MPU 112 of the accessor controller 108, and the MPU 112 thus transmits the error report to the host apparatus 110. On the other hand, when the determination by the processing at step S13 is presence of "no cartridge", the MPU 116 determines, from the detection signal of the cartridge-in sensor 143 of the cartridge transport section 122, whether or not presence of a cartridge can be discriminated (step S17). When no cartridge can be discriminated by the processing at step S17, since this is a normal condition (a condition wherein no cartridge is grasped by the hand mechanism section 125), the MPU 116 executes checking of operation of the accessor in this condition (step S18). Thereafter, the MPU 116 executes some other processing. On the contrary when a cartridge can be discriminated by the processing at step S17, since this signifies "inconsistency of the information", the MPU 116 determines an abnormal condition of the apparatus and transmits an error report to the host accessor controller 108 (step S19). The error report is received by the MPU 112 of the accessor controller 108, and the MPU 112 transmits the thus received error report to the host apparatus 110.

2. Description of Processing upon Movement of Cartridge (upon Normal Operation) (Refer to FIG. 26):

The MPU 116 waits for a cartridge moving instruction from the MPU 112 (step S20), and if no cartridge moving instruction is received (step S21), then the MPU 116 executes some other processing. In this instance, the MPU 112 develops a moving instruction in response to a command from the host apparatus 110. When a cartridge moving instruction is delivered from the MPU 112 of the accessor controller 108 to the accessor mechanism controller 109, the MPU 116 of the accessor mechanism controller 109 receives the instruction. Thereafter, the MPU 116 controls the cartridge transport section 122 to grasp a cartridge by means of the hand mechanism section 125 (step S22). In this instance, after a cartridge is detected by the cartridge-in sensor 143, the cartridge is grasped by the hand mechanism section 125, and then the hand mechanism section 125 is returned to its home position. Thereafter, the cartridge transport section 122 is moved to a target position. After then, the MPU 116 discriminates, from a sensor signal from the cartridge-in sensor 143, the condition of the cartridge grasped by the hand mechanism section 125 and then writes the information of "presence of a cartridge" into the communication memory 114 (step S23). Subsequently, the MPU 116 controls the accessor mechanism section 105 to operate to transport the cartridge by means of the cartridge transport section 122. Then, the cartridge transport section 122 is positioned to the target position, at which the cartridge is thereafter released (accommodated into an accommodation rack of the cartridge storage cell 104) (step S24). Thereafter, the MPU 116 discriminates, from a sensor signal from the cartridge-in sensor 143, the condition of the cartridge released from the hand mechanism section 125 and the writes the information of "presence of no cartridge" into the communication memory 114 (step S25). After the movement of the cartridge is ended, the MPU 116 reports "completion of movement of a cartridge" to the MPU 112 (step S26). The MPU 112 delivers the report to the host apparatus 110. Thereafter, the MPU 112 executes some other processing.

In addition to the construction described above, the present invention can be embodied also in the following manner:

1. The non-volatile memory is not limited to a NOVRAM and may be constituted from some other similar memory.

2. The NOVRAM shown in FIG. 22 may alternatively be provided in the accessor mechanism controller. In this instance, the MPU 116 of the accessor mechanism controller executes reading/writing of data (cartridge information) from/into the NOVRAM.

As described above, the following advantages are exhibited by the magnetic tape library apparatus of the present invention.

1. Upon interruption of the power, "cartridge information" is stored into the non-volatile memory, and then, in initial diagnosing processing upon turning on of the power, sensor information (information of presence or absence of a cartridge) is fetched and compared with the "cartridge information" of the non-volatile memory. Consequently, whether or not a cartridge is grasped by the hand mechanism section of the cartridge transport section, that is, "presence or absence of a cartridge", can always be detected with accuracy. As a result, such an abnormal condition of the apparatus that, for example, a cartridge is not grasped by the hand mechanism section of the cartridge transport section but is caught by or jammed with part of the accessor mechanism section can always be detected with accuracy.

2. Since it can be detected with accuracy whether or not a cartridge is grasped by the hand mechanism section of the cartridge transport section (presence or absence of a cartridge) and an abnormal condition of the apparatus can always be detected with accuracy, when the apparatus is in an abnormal condition, it can be prevented to render the mechanism section operative in error to damage the mechanism section or the cartridge.

Subsequently, another magnetic tape library apparatus according to the present invention will be described. The present embodiment of the invention relates to a magnetic tape library apparatus which can discriminate whether the power is turned on after the power has been turned off normally or the apparatus is rendered operative after the apparatus has been reset as a result of a trouble of the power source such as an excess current, and also to a power source trouble detecting method for the magnetic tape library apparatus.

A subject to be solved of the magnetic tape library apparatus of FIG. 21 described above will be described first. As described above, the power source of the voltage of 24 V is used for the cartridge storage cell 104 and the accessor mechanism section 105 while the power source (controlling power source) of the voltage of 5 V is used for the accessor control section 107. It is assumed that, in the apparatus which employs such power sources, a failure occurs with the circuit system of the cartridge storage cell 104 or the accessor mechanism section 105 which employs the power source of 24 V so that an excess current flows through the circuit system. In this instance, it sometimes occurs due to the power source capacity of the accessor power source section 106 that the power source of 5 V for the accessor controller section 107 drops temporarily. In this instance, since the reset signal generation section 148 (refer to FIG. 22) of the accessor controller 108 normally monitors the controlling power source of the voltage of 5 V, when the controlling power source of 5 V drops below a certain fixed voltage and then rises to the fixed voltage, it outputs a reset signal to the logic circuit, and consequently, the entire apparatus is reset and thus operates in a similar manner as in the case of turning on of the power. Therefore, if the entire apparatus is reset and then it begins to operate normally, then it cannot be discriminated apparently whether or not an excess current has occurred. Or in the worst case, if the mechanism sections are rendered operative for an initial diagnosis after resetting of the apparatus, then an excess current will occur again. Consequently, the entire apparatus is reset and a similar operation is repeated. Therefore, there is the possibility that some other circuit having no relation to the same may fail and the trouble may be expanded.

It is an object of the embodiment of the present invention to solve the subject just described and allow a trouble of the power source such as an excess current to be detected quickly with certainty so as to prevent otherwise possible expansion of the trouble to some other circuit system.

Figure 27:
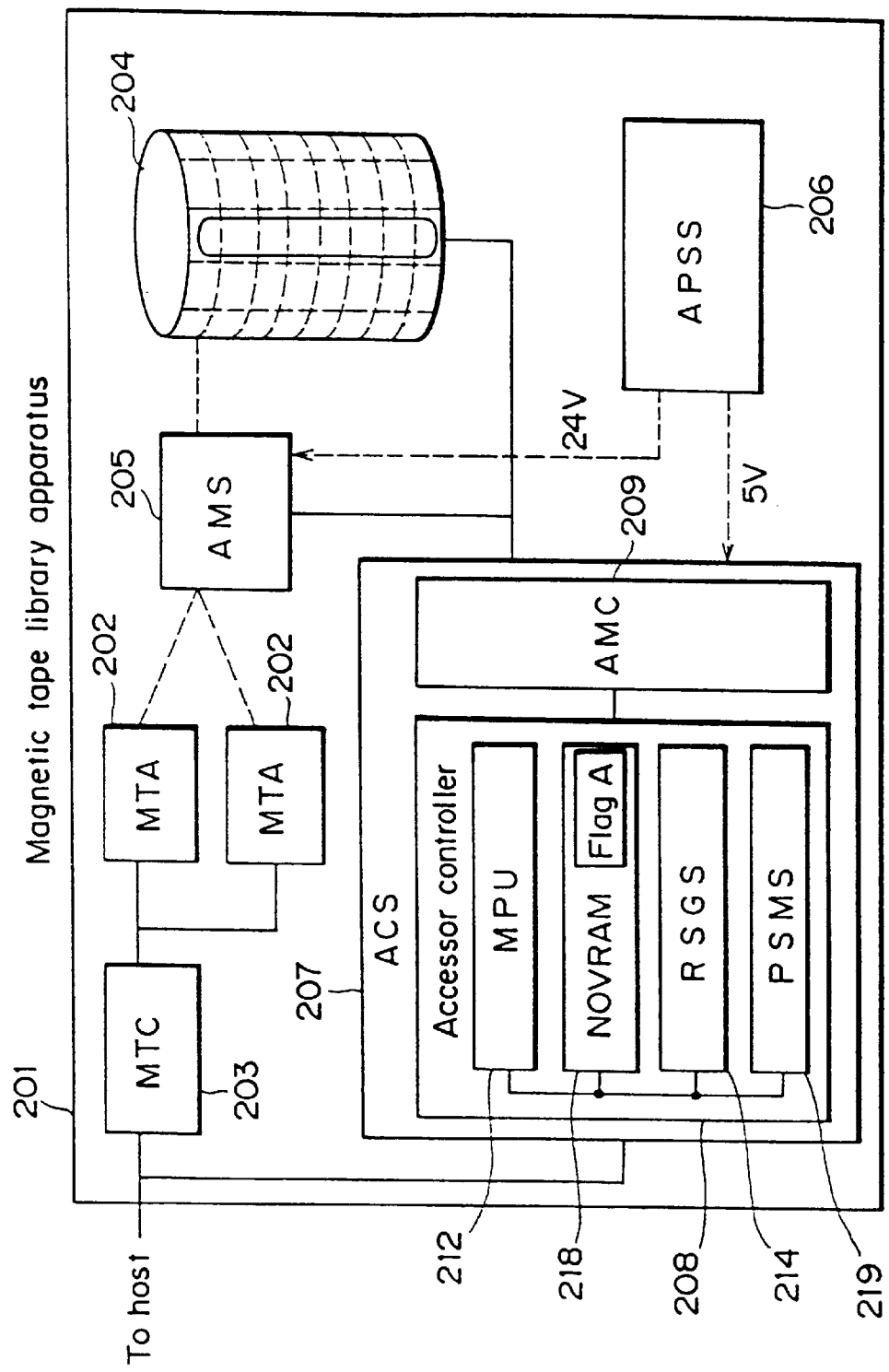
FIG. 27 is a block diagram showing another magnetic tape library apparatus according to the present invention.

FIG. 27 is a block diagram of the magnetic tape library apparatus of the present embodiment of the invention.

In a first form of the magnetic tape library apparatus of the present embodiment, the magnetic tape library apparatus includes a charging/discharging mechanism (not shown) for a cartridge, a cartridge storage cell 204 which can accommodate a plurality of cartridges therein, a plurality of recording/reproducing apparatus (magnetic tape units) 202 for recording and/or reproducing data onto and/or from a cartridge, an accessor mechanism section 205 for transporting a cartridge and accessing the cartridge storage cell 204 and the recording/reproducing apparatus (magnetic tape apparatus) 202, an accessor control section 207 for controlling the accessor mechanism section 205, and an accessor power source section 206 for supplying power to the accessor mechanism section 205, the accessor control section 207 and so forth. The accessor control section 207 includes a non-volatile memory 218 and a processor (MPU) 212 so that it can be discriminated by processing of the processor (MPU) 212 whether the power is turned on again after the power has been turned off normally or the apparatus is rendered operative after the apparatus has been reset by a trouble of the power source such as an excess current. The non-volatile memory 218 stores therein a power monitor flag A for monitoring a power on/off condition of the accessor power source section 206. The processor (MPU) 212 does not access the non-volatile memory 218 when a resetting operation is resulted from a trouble of the power source such as an excess current after turning on of the power of the accessor power source section 206, but places, in response to a detection signal of interruption of the power, data of the power interruption into the power monitor flag A. Then, in an initial diagnosis after turning on of the power, the processor (MPU) 212 checks the power monitor flag A, and if data of the power monitor flag A is not found, then the processor (MPU) 212 places data of turning on of the power into the power monitor flag A, but on the contrary if such data of turning on of the power is found in the power monitor flag A, then the processor (MPU) 212 determines an abnormal condition of the apparatus and executes processing of outputting error information.

In a second form of the magnetic tape library apparatus of the present embodiment, the following processes 1 to 5 are executed by the processor (MPU) 212 in the accessor control section in the first form described above in order to allow discrimination whether the power is turned on again after the power has been turned off normally or the apparatus is rendered operative after the apparatus has been reset by a trouble of the power source such as an excess current.

1. When a resetting operation is caused by a trouble of the power source such as an excess current after turning on of the power to the accessor power source section 206, the processor (MPU) 212 does not access the non-volatile memory 218.

2. When a power interruption detection signal of the accessor power source section 206 is generated, data indicating that the power source has been interrupted is placed into the power monitor flag A of the non-volatile memory 21.

3. In an initial diagnosis after turning on of the power, the processor (MPU) 212 checks the power monitor flag A of the non-volatile memory 218.

4. If data indicating that the power source has been interrupted is set in the power monitor flag A, then the processor (MPU) 212 determines that the apparatus is in a normal condition and places into the power monitor flag A data indicating that the power has been turned on.

5. If data indicating that the power has been turned on is set in the power monitor flag A, then the processor (MPU) 212 determines that the apparatus is in an abnormal condition and outputs error information.

Operation of the present embodiment will be described with reference to FIG. 27. The power monitor flag A is provided in a certain area of the non-volatile memory 218. An accessor controller 203 executes the following processes to detect a trouble of the power source.

1. When the power source (voltage 5 V) of the accessor control section 207 becomes stabilized after turning on of the power to the accessor power source section 206, the reset signal generation section 214 generates a reset signal to a logic circuit (not shown). In response to the reset signal, a resetting operation of the apparatus is started. When a resetting operation is caused by a trouble of the power source such as an excess current, the MPU-212 does not access the non-volatile memory 218.

2. If the power of the accessor power source section 206 is interrupted, the power source monitor section 219 detects the condition and notifies the MPU 212 of the detected condition as an interrupt input to the MPU 212.

3. The MPU 212 discriminates interruption of the power from the interrupt input and immediately places into the power monitor flag A of the non-volatile memory 218 data indicating that the power has been interrupted.

4. After turning on of the power, an initial diagnosis is executed by the MPU 212. In the initial diagnosis, the MPU 212 checks the power monitor flag A of the non-volatile memory 218. If data indicating that the power source has been interrupted is set in the power monitor flag A, then the MPU 212 determines that the apparatus is in a normal condition and places into the power monitor flag A data indicating that the power has been turned on.

5. On the contrary if data indicating that the power has been turned on is set in the power monitor flag A, then the MPU 212 determines that the apparatus is in an abnormal condition and outputs error information.

By executing the processes described above, it can be discriminated whether the power is turned on again after the power has been turned off normally or the apparatus is rendered operative after the apparatus has been reset by a trouble of the power source such as an excess current. As a result, a trouble of the power such as an excess current can be detected quickly with certainty. Further, a repetition of a resetting operation of the apparatus and occurrence of an excess current can be prevented, and expansion of a trouble to some other circuit system can be prevented.

Figure 28:
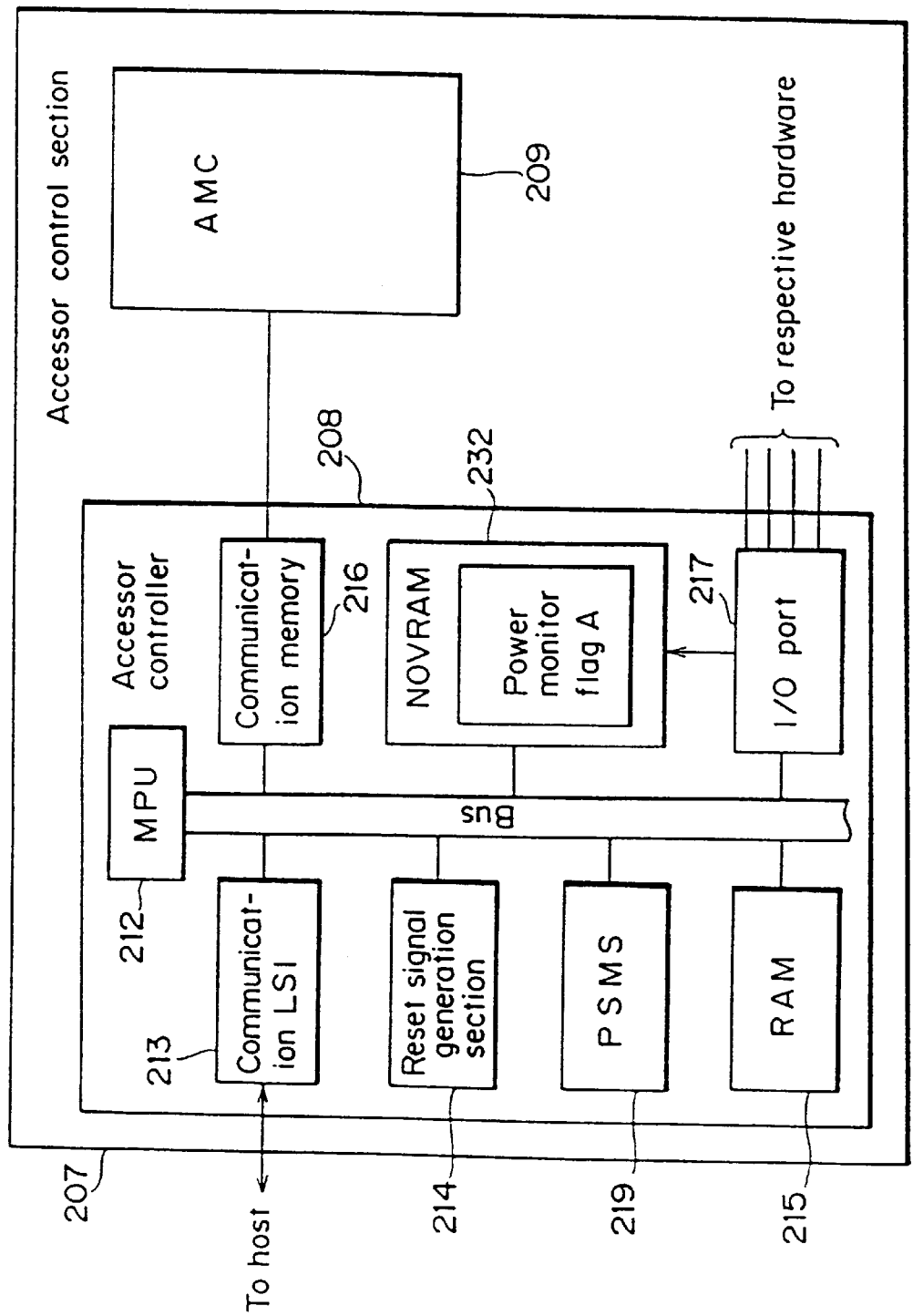
FIG. 28 is a block diagram of an accessor controller of the magnetic tape library apparatus of FIG. 27.

In the following, a detailed construction of the magnetic tape library apparatus of the present embodiment will be described. In particular, an accessor controller and a flag to be set into the non-volatile memory (NOVRAM) will be described with reference to FIG. 28 which is a block diagram of an accessor controller. The accessor controller section 207 includes an accessor controller 208 and an accessor mechanism controller 209. The accessor mechanism controller 209 is similar to the accessor mechanism controller 109 described hereinabove with reference to FIG. 22, and overlapping description thereof is omitted herein to avoid redundancy. Meanwhile, the accessor controller 208 includes an MPU 212, a communication LSI 213, a reset signal generation section 214, a RAM 215, a communication memory 216, an I/O port 217, a NOVRAM 232 and a power source monitor section 219. Of the components, the communication LSI 213, the power source monitor section 219, the communication memory 216, the RAM 215, the I/O port 217 and the reset signal generation section 214 are similar to those of the embodiment described hereinabove with reference to FIG. 22. In the present magnetic tape library apparatus, processing of the MPU 212 is different from that of the embodiment described above using the NOVRAM 232 as a non-volatile memory as described below. Further, an area for setting the power monitor flag A is provided in the NOVRAM 232. The power monitor flag A is used to allow re-writing processing (flag setting processing) by the MPU 212 in the accessor controller 208. The power monitor flag A is set, for example, to data of "0X00" when the power is interrupted, but to data of "0xFF" when the power is turned on. The NOVRAM 232 may be formed from such a NOVRAM as described hereinabove with reference to FIGS. 23A and 23B. Processing (recalling/storing) upon turning on and off of the power where such NOVRAM 232 is provided in the accessor controller 208 shown in FIG. 28 is such as described below:

1. Processing upon Turning off of the Power:

When the power to the accessor power source section 207 is turned off, the power source monitor section 219 in the accessor controller 208 detects the turning off of the power and generates an interrupt signal to the MPU 212 in the accessor controller 208 before the voltage drops. A fixed time is compensated for until the voltage drops. In response to the interrupt signal, the MPU 212 places the data into the power monitor flag of the NOVRAM 232. In this instance, the MPU 212 transmits the data to the NOVRAM 232 so as to be written into an S-RAM of the NOVRAM 232 and transmits a write signal and an address signal to the address control circuit 233. Consequently, the data are written into the S-RAM array. Thereafter, the MPU 212 generates and transmits a store signal to the NOVRAM 232 by way of the I/O port 217. When the store signal is inputted from the I/O port 217 to the NOVRAM 232, a control circuit in the NOVRAM 232 executes control to write (store) data of the S-RAM array into an EEROM array. Consequently, the data (power monitor flag) is stored into the EEROM array of the NOVRAM 232. It is to be noted that the processing upon turning off of the power is ended completely until the voltage drops after the power source monitor section 219 detects the turning off of the power and generates an interrupt signal to the MPU 212.

2. Processing upon Turning on of the Power:

When the power to the accessor power source section 206 (refer to FIG. 27) is turned on and the voltage of the power source becomes stabilized, the reset signal generation section 214 of the accessor controller 208 (refer to FIG. 28) generates a reset signal to the logic circuit. In response to the reset signal, the MPU 212 of the accessor controller 208 executes an initial diagnosis/initialization. Upon such initial diagnosis, the MPU 212 generates and transmits a recall signal to the NOVRAM 232 by way of the I/O port 217. When the recall signal is inputted to the NOVRAM 232, the control circuit of the NOVRAM 232 executes data recalling control. In particular, the control circuit of the NOVRAM 232 executes control to write (recall) data (power monitor flag) stored in the EEROM array into the S-RAM array. Thereafter, the MPU 212 reads out the data from the S-RAM array of the NOVRAM 232 and checks the power monitor flag. Upon such reading out of the data, the MPU 212 transmits a read signal and an address signal to the address control circuit of the NOVRAM 232.

Figure 29B:
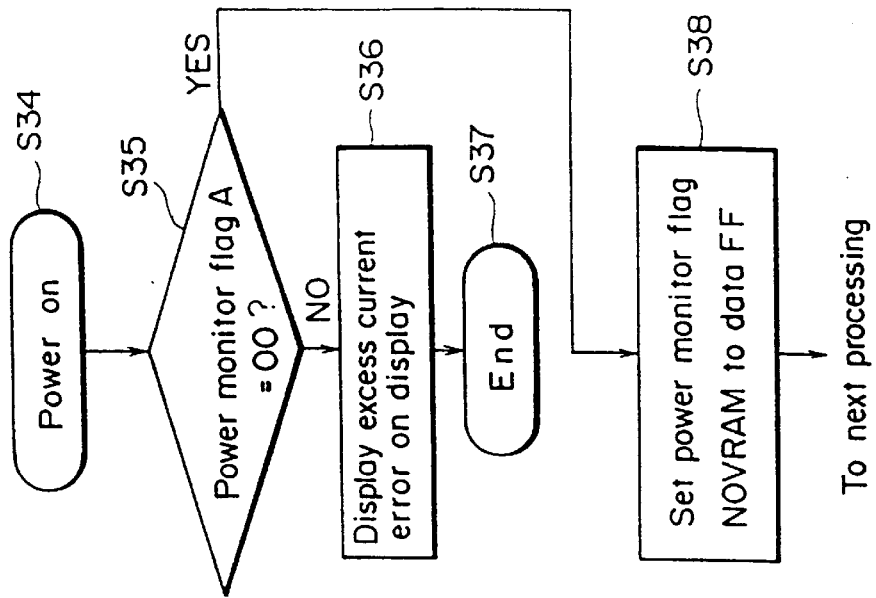
FIGS. 29A and 29B are flow charts illustrating processing of the magnetic tape library apparatus of FIG. 27.
Figure 29A:
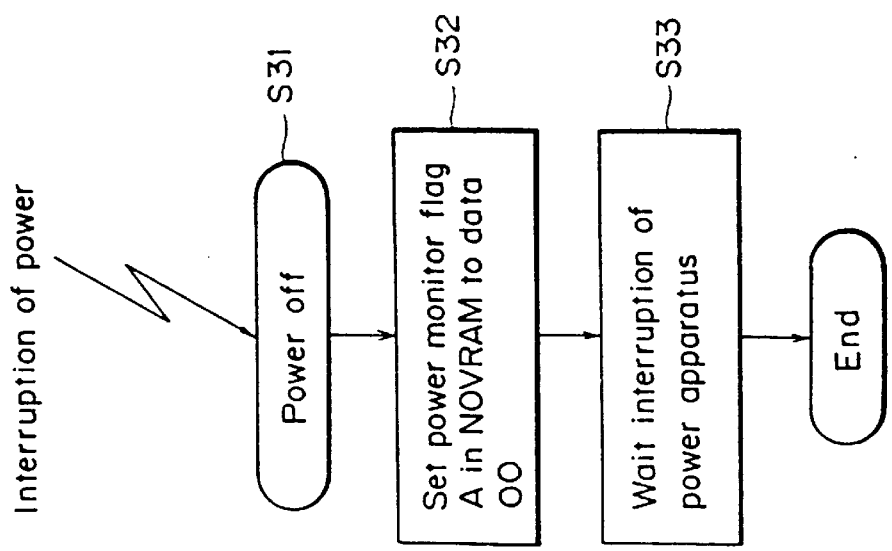

FIGS. 29A and 29B are flow charts of processing of the magnetic tape library apparatus. The processing is executed by the accessor controller 208 in the accessor control section 207. It is to be noted that reference characters S31 to S38 in FIGS. 29A and 29B denote processing steps.

1. Description of Processing upon Turning off of the Power (Refer to FIG. 29A):

When the power to the accessor power source section 206 it turned off (step S31), the power source monitor section 219 detects such turning off of the power. Then, the power source monitor section 219 generates an interrupt signal to the MPU 212 and notifies the MPU 212 of the detection of the power interruption of the interrupt signal. When such interruption occurs, the MPU 212 places, in its interrupt processing, data (for example, 0x00) indicating that the power source has been interrupted, into the power monitor flag A of the NOVRAM 232 (step S32). Then, the MPU 212 waits until the power is interrupted (step S33).

2. Description of Processing upon Turning on of the Power (Refer to FIG. 29B):

When the power to the accessor power source section 206 is turned on (step S34), the reset signal generation section 214 in the accessor controller 208 monitors that the voltage (5 V) is stabilized, and after the voltage (5 V) is stabilized, the reset signal generating circuit 214 generates a reset signal to the logic circuit. In response to the reset signal, the MPU 212 executes initial diagnosing processing for activation of the apparatus. In such initial diagnosing processing, the MPU 212 checks the power monitor flag A of the NOVRAM 232 (step S35). If the result of the check reveals that data (for example, 0x00) indicating that the power has been interrupted is set in the power monitor flag A, the MPU 212 determines that the power has been turned off regularly and then turned on again, and then executes next processing (step S38). In the processing (step S38), the MPU 212 sets the power source flag A of the NOVRAM 232 to data (for example, 0xFF) indicating that the power has been turned on. Then, the MPU 212 thereafter executes normal processing. On the other hand, if the result of the checking of the power monitor flag A reveals that data (for example, 0xFF) indicating that the power has been turned on is set in the power monitor flag A, this means that a trouble of the power source such as an excess current occurs during operation of the apparatus so that the apparatus is reset. In this instance, the MPU 212 determines that the apparatus is in an abnormal condition, and causes a display section of an operator panel to display an error display (step S36), thereby ending the present processing (step S37). It is to be noted that, when a trouble of the power source by an excessive current occurs after putting on of the power, a resetting operation of the apparatus takes place, but when such resetting operation takes place, the MPU 212 does not execute accessing to the NOVRAM 232 and leaves the power monitor flag A as it is. By virtue of the processing described above, the MPU 212 can discriminate, by checking the power monitor flag A of the NOVRAM 232 after the power is turned on, whether the power is turned on after the power has been turned off normally or the apparatus is rendered operative after the apparatus has been reset by an excess current or some other cause.

As described above, according to the present embodiment of the invention, the following advantages can be anticipated:

1. It can be detected with certainty that the apparatus has been reset by a trouble of the power source such as an excess current. Further, repetitions of occurrence of a trouble of the power source such as an excess current and a resetting operation can be prevented.

2. A trouble of the power source such as an excess current can be detected quickly with certainty. Accordingly, expansion of the trouble of the power can be prevented.

Subsequently, an embodiment of the present invention wherein an abnormal condition (excess current) is detected upon driving of a motor will be described. The present embodiment of the invention relates generally to various apparatus which employs a motor such as magnetic tape apparatus, magnetic tape library apparatus and magnetic disk library apparatus, and more particularly to a motor driving control circuit for detecting an abnormal condition (excess current) upon driving of a motor employed in those apparatus to control the current of a driver circuit for the motor.

In such an apparatus which employs a motor as described above, when the motor of a large size is to be driven or the speed of the motor is to be limited to a certain fixed level within a short time, much current is required although depending upon the driving torque of the motor. Then, when the current supplied to the driver circuit for the motor becomes excessively high (when an excess current flows), it is required to stop the current flow through the motor quickly for the prevention of damage to the circuitry and for the countermeasure for safety. To this end, a protect circuit which stops the current to be supplied to the motor when an excess current is detected is employed conventionally. When the protect circuit detects an excess current, the power is turned off by such means as, for example, a relay. However, where a relay is employed, a considerable time is required before it turns off the power. In particular, since a relay requires a predetermined contact release time (delay time) for releasing of its contact, the current will continue to flow for a time until the relay is turned off. Or, when, for example, a filter is provided in the circuitry in order to prevent a malfunction by noise or some other cause, the filter acts as a delay circuit. In this instance, for the period of the delay by the filter, the current continues to flow, which may result in damage to a power transistor or the motor driver circuit. Accordingly, when an excess current is detected, it is required that the supply of current be stropped immediately.

Figure 30:
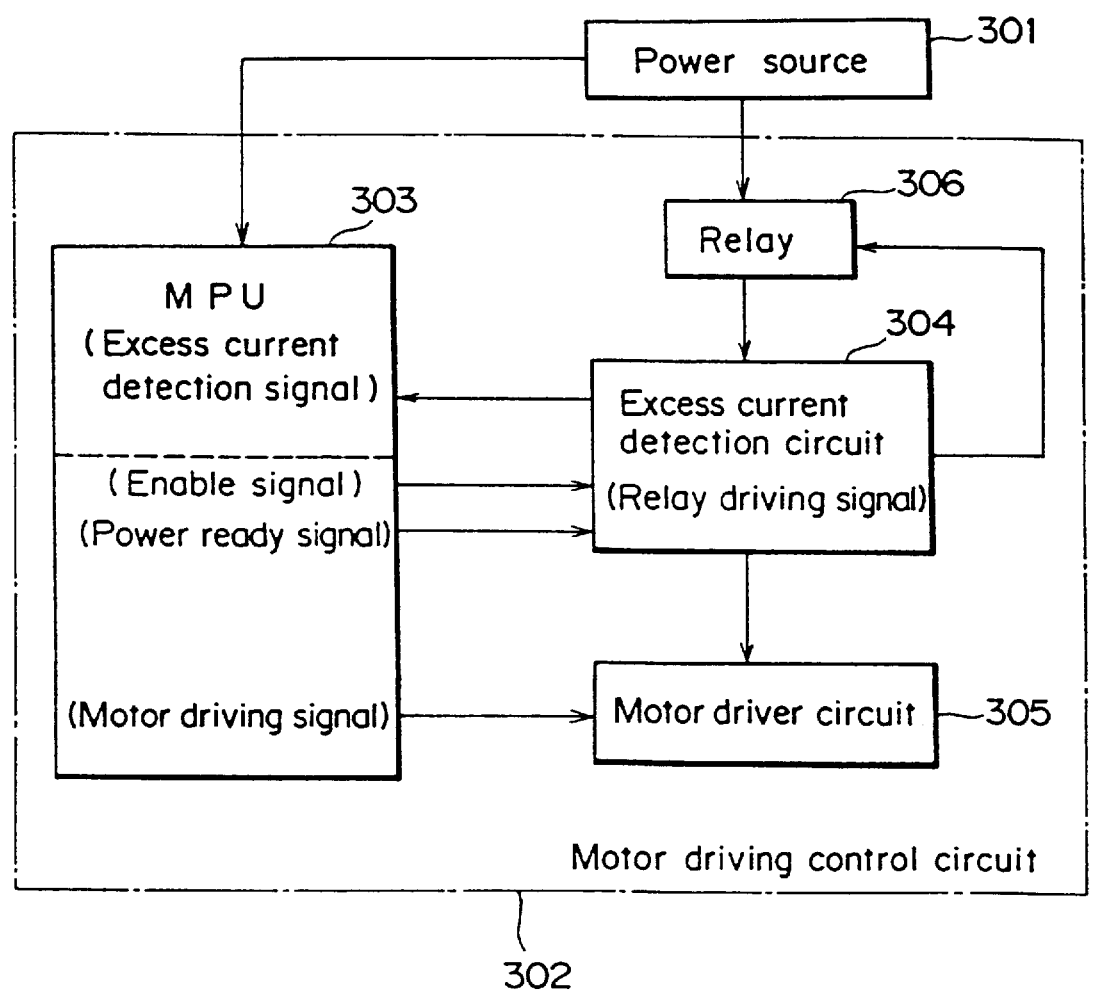
FIG. 30 is a block diagram of a conventional motor driving control circuit.
Figure 31:
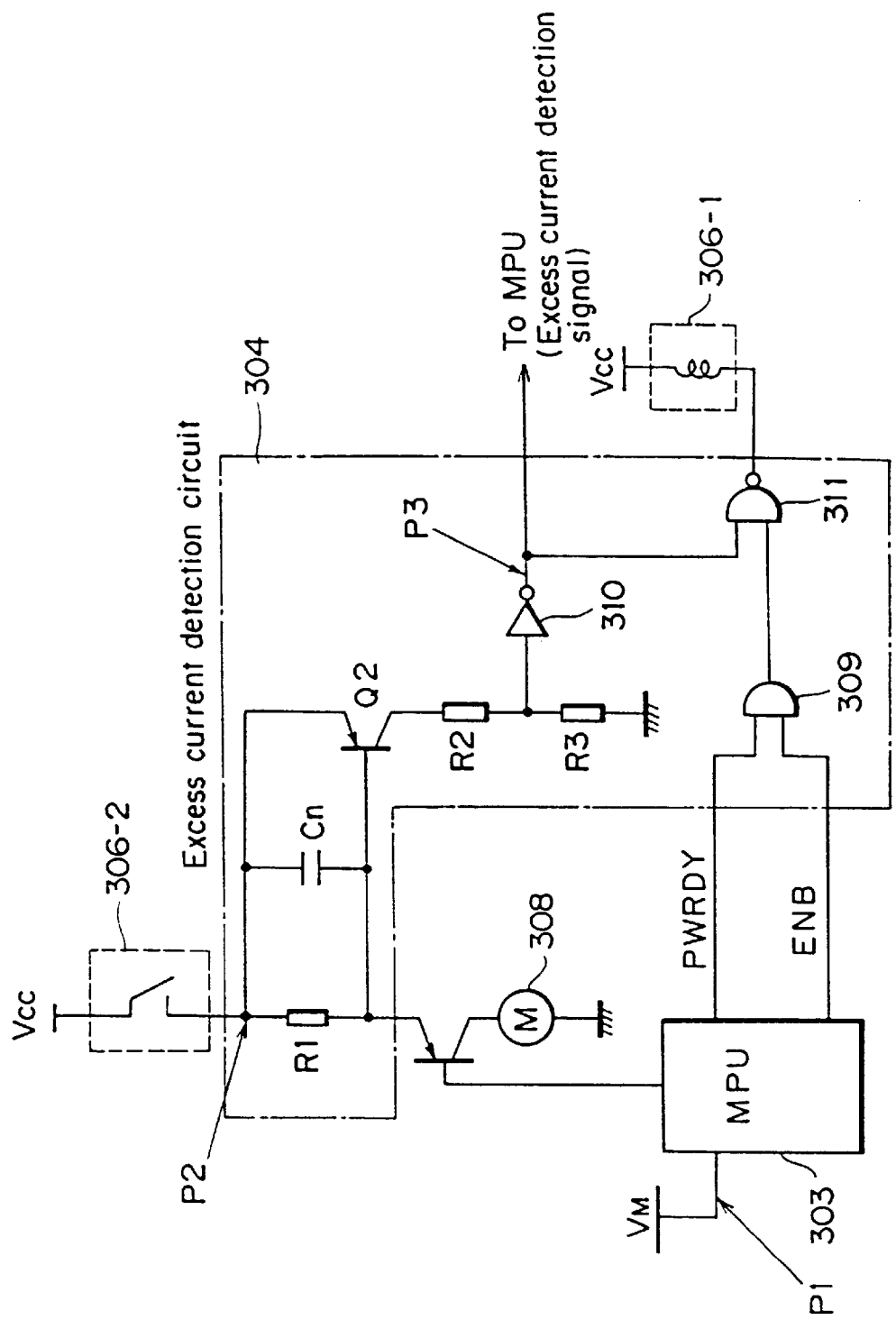
FIG. 31 is a circuit diagram showing a detailed construction of the motor driving control circuit of FIG. 30.
Figure 32:
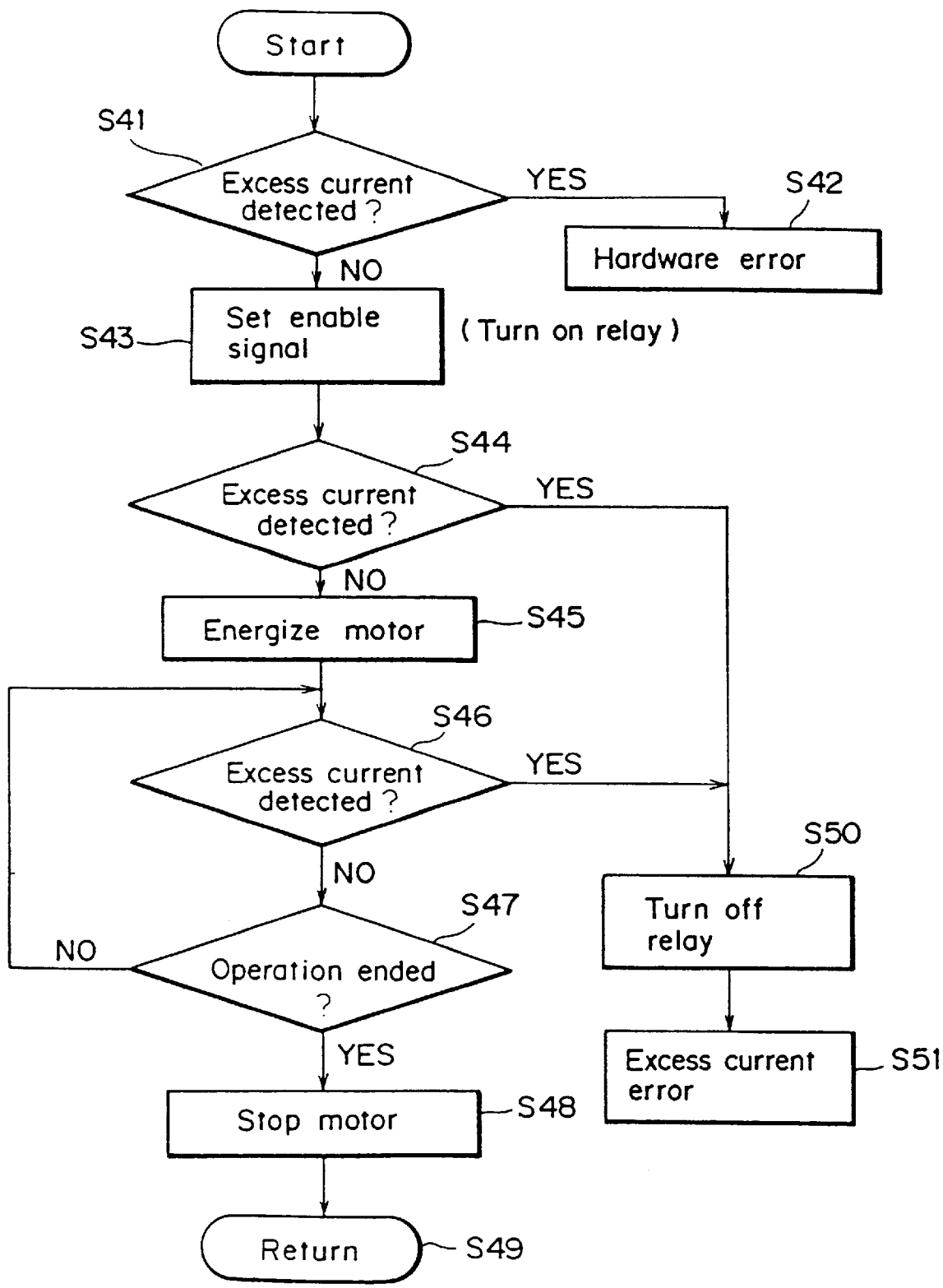
FIG. 32 is a flow chart illustrating processing of an MPU of the motor driving control circuit of FIG. 30.

FIGS. 30 to 32 show an exemplary one of conventional motor driving control circuits. Referring to FIGS. 30 to 32, reference numeral 301 denotes a power source, 302 a motor driving control circuit, 303 an MPU (microprocessor), 304 an excess current detection circuit, 305 a motor driver circuit, 306 a relay, 306-1 a relay coil, 306-2 a relay contact, 308 a motor (M), 309 an AND circuit, 310 an invertor, 311 a NAND circuit, reference characters Q1 and Q2 denote each a transistor, reference character R1 denotes an excess current detecting resistor, reference characters R2 and R3 denote each a resistor, reference character Cn denotes a noise preventing capacitor, and reference characters $V_M$ and Vcc denote voltages of the power.

Description of Motor Driving Control Circuit with Reference to Block Diagram (Refer to FIG. 30)

FIG. 30 is a block diagram of the motor driving control circuit. Referring to FIG. 30, the motor driving control circuit shown includes an MPU 303, an excess current detection circuit 304, a motor driver circuit 30 5 and a relay 306. The motor driving control circuit 302 is provided with power from a power source 130. The MPU 303 executes various controls upon starting of a motor (not shown) in the motor driving control circuit 302, and the motor driver circuit 305 drives the motor. The excess current detection circuit 304 detects an excess current flowing through the motor driver circuit 305. The relay 306 switches on/off a power source circuit of the motor driver circuit 305. The MPU 303 supplies a "motor driving signal" for driving the motor to the motor driver circuit 305, and the excess current detection circuit 304 transmits an "excess current detection signal" to the MPU 303 upon detection of an excess current. Further, an "enable signal ENB" and a "power ready signal PWRDY" for controlling the relay 306 are transmitted from the MPU 303 to the excess current detection circuit 304, and a "relay driving signal" for driving the relay 306 is transmitted from the excess current detection circuit 304 to the relay 306.

Description of the Motor Driving Control Circuit (Refer to FIG. 31)

FIG. 31 shows an exemplary construction of the motor driving control circuit. Referring to FIG. 31, in the motor driving control circuit shown, the motor driver circuit 305 includes a transistor Q1. The relay 306 includes a relay coil 306-1 and a relay contact 306-2. The excess current detection circuit 304 includes a transistor Q2, an excess current detecting resistor R1, a pair of resistors R2 and R3, a noise preventing capacitor Cn, an invertor 310, an AND circuit 309, and a NAND circuit 311. The excess current detecting resistor R1 is provided to detect an excess current flowing to the transistor Q1 of the motor driver circuit 305. The AND circuit 309 logically ANDs an "enable signal ENB" and a "power ready signal PWRDY" transmitted thereto from the MPU 202 and outputs a result of the ANDing.

Description of Processing of the MPU (Refer to FIG. 32)

FIG. 32 is a flow chart illustrating processing of the MPU in the motor driving control circuit. In the following, processing of the MPU will be described with reference to the flow chart. It is to be noted that reference characters S41 to S51 in FIG. 32 denote processing step numbers.

1. The MPU 303 checks, before it turns on the relay 306, to discriminate whether or not an excess current detection signal is outputted from the excess current detection circuit 304 (step S41). In this instance, since the relay 306 is not yet in an on-state, if an excess current detection signal is outputted from the excess current detection circuit 304, then the MPU 303 determines an error of the hardware and executes processing for such hardware error (step S42).

2. On the other hand, when no excess current detection signal is outputted from the excess current detection circuit 304, the MPU 303 sets an enable signal ENB, that is, outputs the enable signal ENB to the excess current detection circuit 304 to turn on the relay 306 (step S43).

3. Subsequently, the MPU 303 checks the excess current detection signal again to determine that there is no short-circuiting (step S44). It is to be noted that the motor 308 is in a rest condition then.

4. If the checking of the excess current detection signal reveals that there is no abnormal condition in the motor driving control circuit, then the MPU 303 outputs a motor driving signal. In response to the motor driving signal, the motor 308 is driven by the transistor Q1 of the motor driver circuit 305 (step S45). Consequently, the motor 308 is rotated.

5. Subsequently, the MPU 303 checks the excess current detection signal yet again to determine that there is no abnormal condition in the motor driving control circuit (step S46).

6. Thereafter, the MPU 303 delivers a motor stopping instruction to the transistor Q1 of the motor driver circuit 305 (step S47). Consequently, the transistor Q1 is turned off to stop the motor 308 (step S48). On the other hand, if no motor stopping instruction is developed, the control sequence returns to the processing at step S46 to check the excess current detection signal. It is to be noted that, in this instance, the MPU 303 receives a command from a host control equipment and develops an instruction to stop or drive the motor.

7. When the MPU 303 detects an excess current detection signal at step S46, the MPU 303 outputs a control signal ENB for turning off the relay 306 to the excess current detection signal 304. In response to the control signal ENB, the excess current detection circuit 304 turns off the exciting current to the relay coil 306-1 to open the relay contact 306-2 to interrupt the current flowing through the motor driver circuit 305 (step S50).

8. When the excess current detection circuit 304 detects an excess current at step S44 or S46, it reports to the MPU 303 that an abnormal condition (excess current) has occurred. Upon reception of such report of an abnormal condition from the excess current detection circuit 304, the MPU 303 first resets the enable signal ENB and then causes an error display to be displayed (step S51).

Figure 33:
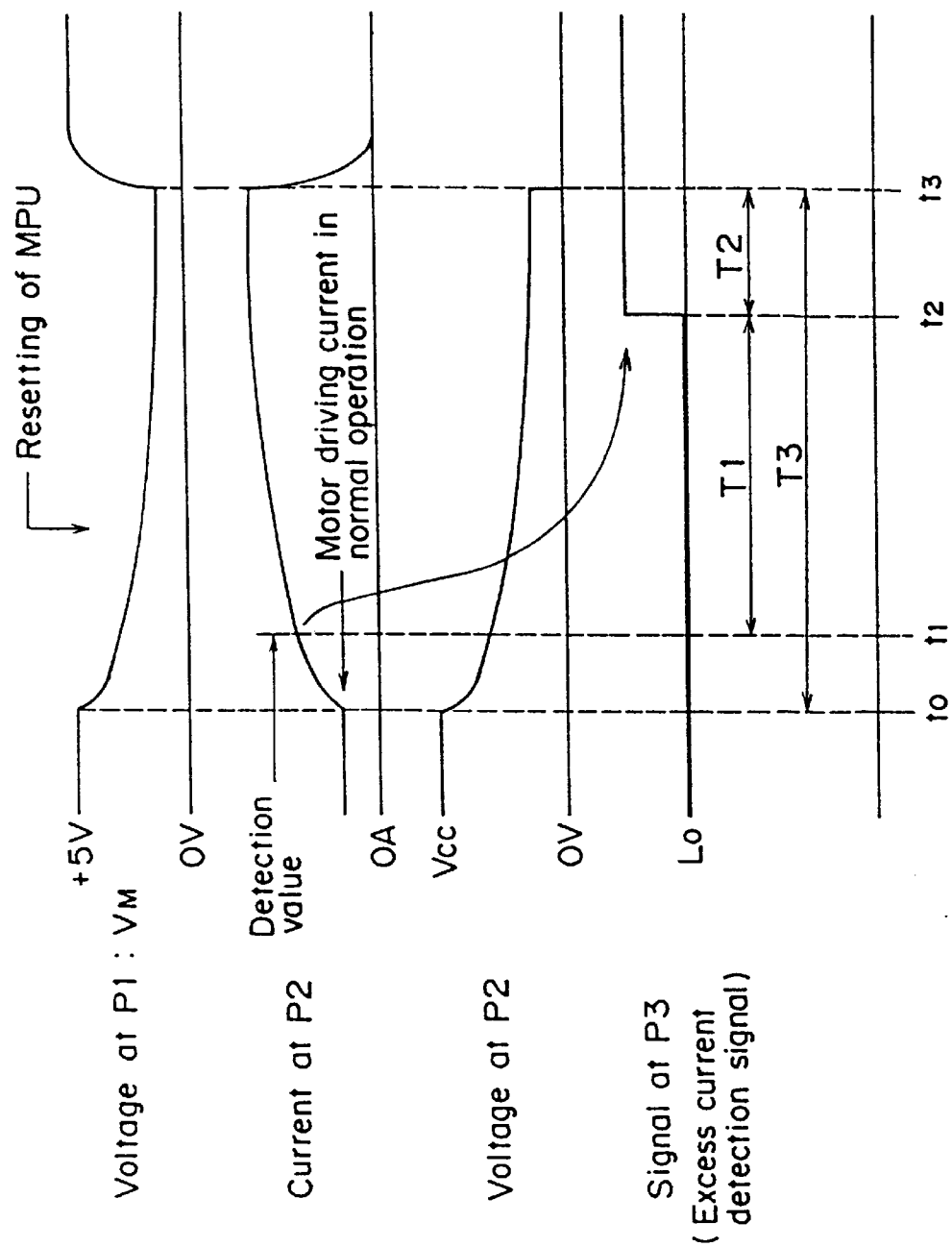
FIG. 33 is a timing chart illustrating operation of the motor driving control circuit of FIG. 30.

Description of Operation with Reference to the Timing Chart (Refer to FIG. 33)

FIG. 33 is a timing chart illustrating operation of the motor driving control circuit. Reference characters $t_0$ to $t_3$ denote each a point of time, and P1 to P3 denote points shown in FIG. 31. Further, reference character T1 denotes an excess current detection time, T2 a relay release time, and T3 a time for which an excess current flows. In the following, operation upon detection of an excess current will be described with reference to the timing chart of FIG. 33. It is assumed now that the motor 308 is being energized and an excess current flows through the motor 308. The time is denoted at $t_0$. The current at the point P2 thereafter increases, and the time at which a detection value for an excess current is reached is denoted at $t_1$. At and after the point of time $t_1$, the excess current detection circuit 304 determines that an excess current flows, and enters into an operation to turn off the relay 306. Then, if the time at which the excess current detection signal thereafter changes over from a low level to a high level is denoted at $t_2$, then the interval of time from ti to $t_2$ is an excess current detection time $T_1$ of the excess current detection circuit 304. In this instance, the time T1 depends upon the excess current detection value and the capacitance of the noise preventing capacitor Cn (several tens ms). Further, if the relay contact 306-2 is turned off after the excess current detection circuit 304 detects the excess current and turns off the relay driving signal is denoted at $t_3$, then the interval of time from $t_2$ to $t_3$ is a relay release time T2. Accordingly, the interval of time for which an excess current actually flows is a time T2 from $t_0$ to $t_3$. While also the voltage at the point P2 drops for the time from $t_0$ to $t_3$, as such drop of the voltage proceeds, also the voltage at the point P1 (voltage to be supplied to the MPU 303) drops. Consequently, before the relay 306 is turned off, the MPU 303 is reset.

The conventional motor driving control circuit of such construction described above has the following subjects to be solved:

1. In the conventional motor driving control circuit 302, the relay 306 for turning off the current source to the motor and the excess current detecting resistor R1 are interposed between the power source 301 and the motor driver circuit 305 to convert the current flowing through the excess current detecting resistor R1 into a voltage. In short, when a current flows through the excess current detecting resistor R1, a voltage appears between the opposite ends of the resistor R1, and the voltage is applied between the base and the emitter of the transistor Q2. The resistance of the resistor R1 is determined so that, when the voltage becomes equal to a voltage at which the transistor Q2 is turned on, an excess current is detected to set an excess current value. However, in order to prevent a malfunction from being caused by noise or some other cause, the noise preventing capacitor Cn is connected between the base and the emitter of the transistor Q2 so that some delay of time may be provided before an excess current is detected. Further, the relay contact is turned off after an excess current is detected, and since the relay 306 has some relay contact release time, a further delay of time is provided before stopping of the current. Accordingly, even after an excess current is detected, the excess current will continue to flow for a certain period of time. As a result, the voltage of the power source 301 drops or sometimes the motor driver circuit 305 is damaged.

2. The power source 301 is sometimes constructed so as to provide a plurality of different power source voltages (for example, 12 V and 5 V) by means of a single power source unit. In such an instance, drops of power source voltages which occur upon occurrence of an excess current have a bad influence upon circuit portions for which the power source is used. In the conventional motor driving control circuit described above, the voltages Vcc and $V_M$ are supplied from the single power source 301. Accordingly, if an excess current occurs, not only the voltage Vcc drops, but also the power source voltage $V_M$ to the MPU 303 drops. As a result, the MPU 303 is reset, which makes recovery after detection of an excess current impossible.

3. Meanwhile, since the excess current detecting resistor R1 is interposed in series between the power source 301 and the motor driver circuit 305, the loss at the resistor R1 is high.

4. If it is tried to set the excess current detection value to a high value, then it is necessary to reduce the resistance of the excess current detecting resistor R1, and accordingly, a resistor having a large outer shape is required. On the contrary, if it is tried to set the excess current detection value to a low value, then it is necessary to set the resistance of the excess current detection resistor R1 to a high value, and consequently, the voltage drop across the resistor R1 is increased and also the loss by the resistor R1 is increased.

An embodiment of the present invention described below is provided to solve such subjects of the conventional motor driving control circuit described above and control, when an abnormal condition occurring with a motor or a motor driver circuit is detected, the current to be supplied to the motor driver circuit immediately so that otherwise possible damage to the motor driver circuit and so forth may be prevented.

Figure 34:
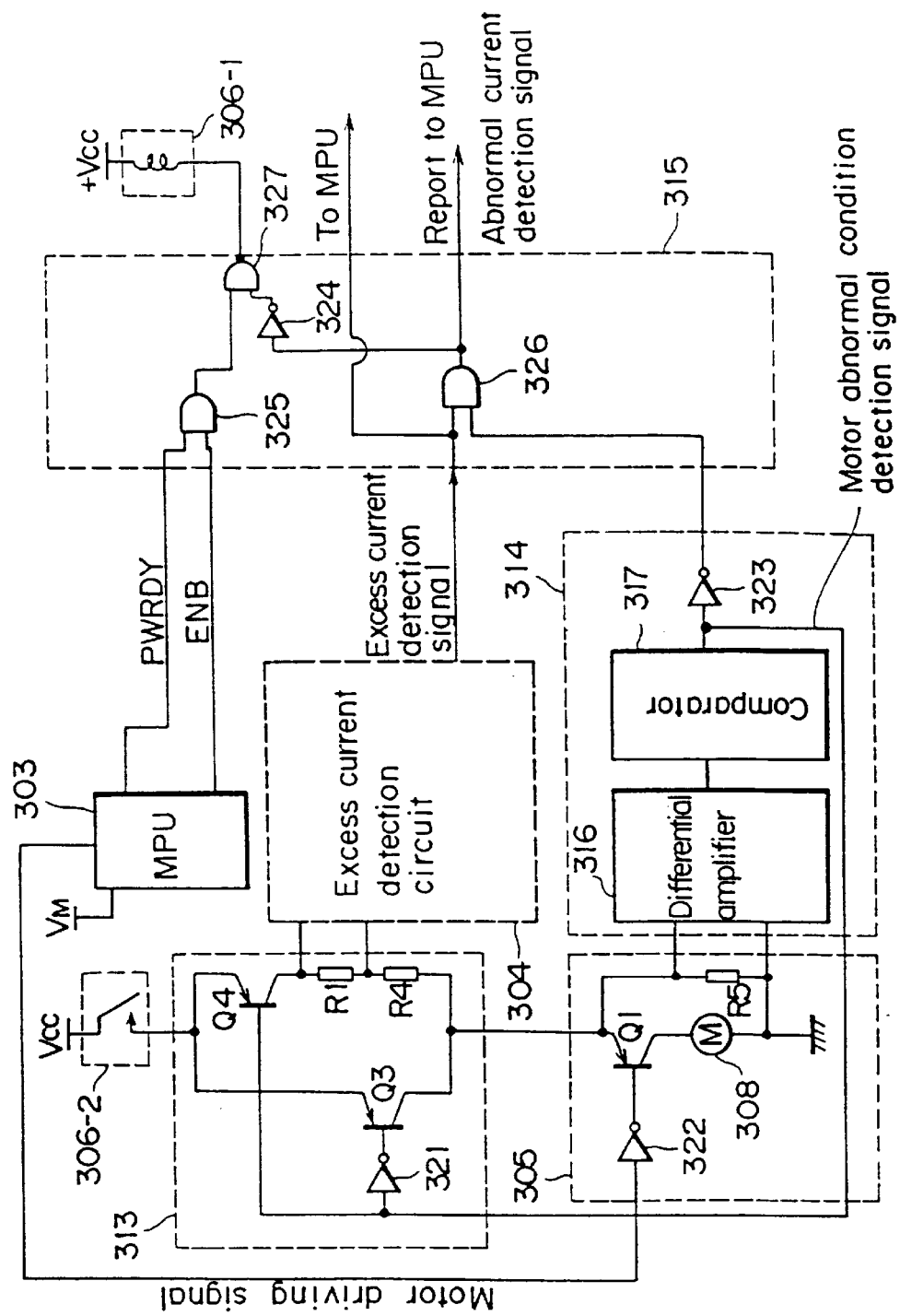
FIG. 34 is a block circuit diagram of a motor driving control circuit according to the present invention.

FIG. 34 is a block diagram of a motor driving control circuit in the embodiment of the present invention.

In a first form of the motor driving control circuit of the present invention, it includes a processor 303 which executes various controls upon driving of a motor 308, a motor driver circuit 305 for receiving power from a dc power source Vcc and driving the motor 308 in response to an instruction (motor driving signal) of the processor 303, a relay 306-2 for opening or closing a power source circuit of the motor driving circuit 305, a motor abnormal condition detection circuit 314 connected to the motor driver circuit 305 for detecting an abnormal condition of the motor 308 or the motor driver circuit 305 and outputting a motor abnormal condition detection signal, a current control circuit 313 connected between the relay 306-2 and the motor driver circuit 305 for controlling the current flowing through the motor driving circuit 305 in response to a motor abnormal condition detection signal, an excess current detection circuit 304 connected to the current control circuit 313 for detecting that the current flowing through the motor driver circuit 305 is increased to an excess current and outputting an excess current detection signal, and an abnormal current monitor circuit 315 for monitoring a motor abnormal condition detection signal, an excess current detection signal and control signals PWRDY and ENB from the processor 303 and controlling the relay 306 to be turned on or off.

In a second form which is a limited form of the first form, the motor driver circuit 305 includes a motor abnormal condition detecting resistor R5 connected in parallel to the motor 308 for detecting an abnormal condition of the motor 308 or the motor driver circuit 305, and the motor abnormal condition detection circuit 314 includes converting means 316 for converting a voltage appearing across the motor abnormal condition detecting resistor R5 into a corresponding voltage value, and comparison means 317 for comparing a voltage converted by the converting means 316 with a preset reference value. The comparison means 317 outputs a motor abnormal condition detection signal.

In a third form which is another limited form of the first form, the current control circuit 313 includes a pair of switching elements or transistors Q3 and Q4 which are controlled so that one of them presents an on-state while the other presents an off-state in response to a motor abnormal condition detection signal, and an excess current detecting resistor R1 and a current controlling resistor R4 connected in series to the switching element Q4. The two switching elements or transistors Q3 and Q4 are connected in parallel to each other. The excess current detecting resistor R1 is provided to detect an excess current flowing through the circuitry. The current controlling resistor R4 is provided to control the current to flow through the motor driver circuit 305.

In a fourth form which is a further limited form of the first form, when an abnormal condition of the motor 308 or the motor driver circuit 305 is detected by the motor abnormal condition detection circuit 314, the current flowing through the motor driver circuit 305 is not interrupted, but the current control circuit 313 is changed over, in response to a motor abnormal condition detection signal outputted from the motor abnormal condition detection circuit 314, into a current control mode in which the current to flow through the motor driver circuit 305 is attenuated.

In a fifth form which is a still further limited form of the first form, when the abnormal current monitor circuit 315 detects a motor abnormal condition detection signal from the motor abnormal condition detection circuit 314 and an excess current detection signal from the excess current detection circuit 304 at a time while the motor 308 is being driven by the motor driver circuit 305, the relay 306 is turned off by the abnormal current monitor circuit 315 to interrupt the current to flow through the motor driver circuit 305.

Operation of the embodiment described above will be described subsequently with reference to FIG. 34. If an excessive current begins to flow through the motor 308 or the motor driver circuit 305 while the motor 308 is being driven by the motor driver circuit 305, then an motor abnormal condition detection signal, which is outputted from the comparator 317, is changed over to a low level Lo. Further, in this instance, the output of an invertor 323 is changed over to a high level Hi. Further, when the motor abnormal condition detection signal is changed over to the low level Lo, the transistor Q4 which is a switching element in the current control circuit 313 is turned on while the other transistor Q3 is turned off so that a current control mode is entered immediately. In the current control mode, the current to flow through the motor driver circuit 305 is limited to a preset current value by the current controlling resistor R4. If the excess current detection circuit 304 detects an excess current in the current control mode, then the excess current detection signal is changed over to the high level (low level Lo in the inside of the excess current detection circuit). In this instance, in the abnormal current monitor circuit 315, since both of the motor abnormal condition detection signal and the excess current detection signal are at the high level Hi, the relay driving signal is turned off thereby to interrupt the current to the motor driver circuit 305.

In this manner, after an abnormal condition (excess current) of the motor 308 or the motor driver circuit 305 is detected, a current control mode is entered immediately to limit the current to the motor driver circuit 305. On the other hand, when an excess current is detected by the excess current detection circuit 304 in the current control mode, the abnormal current monitor circuit 315 turns off the relay 306 to interrupt the supply of current to the motor driver circuit 305. In other words, when an abnormal condition (excess current) is detected, it is determined whether an excess current caused by noise is detected while the current flowing through the motor driver circuit 305 is decreased or an excess current actually caused by an abnormal condition of the motor driver circuit 305 or short-circuiting of the motor 308 or some other cause is detected. Then, when an excess current caused by noise is detected (in the case of a malfunction), the current is returned to its normal value immediately, but on the contrary when an excess current caused by an actual trouble is detected, the current supply to the motor driver circuit 305 is stopped. Accordingly, since an excess current can be detected accurately and the time for which an excess current flows through the motor driver circuit 305 can be decreased irrespective of an operation time of a relay, otherwise possible damage to the motor 308 or the motor driver circuit 305 can be prevented. Further, when an excess current flows, the power source voltage VM to the MPU 303 is dropped but not to such a level sufficient to cause resetting.

In the following, more detailed constructions of the motor driving control circuit will be described. FIGS. 35 to 40B show a first construction of the motor driving control circuit. In FIGS. 35 to 40B, same or substantially corresponding elements to those of FIGS. 30 to 34 are denoted by same reference characters. Further, reference numeral 319 denotes an operational amplifier, reference numerals 325 and 326 denote each an AND circuit, and reference numeral 327 denotes a NAND circuit.

Figure 35:
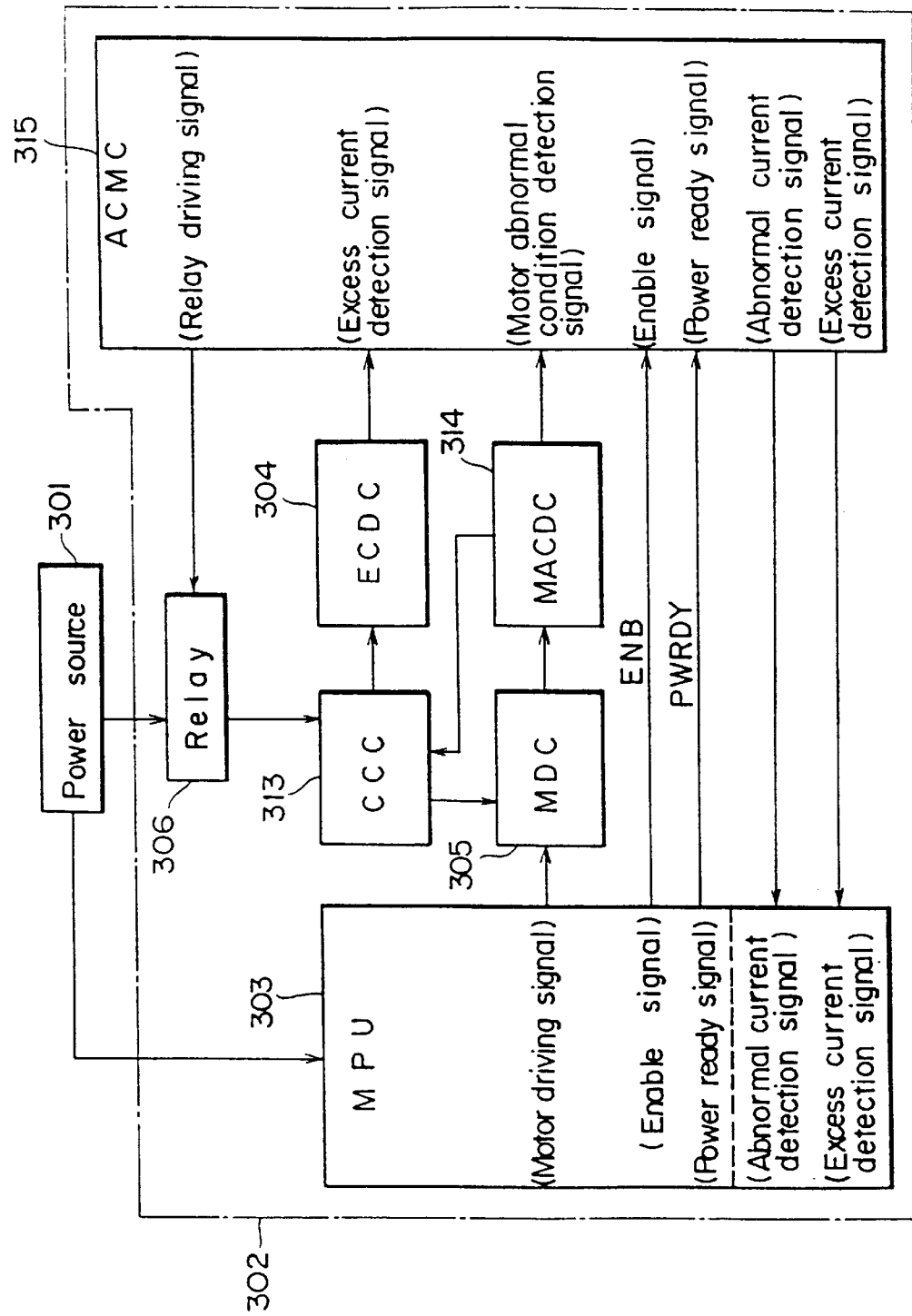
FIG. 35 is a block diagram of the motor driving control circuit of FIG. 34.

Description of the Motor Driving Control Circuit with Reference to the Block Diagrams (Refer to FIG. 35)

FIG. 35 is a block diagram of the motor driving control circuit. Referring to FIG. 35, the motor driving control circuit 302 shown includes an MPU (microprocessor) 303, an excess current detection circuit 304, a motor-driver circuit 305, a relay 306, a current control circuit 313, a motor abnormal condition detection circuit 314 and an abnormal current monitor circuit 315. The motor driving control circuit 302 is supplied with power from a power source 301.

The power source 301 is a power source (power source unit) for supplying power to the components (including a motor) of the motor driving control circuit 302 and generates a plurality of different voltages (for example, 5 V and 12 V). The relay 306 turns on/off a power source circuit of the motor driver circuit 305 and is controlled in response to a relay driving signal from the abnormal current monitor circuit 315. The MPU 303 is a processor which executes various controls of the motor driving control circuit 302, and controls a motor driving signal for driving the motor, an enable signal ENB for turning on/off the relay 306, and a power ready signal PWRDY. Further, when the MPU 303 is to execute such processing, it receives an abnormal current detection signal and an excess current detection signal (signals detected by the excess current detection circuit 304) transmitted thereto from the abnormal current monitor circuit 315. The excess current detection circuit 304 detects an excess current flowing through the motor driver circuit 305 and detects that a fixed current (excess current) has flowed as a result of short-circuiting at the motor driver circuit 305 or some other circuit section. The motor driver circuit 305 drives the motor in response to a motor driving signal from the MPU 303. The motor abnormal condition detection circuit 314 detects an abnormal condition (excess current) of the motor or the motor driver circuit 305. The current control circuit 313 controls the current to flow through the motor driver circuit 305 in response to a motor abnormal condition detection signal from the motor abnormal condition detection circuit 314. The abnormal current monitor circuit 315 monitors an excess current detection signal from the excess current detection circuit 304 and a motor abnormal condition detection signal from the motor abnormal condition detection circuit 314 and further monitors an enable signal and a power ready signal from the MPU 303 to control turning on/off of the relay 306 or report occurrence of an abnormal condition to the MPU 303. In this instance, when an abnormal condition occurs, the relay 306 in the abnormal current monitor circuit 315 is turned off immediately to stop the supply of the power. In this instance, the abnormal current monitor circuit 315 delivers a report of the abnormal condition to the MPU 303 (delivery of an abnormal current detection signal). It is to be noted that the excess current detection signal outputted from the excess current detection circuit 304 is transmitted to the MPU 303 by way of the abnormal current monitor circuit 315.

Figure 36:
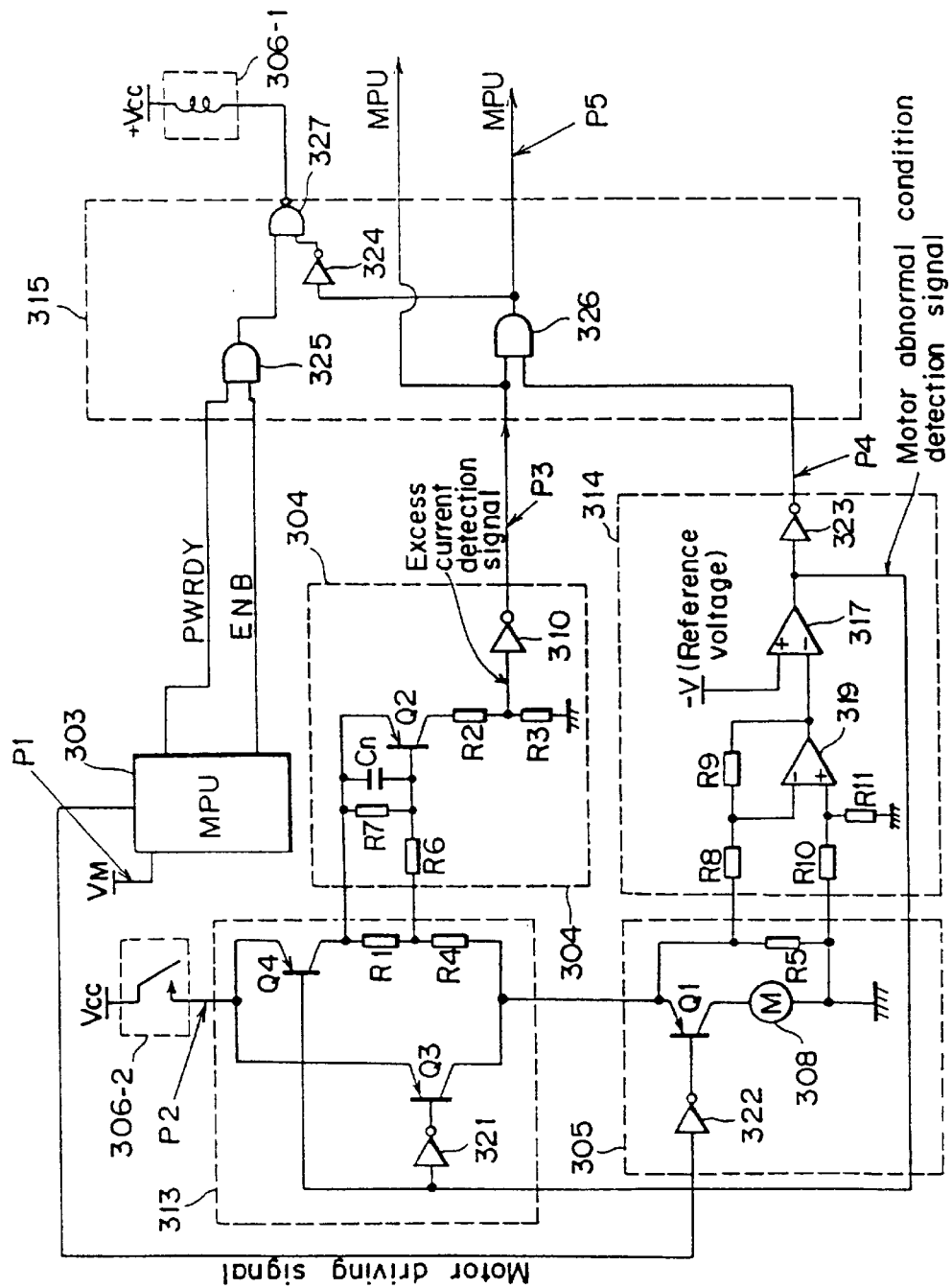
FIG. 36 is a circuit diagram of the motor driving control circuit of FIG. 34.

Description of the Motor Driving Control Circuit
(Refer to FIG. 36)

FIG. 36 shows an exemplary construction of the motor driving control circuit. The construction is a detailed circuit of the block diagram of FIG. 35. Constructions and functions of the components of the motor driving control circuit are such as described below.

Referring to FIG. 36, the current control circuit 313 includes a pair of transistors Q3 and Q4, an invertor 321, an excess current detecting resistor R1 and a current controlling resistor R4. The transistors Q3 and Q4 are connected in parallel to each other, and the excess current detecting resistor R1 and the current controlling resistor R4 are connected in series to the transistor Q4. A motor abnormal condition detection signal from the motor abnormal condition detection circuit 314 is inputted to the base of the transistor Q3 by way of the invertor 321 while it is inputted as it is to the base of the transistor Q4. Accordingly, if the motor abnormal condition detection signal is at the high level Hi, the transistor Q3 is on while the transistor Q4 is off. On the contrary when the motor abnormal condition detection signal is at the low level Lo, the transistor Q3 is off while the transistor Q4 is on (current control mode). The current limiting resistor R4 is only required to limit the current when an excess current is detected, and the resistance of the current limiting resistor R4 is determined so that a current, for example, substantially equal to one tenth the maximum current of the motor, may flow. The excess current detecting resistor R1 is provided so that a voltage may appear across it when an excess current flows while current control is being executed.

The excess current detection circuit 304 includes a transistor Q2, a noise preventing capacitor Cn, resistors R2, R3, R6 and R7, and an invertor 310. The excess current detection circuit 304 detects a voltage (excess current) appearing across the excess current detecting resistor R1 provided in the current control circuit 313, and the resistance values of the resistors R6 and R7 (base resistors) therein are set, for example, to an equal value. As an example, where the resistance value R of the excess current detecting resistor R1 is represented by R and the base-emitter voltage at which the transistor Q2 is turned on is represented by $V_{BE}$, the value of the excess current $I_o$ to be detected is given by $I_0 = 2V_{BE}/R$. Accordingly, the excess current detection value can be set to an arbitrary value by varying the resistance value R of the excess current detecting resistor R1 provided in the current control circuit 313.

The motor driver circuit 305 includes a transistor (power transistor) Q1, a motor abnormal condition detecting resistor R5, and an invertor 322. A motor 308 is connected to the transistor Q1 of the motor driver circuit 305 so that the motor 308 is driven by the transistor Q1. In this instance, the transistor Q1 is controlled by a motor driving signal from the MPU 303 by way of the invertor 322. The motor abnormal condition detecting resistor R5 connected in parallel to the motor 308 is provided to detect an abnormal condition of the motor 308 and an abnormal condition of the transistor Q1, and monitors a potential difference between the opposite ends of the motor 308. Accordingly, since the current to flow through the motor abnormal condition detecting resistor R5 may be a small current, a resistor of a high resistance value comparing with that of the motor may be employed as the motor abnormal condition detecting resistor R5.

The motor abnormal condition detection circuit 314 includes an operational amplifier 319, resistors R8 to R11, a comparator 317 and an invertor 323. A reference voltage −V for comparison is supplied to the comparator 317. The operational amplifier 319 and the resistors R8 to R11 cooperate to construct a differential amplifier which is a kind of voltage converting means. The differential amplifier (operational amplifier 319 and resistors R8 to R11) connected to the motor abnormal condition detecting resistor R5 converts a voltage appearing across the motor abnormal condition detecting resistor R5 into another corresponding voltage. The reference voltage −V to the comparator 317 is set to a negative value equal to one half the voltage Vcc +12 V, that is, to −6 V. When a trouble occurs, for example, with the transistor Q1 of the motor driving circuit 305 or the motor 308, an excess current may flow through the motor abnormal condition detecting circuit R5. The excess current then is converted into a corresponding voltage by the motor abnormal condition detecting resistor R5. The voltage appearing with the motor abnormal condition detecting resistor R5 is converted into another voltage by the operational amplifier 319 constituting the differential amplifier and then compared with the reference voltage −V by the comparator 317. A result of the comparison of the comparator 317 is supplied as a motor abnormal condition detection signal to the current control circuit 313 and the abnormal condition current monitor circuit 315. It is to be noted that, where the motor driver circuit is constructed so that it can control the current to flow through the motor, then a variation of the current flowing through the motor 308 will vary the current to flow through the motor abnormal condition detecting resistor R5. Therefore, if the reference voltage −V is set to a certain value, then also the current to flow through the motor 308 can be controlled.

The abnormal current monitor circuit 315 is constituted from logic circuits including a pair of AND circuits 325 and 326, an invertor 324 and a NAND circuit 327. In the abnormal current monitor circuit 315, the logic circuits monitor control signals PWRDY and ENB from the MPU 303, a motor abnormal condition detection signal (signal inverted by the invertor 323) from the motor abnormal condition detection circuit 314 and an excess current detection signal from the excess current detection circuit 304 and controls turning on/off of the relay 306. In this instance, the motor abnormal condition detection signal from the motor abnormal condition detection circuit 314 and the excess current detection signal from the excess current detection circuit 304 are inputted to the AND circuit 326, and a logical AND signal from the AND circuit 326 is supplied as an abnormal current detection signal to the MPU 303. Meanwhile, the excess current detection signal from the excess current detection circuit 304 is supplied as it is to the MPU 303. Further, the AND circuit 325 receives a power ready signal PWRDY and an enable signal ENB from the MPU 303 and supplies a logical AND signal of the received signals to the NAND circuit 327. The invertor 324 inverts an output signal (abnormal current detection signal) from the AND circuit 326 and supplies the thus inverted signal to the NAND circuit 327. Then, an output signal of the NAND circuit 327 is supplied to the relay 306 to control turning on/off of the relay 306.

Description of Operation of the Motor Driving Control circuit (Refer to FIGS. 35 and 36)

The motor driving control circuit operates in the following manner. Reference character Lo denotes a low level while reference character Hi denotes a high level, and reference characters P1 to P5 denote points indicated in FIG. 36.

If, for example, the relay 306 is in an off-state, then since the relay contact 306-2 thereof is open, no current flows through the motor 308. In this instance, no current flows through the motor abnormal condition detecting resistor R5 provided in the motor driver circuit 305, and no voltage appears across the motor abnormal condition detecting resistor R5. Accordingly, the output of the operational amplifier 319 constituting the differential amplifier is 0 volt. In this instance, since the comparator 317 receives the reference voltage −V at the non-inversion terminal (+ side) thereof, the output of the comparator 317 presents the low level Lo. In this condition, the output signal of Lo of the comparator 317 is supplied to the current control circuit 313, and consequently, the transistor Q4 is on while the transistor Q3 is off. Consequently, the current control circuit 313 is in a current control mode. In this instance, since the relay 306 is in an off-state wherein the relay contact 306-2 thereof is open, no current flows through the excess current detecting resistor R1. Accordingly, the transistor Q2 of the excess current detection circuit 304 is off and the excess current detection signal is at the high level Hi (Lo at the point P3).

Subsequently, when a signal ENB for turning on the relay 306 is outputted from the MPU 303 to the abnormal current monitor circuit 315, the abnormal current monitor circuit 315 discriminates that there is no abnormal condition in the motor abnormal condition detection signal and the excess current detection circuit, and flows a current through the relay coil 306-1 to turn on the relay 306. In this instance, the logic circuits of the abnormal current monitor circuit 315 are in such a condition as described below.

In particular, the AND circuit 326 receives input signals of Lo and Hi and outputs a signal of Hi; the invertor 324 receives an input signal of Lo and accordingly outputs a signal of Lo; and the NAND circuit 327 receives input signals of Hi and outputs a signal of Lo. Consequently, a current flows through the power source Vcc, the relay coil 306-1 and the NAND circuit 327 to turn on the relay 306.

When the relay 306 is turned on in this manner, the current control circuit 313 remains in the current control mode. In this instance, the transistor Q1 of the motor driver circuit 305 is off, and accordingly, no current flows through the motor 308, but a current flows through the motor abnormal condition detecting resistor R5. Consequently, the output signal of the comparator 317 in the motor abnormal condition detection circuit 314 exhibits the high level Hi (Lo at the point P4). Accordingly, in the current control circuit 313, the transistor Q4 is turned off and the transistor Q3 is turned on so that the current control circuit 313 is changed over from the current control mode to a driving mode (motor driving mode). If there is no abnormal condition in this condition, the transistor Q1 is turned on in response to a motor driving signal from the MPU 303 so that the motor 308 is energized. In this condition, a current flows through the power source Vcc, the transistor Q3, the transistor Q1, the motor 308 and the ground GND.

When the motor 308 is driven normally in this manner, the motor abnormal condition detection signal exhibits the high level Hi (Lo at the point P4) and the excess current detection signal exhibits the high level Hi (Lo at the point P3). In this condition, if a short-circuiting current flows through the motor driving circuit 305, then the motor abnormal condition detection circuit 314 will detect the abnormal condition and change over the output signal of the comparator 317 to the low level Lo (Hi at the point P4). As a result, in the current control circuit 313, the transistor Q3 is turned off and the transistor Q4 is turned on so that the current control circuit 313 is changed over to a current control mode. Consequently, the current through the motor driving circuit 305 is restricted by the current controlling resistor R4. Thereafter, if the excess current detection circuit 304 detects an excess current in the current control mode, then the excess current detection signal is changed over to the low level Lo (Hi at the point P3). Consequently, the output of the NAND circuit 327 is changed over to the high level Hi to turn off the relay 306 to interrupt the current to the motor driver circuit. In this manner, when an abnormal condition (excess current arising from a trouble) of the motor 308 or the motor driver circuit 305 is detected, current control is executed immediately by the current control circuit 313 to restrict the current to the motor driver circuit. Then, if an excess current is thereafter detected by the current detection circuit 304 during energization of the motor in the current control mode, the abnormal current monitor circuit 315 determines that the abnormal condition is not caused by noise or a like cause but is a real abnormal condition and controls to turn off the relay to interrupt the current to flow through the motor driver circuit 305.

Figure 37:
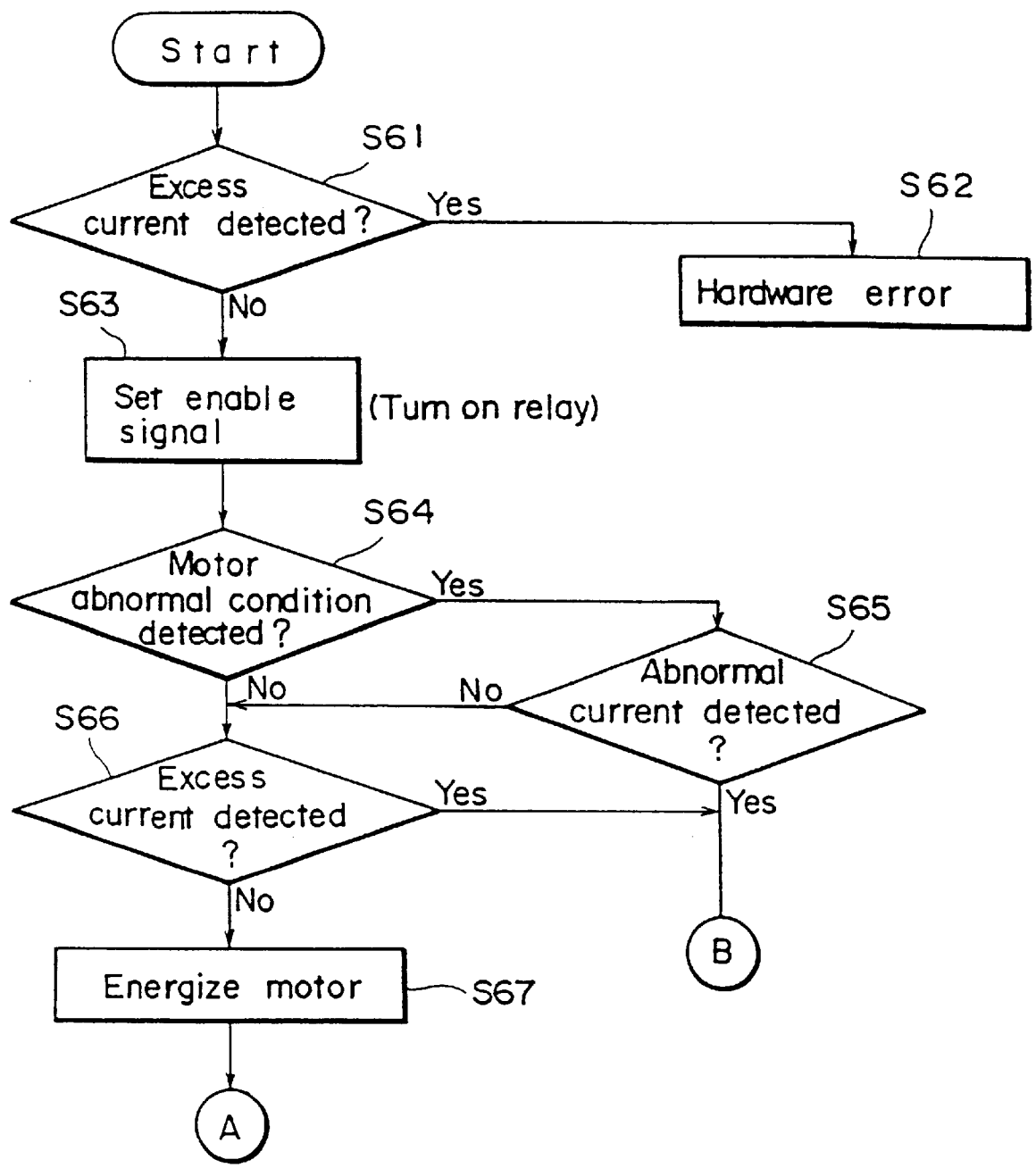
FIGS. 37 and 38 are flow charts illustrating processing of an MPU of the motor driving control circuit of FIG. 34.
Figure 38:
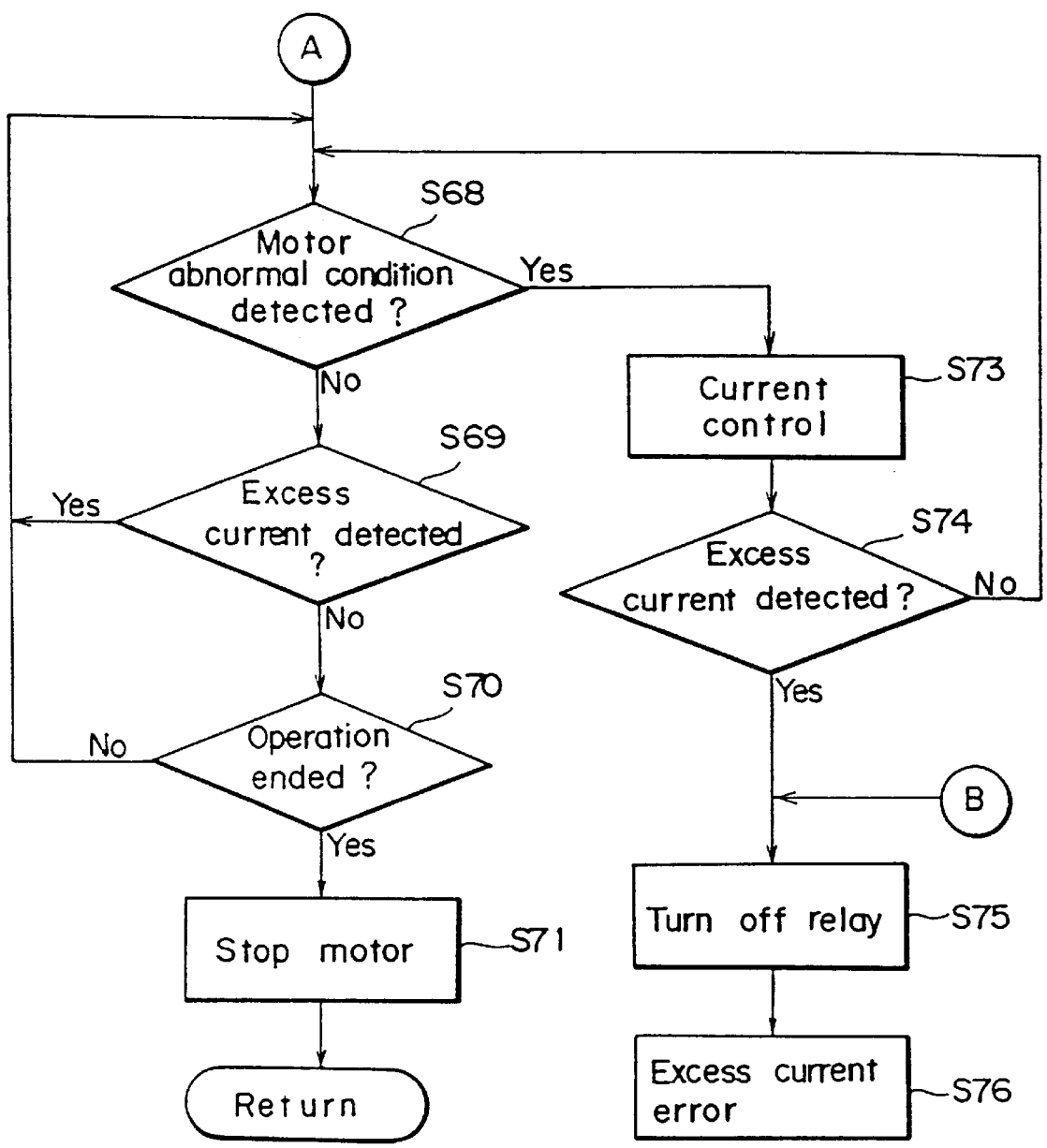

Description of Processing of the MPU (Refer to FIGS. 37 and 38)

FIGS. 37 and 38 are flow charts illustrating processing of the MPU. In the following, processing of the MPU 303 in the motor driver circuit will be described with reference to the flow charts of FIGS. 37 and 38. It is to be noted that reference characters S61 to S75 denote each a processing steps.

The MPU 303 checks, before it turns on the relay 306, to discriminate whether or not an excess current detection signal is outputted from the excess current detection circuit 304 (step S61). In this instance, since the relay 306 is not yet in an on-state, if an excess current detection signal is outputted from the excess current detection circuit 304, then the MPU 303 determines an error of the hardware (step S62). On the contrary, when no excess current detection signal is outputted from the excess current detection circuit 304, the MPU 303 sets an enable signal ENB (step S63) to turn on the relay 306 to close the relay contact 306-2 to allow a current to flow. After the relay 306 has been turned on as described just above, the MPU 303 checks the excess current detection signal again to discriminate an abnormal condition of the motor (failure or short-circuiting of the motor) (step S64). It is to be noted that the motor 308 is in a rest condition then. In this instance, if no abnormal condition (excess current) is detected, then the MPU 303 checks to discriminate whether or not there is an excess current detection current (step S66). Then, if no excess current detection signal is detected, then the MPU 303 outputs a motor driving signal to energize the motor (step S67). Consequently, the motor is rotated. Subsequently, the MPU 303 checks to discriminate an abnormal condition of the motor again (step S68). Then, if there is no abnormal condition of the motor, the MPU 303 checks to discriminate whether or not there is some short-circuiting condition (step S69). Here, if the operation has been completed (step S70), then the MPU 303 delivers a motor stopping instruction so that the motor is stopped (step S71). On the other hand, if no motor stopping instruction is developed, then the control sequence returns to the processing at step S68 to check an abnormal condition of the motor. Also when the MPU 303 detects an excess current detection signal at step S69, the control sequence returns to step S68. When an abnormal condition of the motor is detected at step S68, the MPU 303 immediately enters into current control (step S73). In this instance, the MPU 303 checks to discriminate whether or not an excess current is flowing in the current control condition (step S74). If no excess current is detected, then the MPU 303 determines a malfunction caused by noise and checks to discriminate an abnormal condition of the motor (step S68). But if an excess current is detected (step S74), the MPU 303 enters into control to turn off the relay 306 (step S75). As a result of the control of the MPU 303, the relay 306 is turned off to open the circuitry.

If an abnormal condition of the motor is detected in the processing at step S64, the MPU 303 checks an abnormal current (step S65). If the checking reveals detection of an abnormal condition, then the MPU 303 executes processing at step S75, but if no abnormal condition is detected, then the MPU 303 determines that this is a malfunction, and advances the control sequence to the processing at step S66. When an abnormal condition is detected in the processing at step S64, S65 or S74, the MPU 303 turns off the relay 306 by way of the abnormal current monitor circuit 315 (step S75) to turn off the power. Further, the abnormal current monitor circuit 315 reports to the MPU 303 that an abnormal condition has occurred (step S76). When the report from the abnormal current monitor circuit 315 is received, the MPU 303 resets the enable signal ENB and then displays an error display.

Figure 39:
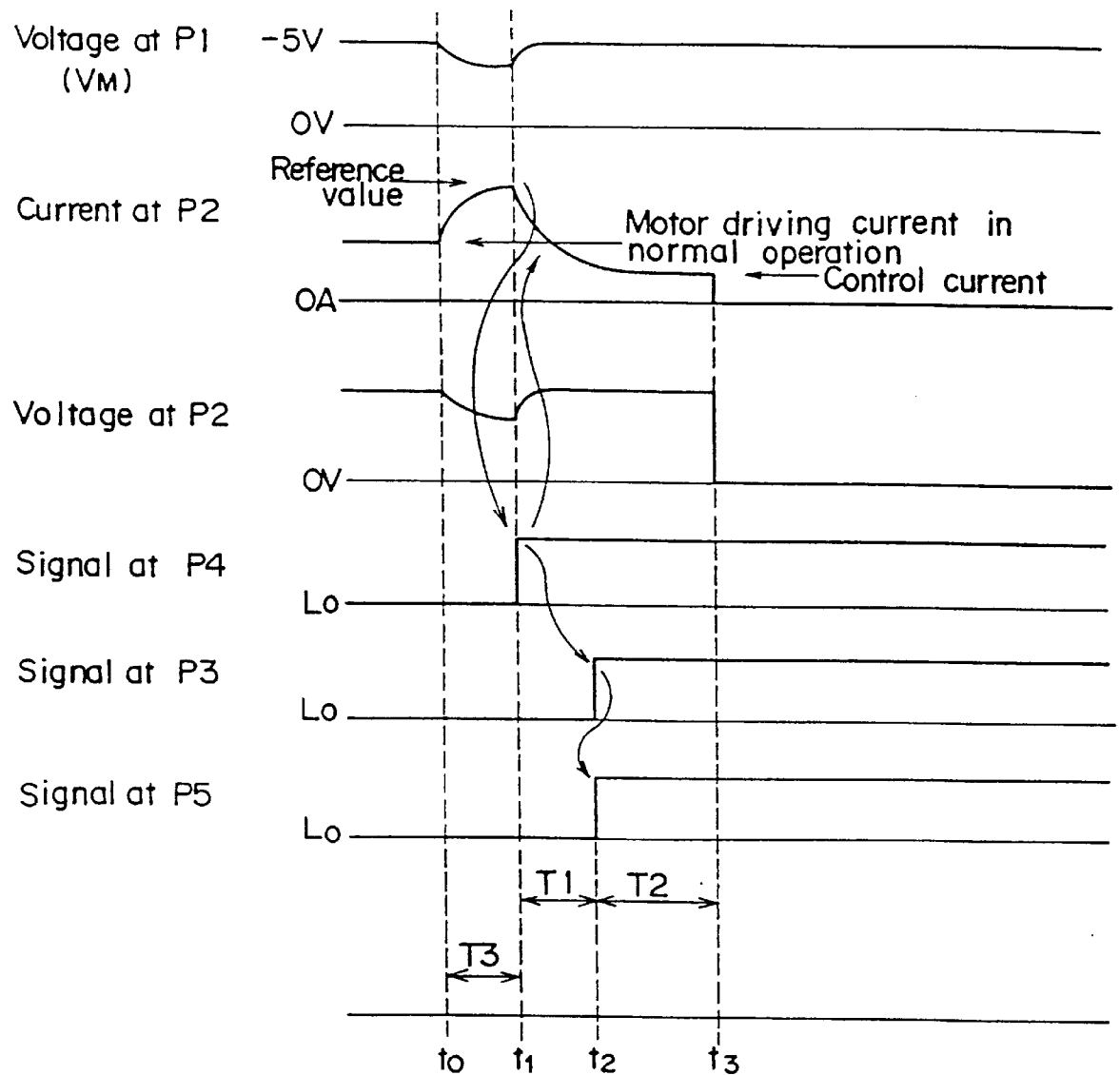
FIG. 39 is a timing chart illustrating operation of the motor driving control circuit of FIG. 34.

Description of Operation of the Motor Driving Control Circuit with Reference to the Timing Chart (Refer to FIG. 39)

FIG. 39 is a timing chart illustrating operation of the components of the motor driving control circuit. In the following, operation of the motor driving control circuit will be described with reference to FIG. 39. It is to be noted that reference characters P1 to P5 denote points shown in FIG. 36. Further, reference character T1 denotes an excess current detection time, T2 a relay release time, and T3 a time for which an excess current flows.

It is assumed now that the motor 308 is being energized and an excess current begins to flow through the motor 308 at the time to. The excess current thereafter continues to flow, and the time at which a detection value for an excess current by the excess current detection circuit 304 is reached is denoted at $t_1$. At the point of time $t_1$, the signal (motor abnormal condition detection signal) at the point P4 changes over from the low level Lo to the high level Hi. When the signal at the point P4 changes over to the high level Hi, the current control circuit 3 immediately enters into current control, in which the current is limited to a preset current value. Further, when the excess current is detected by the excess current detection circuit 304 in this condition, the signal (excess current detection signal) at the point P3 changes from the low level Lo to the high level Hi. Thereupon (at the time $t_2$), since the signal at the point P5 is an AND signal of the signal at the point P3 and the signal at the point P4, the signal at the point P5 changes over from the low level Lo to the high level Hi. Meanwhile, the abnormal current monitor circuit 315 turns off the relay driving signal if both of the motor abnormal condition detection signal and the excess current detection signal are at the high level Hi. The time is denoted at $t_2$. Thus, the excess current detection time T1 is the interval of time from $t_1$ to $t_2$. Further, if the time at which the relay driving signal is turned off so that the relay contact 306-2 is turned off is denoted at $t_3$, then the interval of time (relay release time T2) required before the relay contact 306-2 is opened after the excess current has begun to actually flow is defined by $t_2$ and $t_3$. However, if the excess current is detected, then since the current control circuit 313 immediately enter into current control, a period of time T3 for which the excess current flows actually is a time from $t_0$ to $t_1$. Accordingly, the power source voltage $V_M$ to the MPU 303 drops for the time T3 but not to a level sufficient to cause the MPU 303 to be reset. Further, even if much time is required before an excess current is detected or even if much time is required before the contact of the relay 306 is opened, the power source to the MPU 303 is ensured without being influenced by the times.

Figures 40A, 40B:
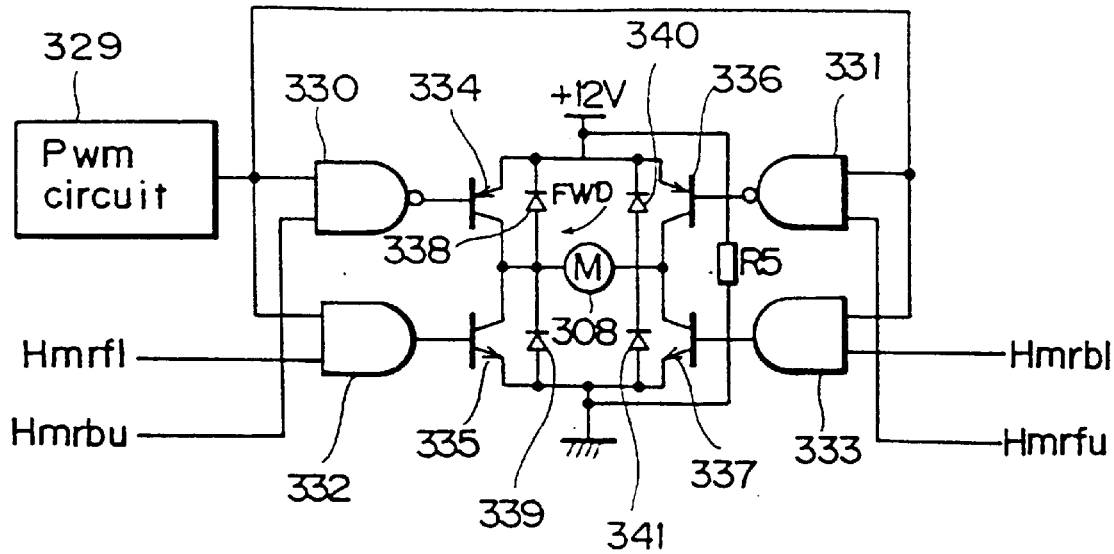
FIG. 40A is a circuit diagram of another motor driving control circuit according to the present invention.
FIG. 40B is a table illustrating operation of the motor driving control circuit shown in FIG. 40A.

FIG. 40A is a circuit diagram showing another exemplary construction of the motor driving control circuit, and FIG. 40B is a table illustrating motor driving conditions of the motor driving control circuit. Referring first to FIG. 40A, same or substantially corresponding elements to those of FIG. 31 are denoted by same reference characters. Further, reference numeral 329 denotes a PWM (pulse width modulation) circuit, reference characters 330 and 331 denote each a NAND circuit, 332 and 333 denote each an AND circuit, 334, 335, 336 and 337 denote each a transistor (power transistor), and 338, 339, 340 and 341 denote each a diode. The construction is characterized in that the motor driver circuit 305 in the construction of FIG. 36 is replaced with an H-shaped circuit. Details of the construction are such as described below.

A PWM circuit 329 generates pulses of a fixed period using, for example, a preset value and sends them to a pair of AND circuits 332 and 333 and a pair of NAND circuits 330 and 331. The MPU 303 (FIG. 36) delivers control signals HMRFU, HMRFL, HMRBU and HMRBL to the NAND circuits 332 and 333 and the NAND circuits 330 and 331, respectively, to control the motor driver circuit. For example, when HMRFU=1, HMRFL=1, HMRBU=0 and HMRBL=0, transistors 335 and 336 are on while transistors 334 and 337 are off, and consequently, a motor 308 is energized in its forward direction. In this instance, the current flows through the power source (+12 V), the transistor 336, the motor 308, the transistor 335 and the ground GND. On the contrary when HMRFU=0, HMRFL=0, HMRBU=1 and HMRBL=1, the transistors 335 and 336 are off and the transistors 334 and 337 are on, and consequently, the motor 308 is energized in its reverse direction. In this instance, the current flows through the power source (+12 V), the transistor 334, the motor 308, the transistor 337 and the ground GND. In this manner, the motor 308 can be energized by sending a control signal from the MPU 303 to the motor 308. A motor abnormal condition detecting resistor R5 is connected in parallel to the motor 308 so that, similarly to the construction of FIG. 36, an abnormal condition (excess current) of the motor or the like can be detected by the motor abnormal condition detection circuit 314.

In addition to the constructions described above, the present invention can be embodied in the following manner:

1. The present invention can be applied not only to magnetic tape apparatus and magnetic tape library apparatus but also to various apparatus which employ a motor.

2. The logic circuits constituting the abnormal current monitor circuit are not limited to those described above, but they can be constituted from circuits having similar functions.

3. The transistors to be employed are not limited to bipolar transistors, but may be constituted from other similar switching elements such as FETS.

As described above, according to the present embodiment of the invention, the following advantages can be anticipated.

1. When the current flowing through the motor driver circuit increases to an excess current, the current to flow to the motor driver circuit is decreased first without interrupting the supply current, and consequently, the time for which the excess current flows can be reduced to a short period of time. Accordingly, otherwise possible damage to the motor driver circuit can be prevented.

2. Upon detection of an excess current, while the current flowing through the motor driver circuit is kept decreased, it is determined whether an excess current caused by noise is detected or an excess current caused by an actual abnormal condition of the motor driver circuit or actual short-circuiting of the motor is detected. Then, when an excess current caused by noise is detected (in the case of a malfunction), the current is returned immediately to its original value, but when an access current caused by an actual trouble is detected, the supply of current is stopped. Accordingly, detection of an excess current can be detected accurately, and otherwise possible damage to the circuitry can be detected with certainty.

3. An excess current can be detected always accurately irrespective of the direction of rotation of the motor. Also in this instance, protection of the motor driver circuit and resultant prevention of damage to other circuits can be achieved.

4. During normal driving of the motor, no current flows through the current controlling resistor and the excess current detecting resistor in the current control circuit. Accordingly, no loss is provided. Further, the resistance values of the current controlling resistor and the excess current detecting resistor in the current control circuit can be set to arbitrary values without any restriction.

Subsequently, another application of a non-volatile memory will be described. The present embodiment of the invention relates to a peripheral equipment of an electronic computer such as a magnetic tape apparatus, and an automatic equipment type discriminating method for such peripheral equipment.

In recent years, various apparatus have been put on the market as peripheral equipments such as, for example, magnetic tape apparatus. In such apparatus, different models are sometimes developed which have a substantially same hardware (circuit sections and mechanism sections) construction except part of mechanism sections. In this instance, it is demanded that also microprograms for controlling the apparatus be designed common to the models and differences of the mechanism sections be automatically detected to reduce the man-hours for development and manufacture.

Figure 41:
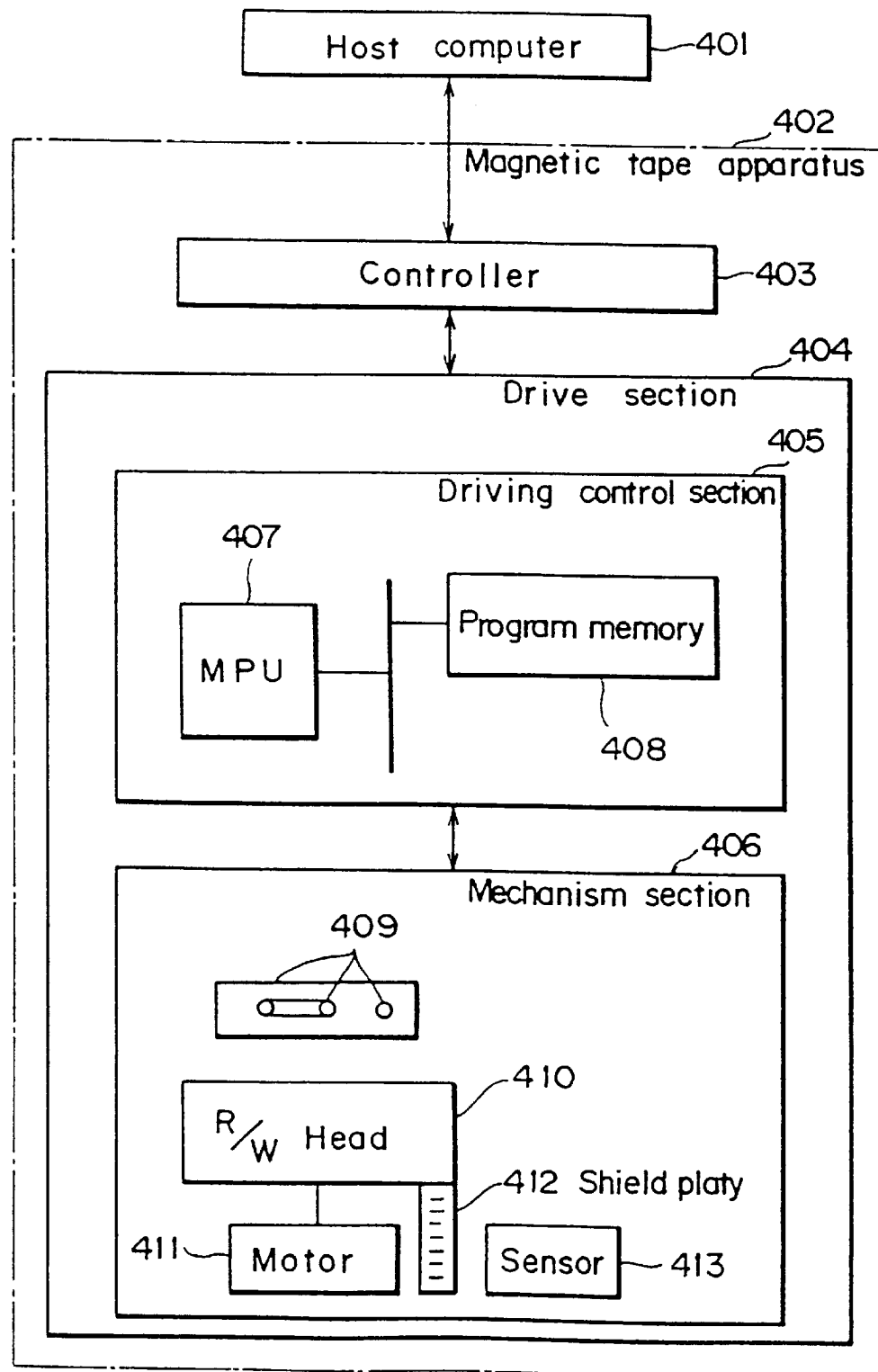
FIG. 41 is a block diagram of a conventional magnetic tape apparatus.

FIG. 41 is a block diagram of a conventional magnetic tape apparatus. Referring to FIG. 41, reference numeral 401 denotes a host computer, 402 a magnetic tape apparatus, 403 a controller, 404 a drive section, 405 a driving control section, 406 a mechanism section, 407 an MPU (microprocessor), 408 a program memory, 409 a setting pin for an apparatus type, 410 a read/write (R/W) head, 411 a stepping motor, 412 a shield plate for setting an apparatus type, and 413 a sensor. The magnetic tape apparatus 402 includes a controller 403 serving as a host control section, and a drive section 404. The drive section 404 includes a mechanism section 406 and a driving control section 405 serving as a control section for the mechanism section 406. The driving control section 405 includes an MPU 407 and a program memory 408. The MPU 407 reads out microprograms from the program memory 408 and controls various components of the magnetic tape apparatus. Meanwhile, the mechanism section 406 includes a read/write head 410, and a stepping motor 11 for driving the read/write head 410. The magnetic tape apparatus 402 may be any of various types including, for example, a type having a head for 32 tracks and another type having a head for 20 tracks. In order to allow the magnetic tape apparatus 402 itself to automatically discriminate whether it is an apparatus which employs a head for 20 tracks or another apparatus which employs a head for 32 tracks, either a setting pin 409 or a shield plate 412 is employed in the magnetic tape apparatus 402. When the setting pin 409 is employed, for example, a plurality of setting pins 409 are provided on a printed circuit board and selectively short-circuits in accordance with a type of a head (for 20 tracks or for 32 tracks) mounted on the apparatus. If the head is exchanged, also the short-circuiting condition of the setting pins 409 is varied in accordance with the type of the head. Then, for example, the MPU 407 automatically discriminates the type of the head from the short-circuiting condition of the setting pins 409. On the other hand, when the shield plate 412 is employed, a slit or slits are formed in the shield plate 412 in accordance with the type of the head. The shield plate 412 is replaced, when the head is exchanged, for a new shield plate having a slit or slits corresponding to the type of the new head. In short, the head and the shield plate always correspond to each other. When the MPU 407 is to automatically discriminates the type of a head, the stepping motor 411 is energized to perform a seeking operation of the head to move the shield plate 412, whereupon the slit or slits of the shield plate 412 are detected by a sensor 413 and the MPU 407 discriminates the type of the head from the detection signal of the sensor 413 then. The shield plate 412 is moved by moving a carriage, on which the shield plate 412 is mounted, by rotation of the stepping motor 411. If the MPU 407 in the driving control section 405 automatically discriminates the type of the apparatus itself in this manner and the information of the type can be notified in response to a request of the controller 403, then it is possible to use almost all of the mechanism section commonly to various models except part of the mechanism section and make controlling micro programs for the apparatus commonly to the models when such models are to be developed. As a result, the man-hours for development and also for manufacture can be reduced.

The conventional magnetic tape apparatus described above has the following subjects to be solved:

1. Where a setting pin is used in order to allow the apparatus to automatically discriminate the type of the apparatus itself (for example, difference of the head), since such setting is performed by manual operation, an error in setting likely occurs. If an error in setting actually occurs, then the apparatus will discriminate a wrong type in automatic discrimination thereof. Further, setting based on a setting pin is low in operability.

2. In automatic discrimination of the type of the apparatus which employs a shield plate, it sometimes occurs that, for example, upon automatic discrimination, such a trouble that a tape is not in a rewound condition takes place and does not allow automatic discrimination of the type of the apparatus. If seeking of the head is performed in this instance, then a portion of the tape on which data are recorded may possibly be damaged, and therefore, seeking of the head is not performed. Accordingly, automatic discrimination of the type of the apparatus cannot be performed.

An embodiment of the present invention described below is provided in order to solve the subjects of the conventional magnetic tape apparatus described above and always allow accurate discrimination of the type of the apparatus even when an automatic discriminating operation of the type of the apparatus cannot be performed due to occurrence of a trouble.

Figure 42:
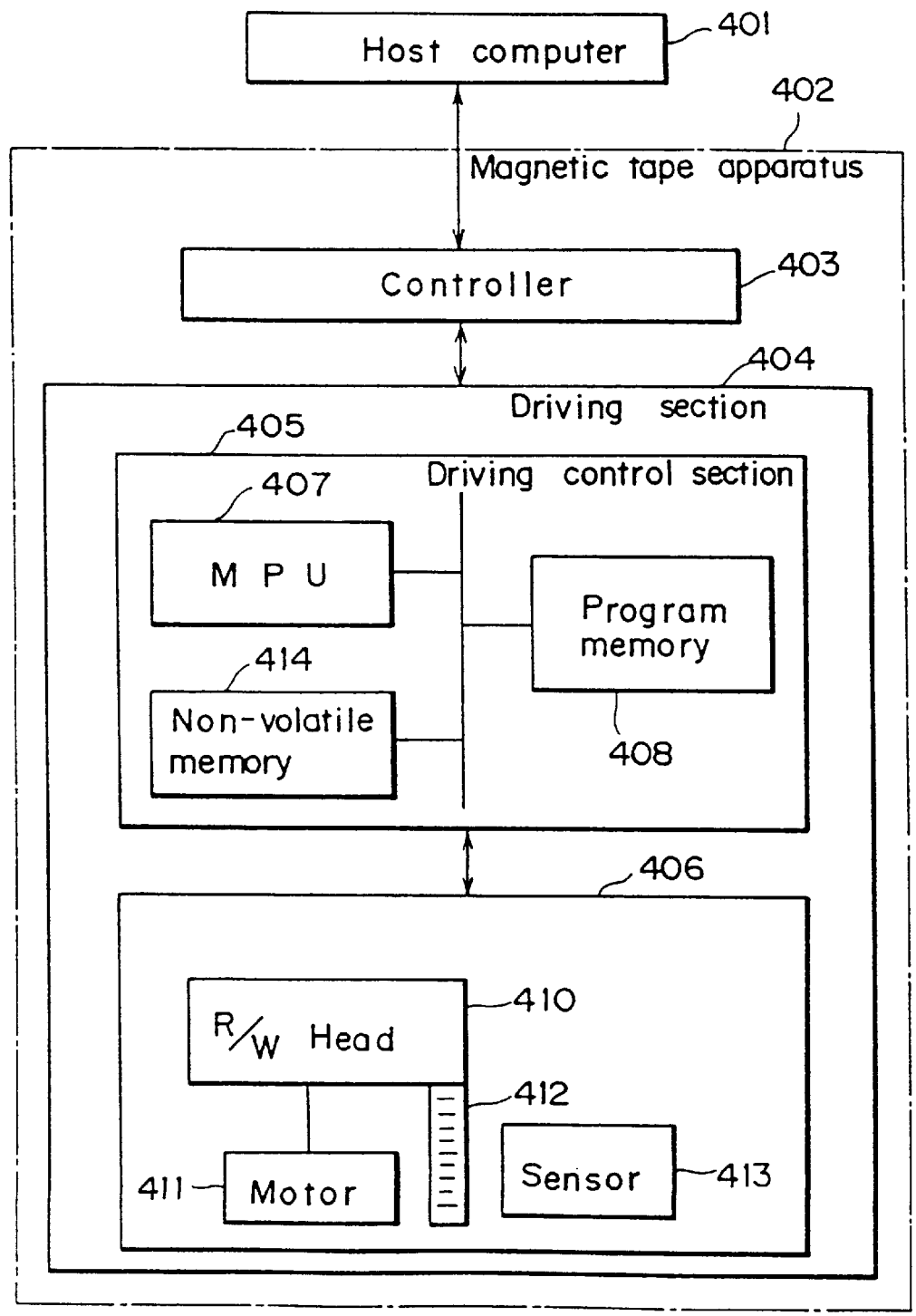
FIG. 42 is a block diagram of an electronic computer peripheral equipment (magnetic tape apparatus) according to the present invention.

FIG. 42 is a block diagram of a peripheral equipment of an electronic computer in the present embodiment of the invention.

In a first form of the peripheral equipment, the peripheral equipment is a magnetic tape apparatus 402 and includes a mechanism section 406 and a control section 405 for the mechanism section 406. The mechanism section 406 includes an apparatus type setting mechanism 412 for setting information of the type of the apparatus which depends upon part of the mechanism section, and the control section 405 includes a processor (MPU) 407 for executing various controls based on micro programs. Setting information of the apparatus type setting mechanism 412 is detected to automatically discriminate the type of the apparatus itself under the control of the processor 407. A non-volatile memory 414 into and from which data can be written and read out by the processor 407 is provided in the control section 405 so that apparatus type information automatically discriminated under the control of the processor 407 is stored into the non-volatile memory 414.

In a second form which is a limited form of the first form, when the processor 407 automatically discriminates the type of the apparatus itself normally, the apparatus type information of the non-volatile memory 414 is updated with the apparatus type information thus discriminated newly so that, when automatic discriminating processing of the type of the apparatus cannot be performed due to occurrence of a trouble, the information of the non-volatile memory 414 is read out in order to automatically discriminate the type of the apparatus itself from the information.

In a third form which is a limited form of the first or second form described above, the mechanism section 406 is the mechanism section of the magnetic tape apparatus 402 and the apparatus type is the type of a head which reads/writes data from/onto a magnetic tape recording medium.

Operation of the peripheral equipment of the present embodiment will be described with reference to FIG. 42. Where the peripheral apparatus is, for example, a magnetic tape apparatus, if it is assumed that an instruction for discrimination of the type of the apparatus is received from a host controller 403 upon rising of the power source of the apparatus, the MPU 407 in the driving control section 405 executes internal initializing processing and, when a tape is in a wound condition in the apparatus, causes a rewinding operation of the tape to be performed. When such rewinding of the tape has completed normally or when the tape is not wound in the apparatus, the MPU 407 causes the read/write head 410 to perform a seeking operation and automatically discriminates the type of the apparatus itself by detecting the type of the apparatus from an output signal of a sensor 413. The apparatus type information thus automatically discriminated is written into the non-volatile memory 414. Then, in response to a request of the host controller 403, the MPU 407 notifies the controller 403 of the apparatus type information obtained by automatic discrimination. However, when an error occurs in the process of the rewinding operation of the tape and prevents the tape from being rewound, the MPU 407 automatically discriminates the type of the apparatus by reading out the information, which has been stored into the non-volatile memory 414 in the preceding processing, and notifies the host controller 403 of the apparatus type. On the other hand, when a request is received from the host controller 403 not upon rising of the power source but during normal operation, the MPU 407 reads out the information from the non-volatile memory 414 to automatically discriminate the type of the apparatus and also can notify the upper controller 403 of the apparatus type thus automatically discriminated. Thus, even if an automatic discriminating operation of the type of the apparatus is disabled by occurrence of a trouble, the apparatus type can be discriminated from the information of the non-volatile memory. Accordingly, the type of the apparatus can be automatically discriminated always with accuracy.

Subsequently, a more detailed construction of the peripheral equipment will be described with reference to FIGS. 43 to 48. Referring to FIGS. 43 to 48, same or substantially corresponding elements to those of FIGS. 41 and 42 are denoted by same reference characters. Further, reference character 415 denotes an operator panel, 416 a door, 417 a cartridge setting/ejecting mechanism, 418 a control printed circuit board, 419 a write/read printed circuit board, 420 a magazine reel, 421 a tape guide, 422 a positioning mechanism, 424 a cartridge (magnetic tape cartridge), 425 a servo circuit printed circuit board, 426 a base frame, 427 a driving microprogram control section, 428 a write/read circuit section, 429 a deck motor, 430 a cartridge motor, 431 a servo circuit, 414A an EEPROM, 432 a cable, 435 a carriage, 436 a slit, 413A a light emitting section, and 413B a light receiving section.

Figure 43:
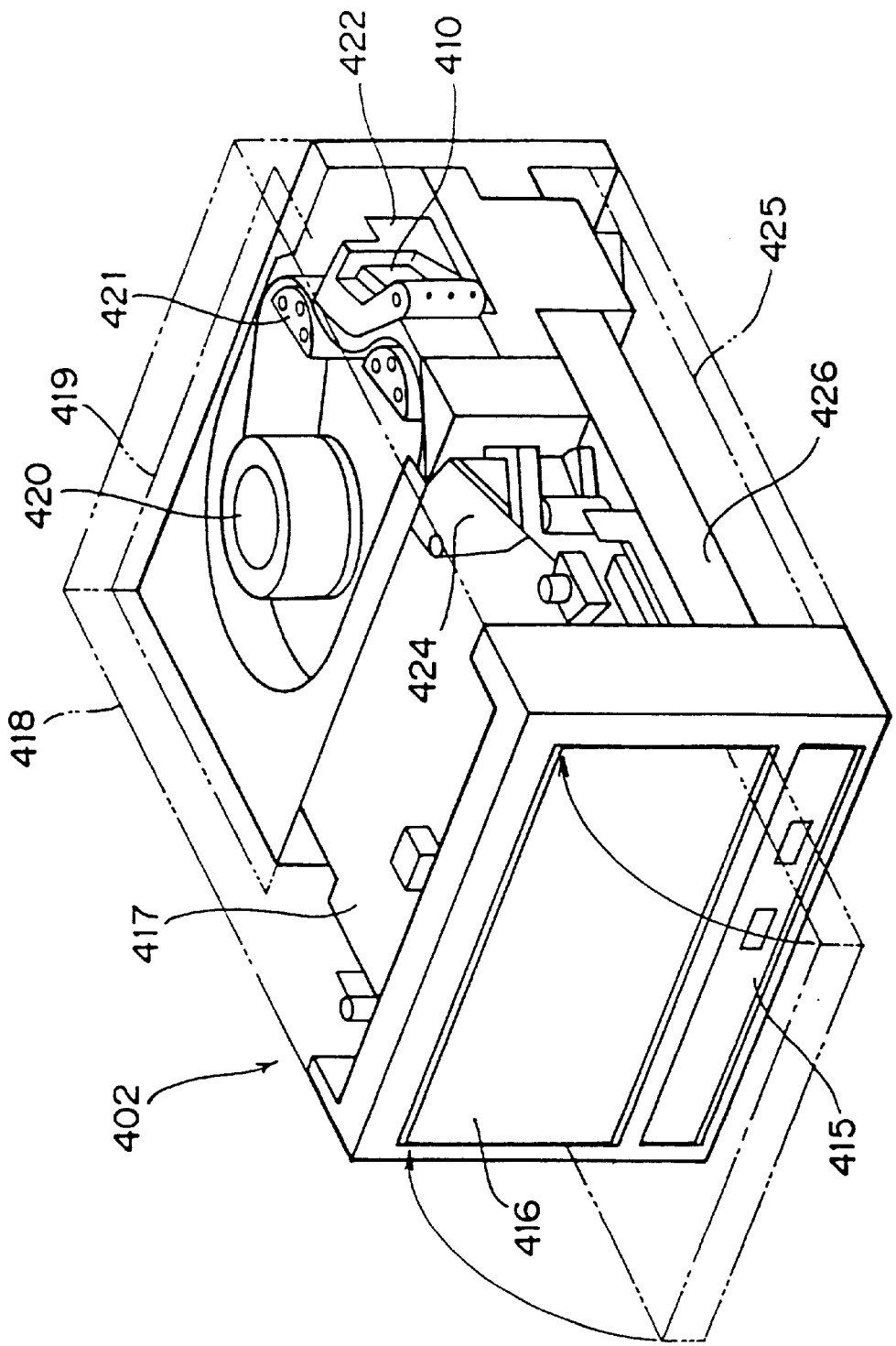
FIG. 43 is a perspective view of the magnetic tape apparatus of FIG. 42.

The construction is an application of the present invention to a magnetic tape apparatus, and an exemplary construction of the magnetic tape mechanism is shown in FIG. 43. Referring to FIG. 43, the magnetic tape apparatus 402 includes an operator panel 415, a door 416, a cartridge setting/ejecting mechanism 417, a control printed circuit 418, a write/read circuit printed circuit board 419, a magazine reel 420, a tape guide 421, a head positioning mechanism 422, a read/write head 410, a cartridge 424, a servo circuit printed circuit board 425 and a base frame 426.

Figure 44:
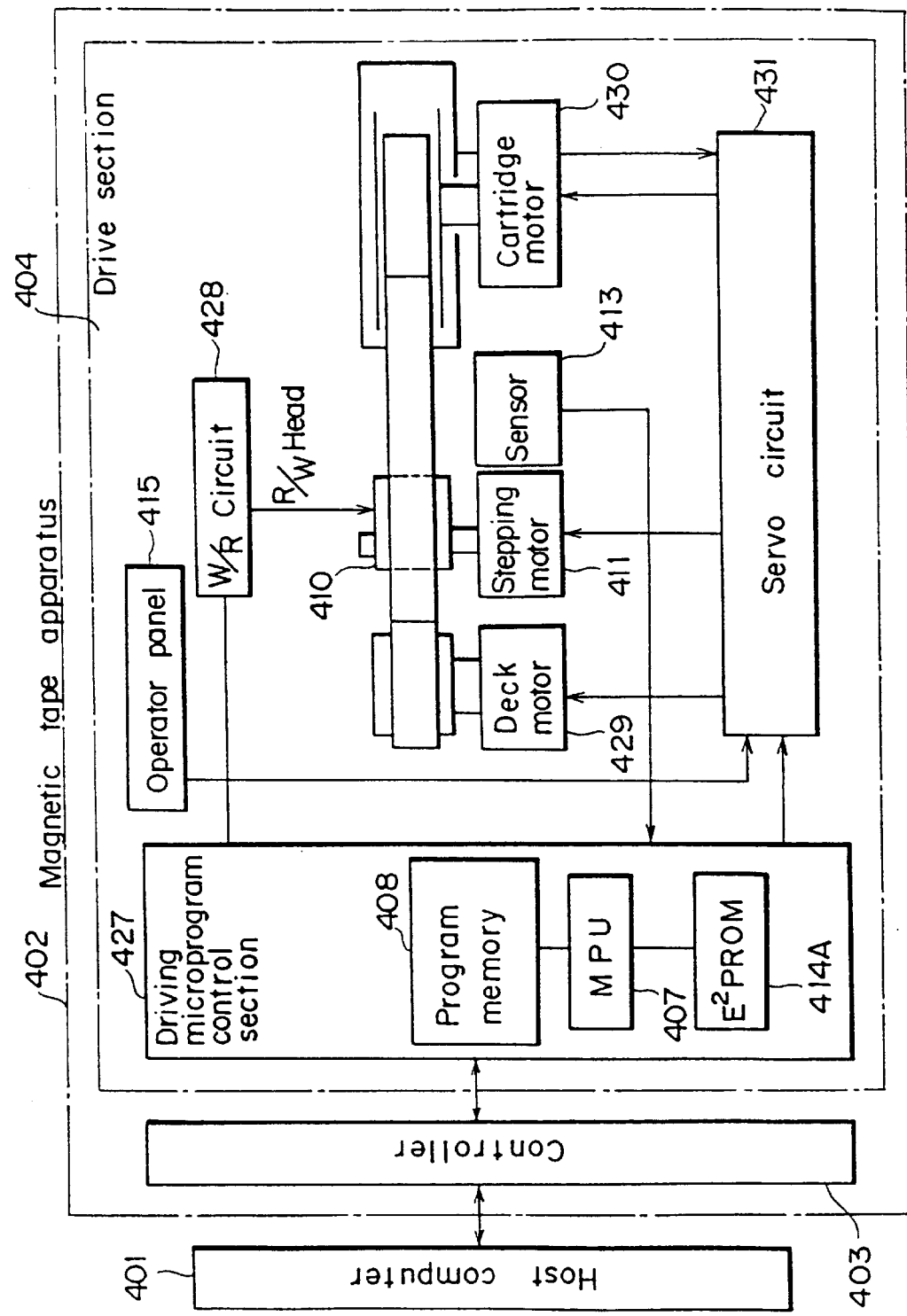
FIG. 44 is a functional block diagram of the magnetic tape apparatus of FIG. 42.

FIG. 44 is a functional block diagram of the magnetic tape apparatus of FIG. 43. Referring now to FIG. 44, the magnetic tape apparatus 402 includes a controller 403 and a drive section 404. The controller 403 is connected to a host computer 401 and serves as a host controller which communicates data with the host computer 401 and controls the drive section 404. The drive section 404 performs recording/reproduction onto/from a recording medium in response to control information received from the controller 403. The drive section 404 includes a driving microprogram control section 427, a servo circuit 431, a write/read (W/R) circuit 428, the read/write head 410, a deck motor 429, a stepping motor 411, a cartridge motor 430, a sensor 413 and an operator panel 415. Further, the driving microprogram control section 427 includes an MPU (microprocessor) 407, a program memory 408 and an EEPROM (Electrically Erasable and Programmable Read Only Memory) 414A. In the driving microprogram control section 427, the MPU 407 reads out micro programs from the program memory 408 and executes servo control and other driving control of the drive section 404 and various interface processes to the controller 403. For example, the MPU 407 executes transmission/reception processing of an interface signal to and from the host controller 403, various tape handling processes (automatic loading, unloading, resetting and so forth) in accordance with an instruction from the operation panel 415, a sequencing operation of the entire apparatus for causing the servo circuit 431 to perform operation regarding feeding of a tape, control regarding writing/reading, and driving control of the stepping motor 411. The servo circuit 431 executes, in accordance with an instruction of the driving microprogram control section 427, servo control of the stepping motor 411, the deck motor 429 and the cartridge motor 430 to drive them.

Figure 45:
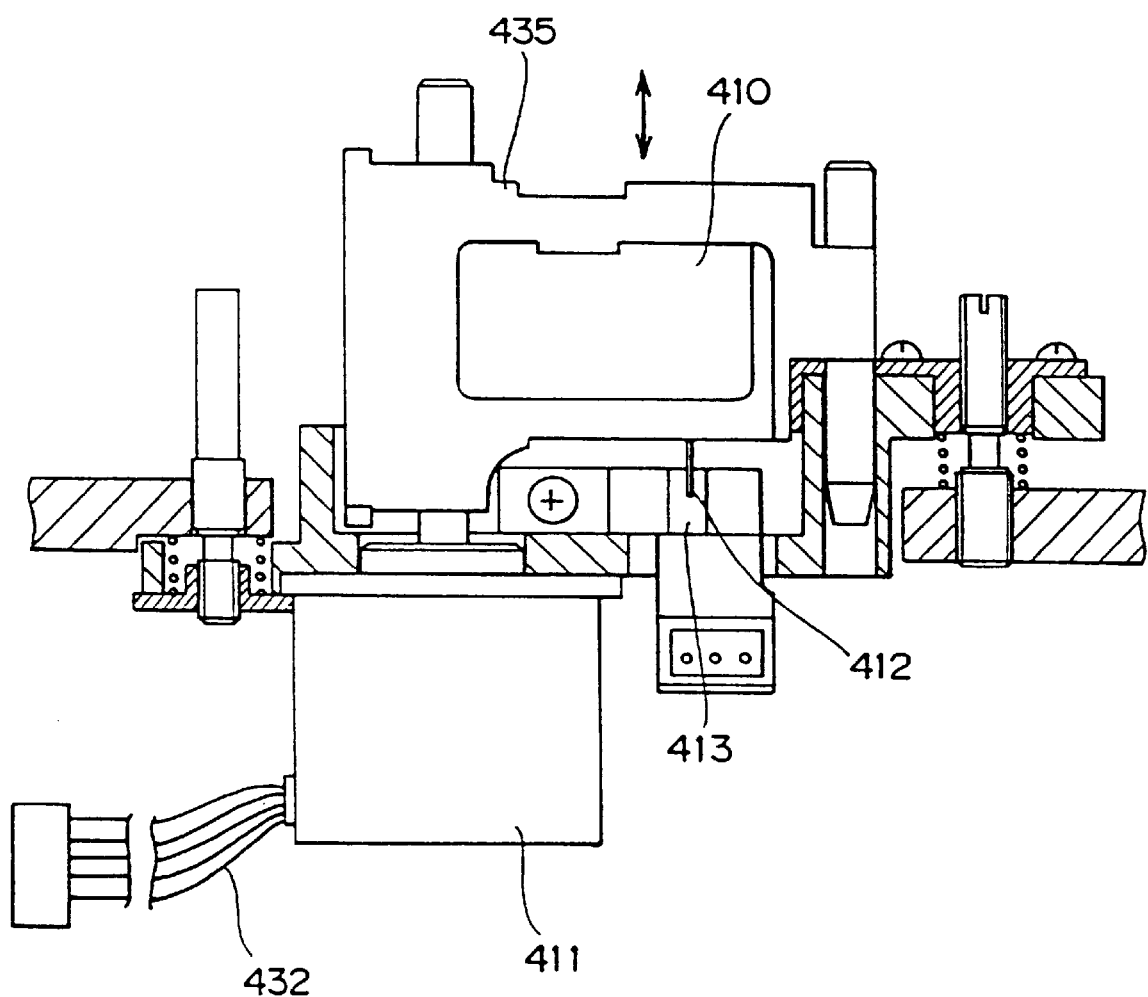
FIG. 45 is a schematic sectional view of a head positioning mechanism of the magnetic tape apparatus shown in FIG. 42.

FIG. 45 shows an exemplary construction of the head positioning mechanism 422 installed in the magnetic tape apparatus. The head positioning mechanism 422 is provided so that the servo circuit 431 drives the stepping motor 411 in accordance with an instruction from the driving microprogram control section 427 to position the read/write head 410 to a target track.

Referring to FIG. 45, the head positioning mechanism 422 includes a carriage 435 which is moved in either of the directions indicated by a double-sided arrow mark by rotation of the stepping motor 411, and the read/write head 410 is secured to the carriage 435. Also a shield plate 412 is secured to the carriage 435 for integral movement therewith. A sensor 413 is provided in the proximity of the shield plate 412 so that it may read setting information of the shield plate 412. The shield plate 412 constitutes the apparatus type setting mechanism and sets, for example, a difference in number of tracks. A plurality of slits 436 (FIG. 46B or 46C) are formed in the shield plate 412 in a spaced relationship from each other by a distance equal to that between tracks, and each time the shield plate 412 moves by a distance equal to that between tracks, the output of the sensor 413 is turned on and off. Meanwhile, the MPU 407 of the driving microprogram control section 427 compares the number of tracks displaced from a reference track and the number of signals outputted from the sensor 413 with each other to determine whether or not the head positioning mechanism 422 is operating normally. In the head positioning mechanism, a pulse signal is transmitted from the servo circuit 431 to the stepping motor 411 so that the carriage 435 is moved by the predetermined distance (for example, 35 $\mu$m) per one pulse in the upward or downward direction. Actually, a suitable number of pulses are supplied to the stepping motor 411 so that the read/write head 410 can be positioned to a predetermined track position.

Figure 46A:
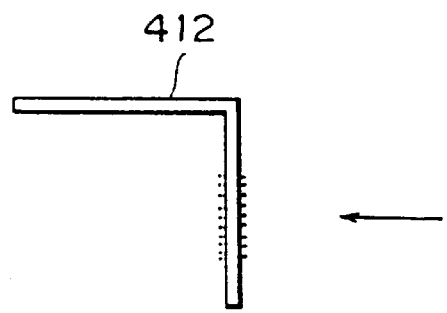
FIGS. 46A to 46D are schematic views of a shield plate and a sensor of the magnetic tape apparatus of FIG. 42.
Figure 46B:
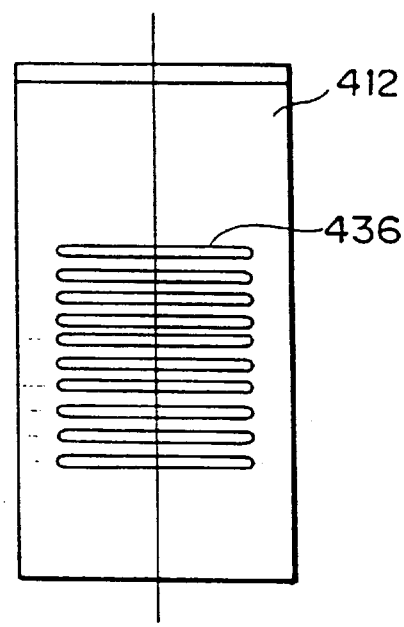
Figure 46C:
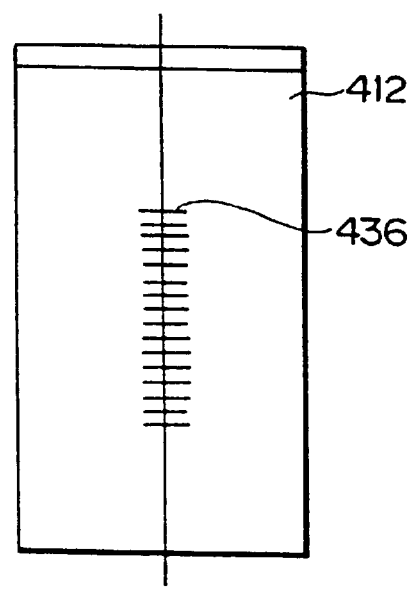
Figure 46D:
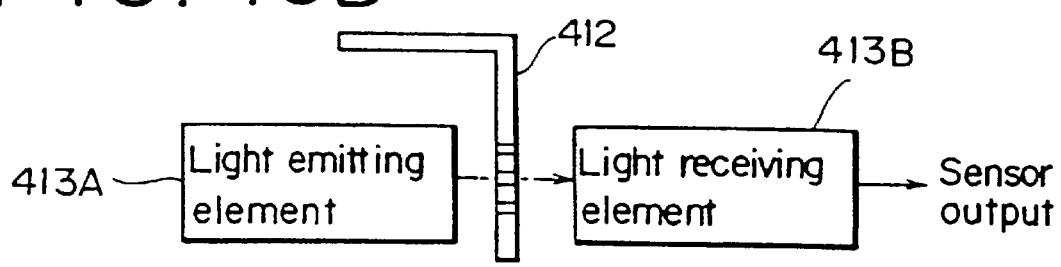

The shield plate 412 and the sensor 413 will be described subsequently with reference to FIGS. 46A to 46D. FIG. 46A is a side elevational view of the shield plate 412; FIG. 46B is a view of the shield plate 412 as viewed in the direction indicated by an arrow mark X in FIG. 46A and showing a set of 10 slits; FIG. 46C is a similar view but showing a set of 16 slits formed in the shield plate 412; and FIG. 46D is a diagrammatic view showing the sensor 413. The shield plate 412 is constituted from a plate in which the slits 436 are perforated as seen from FIG. 46B or 46C. In order to cope with heads, for example, of 20 tracks and 32 tracks, two shield plates having two different sets of slits (10 slits and 16 slits) are used. The slits 436 in the shield plates are formed in pitches equal to actual track pitches of the heads, and either one of the shield plates 412 is securely mounted on the apparatus in accordance with the read/write head 410 employed in the apparatus. When the read/write head 410, for example, for 20 tracks is employed in the apparatus, the 10-slit shield plate 412 is mounted onto the apparatus, but when the other read/write head 410 for 32 tracks is employed in the apparatus, the 16-slit shield plate 412 is mounted onto the apparatus. As an example, in the case of the shield plate 412 of 10 slits, the slit distance is 560 $\mu$m, and the read/write head 410 can be moved by 560 $\mu$m by supplying 16 pulses to the read/write head 410 (560 $\mu$m/35 $\mu$m=16 pulses). Meanwhile, in the case of the shield plate 412 of 16 slits, the slit distance is 350 $\mu$m, and the read/write head 410 can be moved by 350 $\mu$m by supplying 10 pulses to the read/write head 410 (350 $\mu$m/35 $\mu$m=10 pulses). The sensor 413 may be constituted from a photo-sensor which is constituted from a light emitting element (for example, a light emitting diode) 413A and a light receiving element (for example, a photo-transistor) 413B. In the case of the photo-sensor, the light emitting element 413A and the light receiving element 413B are disposed in an opposing relationship to each other with the shield plate 412 interposed therebetween. Since the output signal of the light receiving element 413B exhibits a different level depending upon whether light emitted from the light emitting element 413A passes through a slit 436 of the shield plate 412 and is received by the light receiving element 413B or light emitted from the light emitting element 413A is intercepted by the shield plate 412 and is not received by the light receiving element 413B, the type of the apparatus is detected based on the output signal of the light receiving element. It is to be noted that the output signal of the light receiving element 413B is inputted to the MPU 407 in the driving microprogram control section 427, and the MPU 407 automatically discriminates the type of the apparatus (type of the head) from the signal thus received. The information of the type of the apparatus thus automatically discriminated is stored into the EEPROM 414A. Here, when the number of available apparatus types is, for example, 2, it is only required to store identification information of 1 bit (for example, "0" represents a 20-track head while "1" represents a 32-track head).

Figure 47:
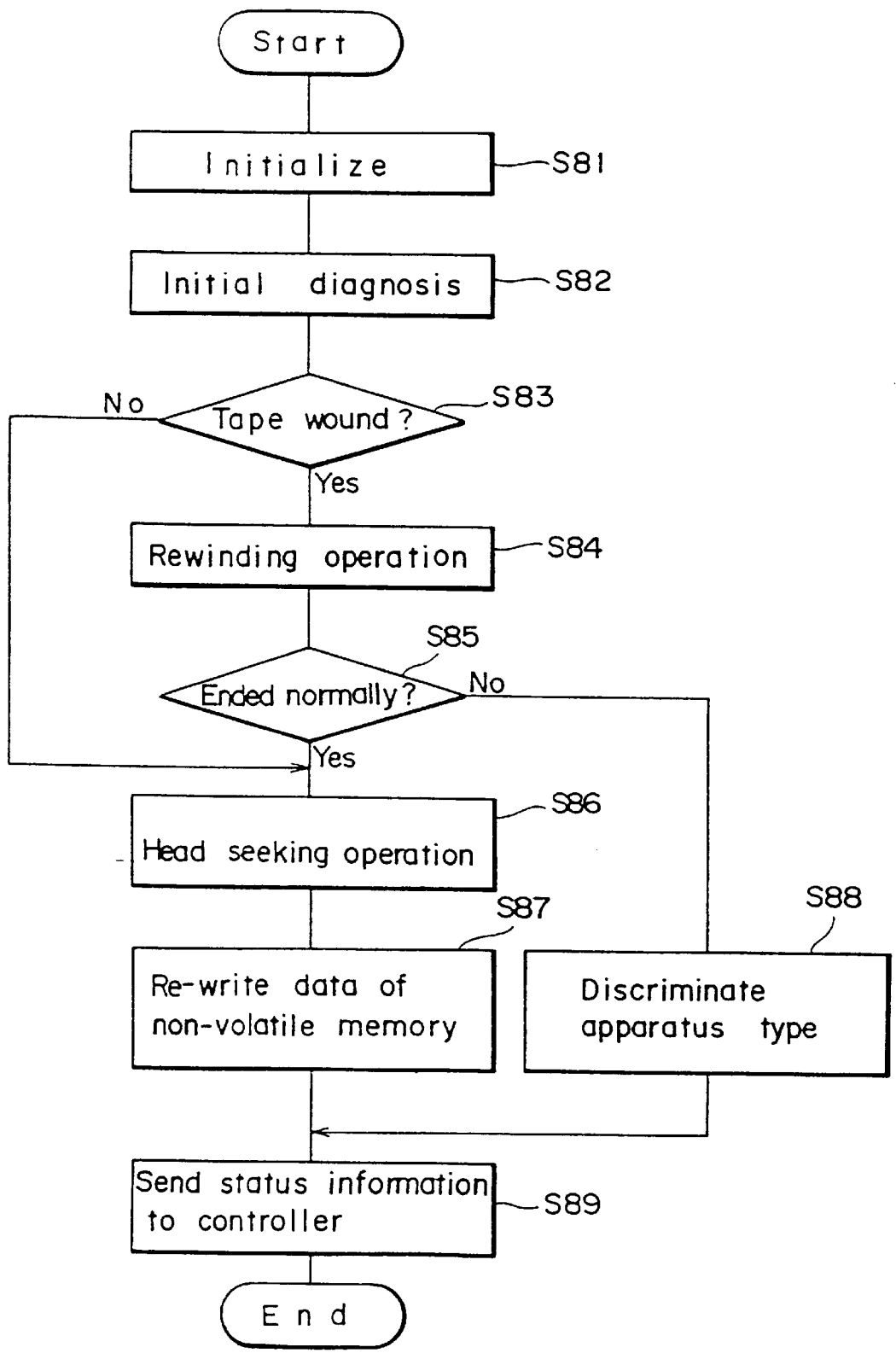
FIGS. 47 and 48 are flow charts illustrating processing of the magnetic tape apparatus of FIG. 42.
Figure 48:
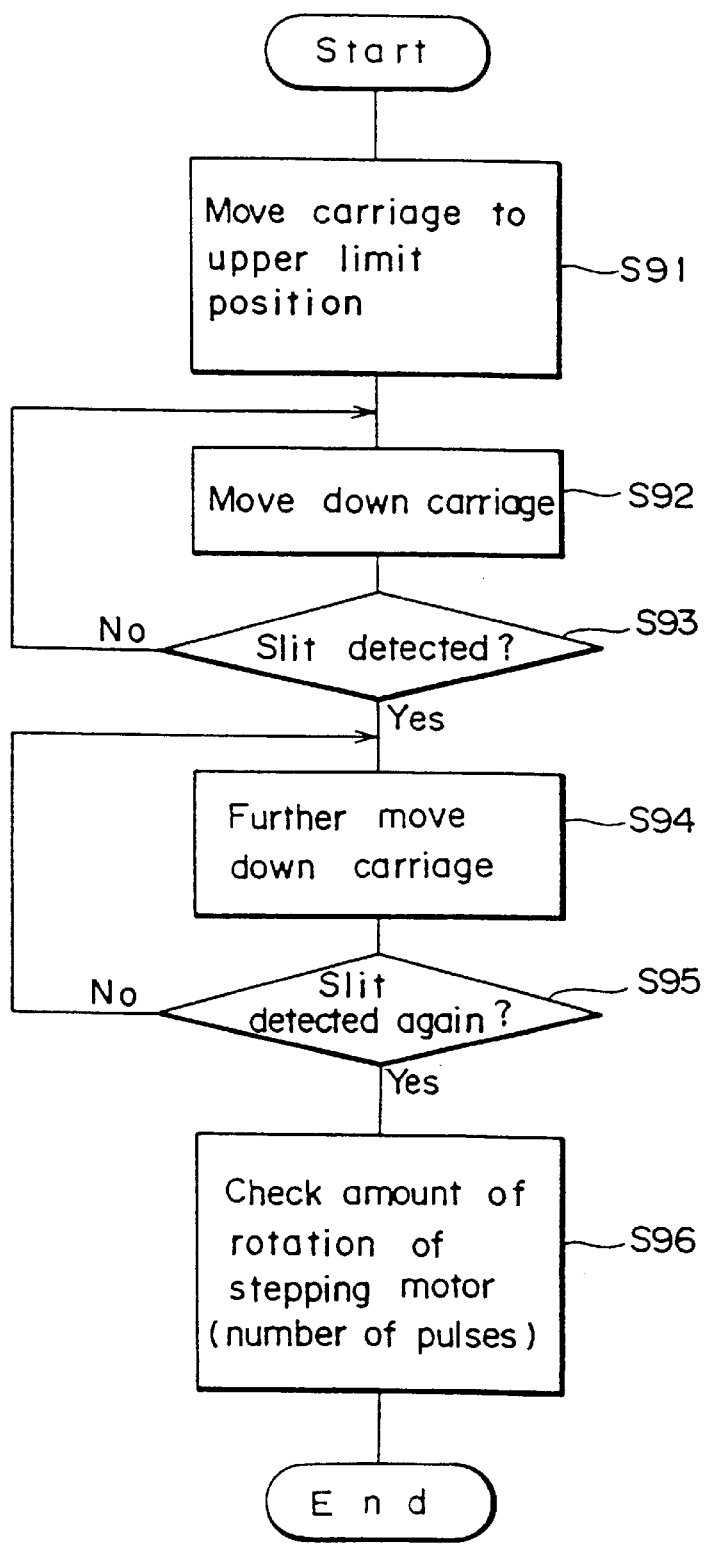

In the following, processing (processing of the MPU 407) in the present embodiment will be described with reference to the processing flow charts of FIGS. 47 and 48. In the present processing, it is assumed that, in startup processing of the apparatus upon turning on of the power, a request for discrimination of the apparatus type is received from the host computer 403. Accordingly, the following processing is described as processing upon startup of the power. When the power of the magnetic tape apparatus 402 is turned on, the MPU 407 executes initialization of the drive circuit and other circuits (step S81) and then executes initialization of the circuit system and the mechanism system (step S82). After completion of such processing, the MPU 407 discriminates whether or not a tape is wound in the apparatus (step S83), and if a tape is wound, then a rewinding operation is performed (step S84). Then, if the rewinding operation is ended normally (step S85), then a seeking operation of the head is performed to execute automatic discrimination of the type of the apparatus (step S86). On the other hand, also when a tape is not wound (step S83), automatic discrimination of the apparatus type is executed similarly. Thereafter, data of the EEPROM 414A are read out and compared with information stored already (information discriminated in the preceding processing cycle), and if there is a difference between them, the contents of the EEPROM 414A are re-written. On the contrary if there is no different between them, no such re-writing operation is performed (step S87). Then, status information including the apparatus type information obtained by the automatic discrimination is delivered to the host controller 403 (step S89). On the other hand, when the tape has not been rewound normally in the processing described above (when the processing is not ended normally) (step S85), data are read out from the EEPROM 414A to execute automatic discrimination of the type of the apparatus (step S88). Then, status information including the apparatus type is delivered to the host controller 403 (step S89). It is to be noted that, when the tape has not been rewound normally as described above, if a seeking operation of the head is performed, then a portion of the tape on which data are recorded may possibly be damaged, and therefore, a seeking operation of the head is not performed. Accordingly, a detection signal is not obtained from the sensor 413, and automatic discrimination of the apparatus type by a head seeking operation is not performed. Therefore, such processing as described above is executed. Processing of the automatic recognizing processing (step S86) of the apparatus type by a head seeking operation described above is executed in the following manner.

The processing involves rotation of the stepping motor 411, discrimination of a distance between the slits 436 from an amount of rotation of the stepping motor 411 and discrimination of the apparatus type from the thus discriminated distance. First, in order to move the carriage 435 to its reference position, the stepping motor 411 is rotated to move the carriage 435 to its uppermost position (step S91). In this instance, the carriage 435 is moved until no slit signal is received any more. Subsequently, the stepping motor 411 is rotated in the direction in which the carriage 435 is moved down (step S92) until a first one of the slits 436 is detected (step S93). Thereafter, the stepping motor 411 is rotated further in the direction in which the carriage 435 is moved down (step S94) until a next slit is detected (step S95). Then, the amount of rotation of the stepping motor 411 (number of pulses) after the detection of the first slit until the detection of the second slit is checked to discriminate the type of the apparatus (step S96). In particular, where the two types of slits described above are involved, since the shield plate 412 has either 10 slits or 16 slits, the type of the apparatus can be automatically discriminated by detecting the amount of rotation of the stepping motor 411 (number of pulses). It is to be noted that, although the processing described above is executed upon turning on of the power of the apparatus, when a request for the type of the apparatus is received from the host controlled 403, for example, during operation of the apparatus, the MPU 407 may read out the apparatus type information from the non-volatile memory 414A to discriminate the apparatus type and report the apparatus type to the host controller 403. This will eliminate processing of seeking of the head or the like.

In addition to the construction described above, the present invention can be embodied in the following manner:

1. The present invention can be applied not only to magnetic tape apparatus but also to other similar apparatus.

2. A magnetic tape apparatus may have a different construction from that of the embodiment described above.

3. The type of an apparatus need not be based on the difference of the head but may be based on the difference of some other mechanism construction.

As described above, according to the embodiment of the present invention, the following advantages can be anticipated:

1. Should it be impossible to execute automatic discriminating processing of the type of an apparatus due to a trouble, the apparatus type can automatically be discriminated from information of the non-volatile memory.

2. Accurate automatic discrimination of the type of an apparatus is always possible, and the apparatus can be reported to the upper controller using the correct information. Accordingly, also the reliability of the apparatus is improved.

Subsequently, an embodiment of the present invention wherein a non-volatile memory is built in an MPU will be described. The embodiment of the present invention relates to an MPU wherein a non-volatile memory built therein is divided into a plurality of sectors into and from each of which data can be written and read out. Further, the present embodiment of the invention relates to an MPU which includes a pair of non-volatile memory sections.

In recent years, even apparatus of the same model are set in different manners for individual users so that the users can individually use the apparatus easily. For example, the model code, the logic addresses or the language to an operator panel of the apparatus may be set differently. In this instance, it is required to discriminate in what settings the apparatus or components (an MPU and so forth) of the apparatus are.

Figure 49:
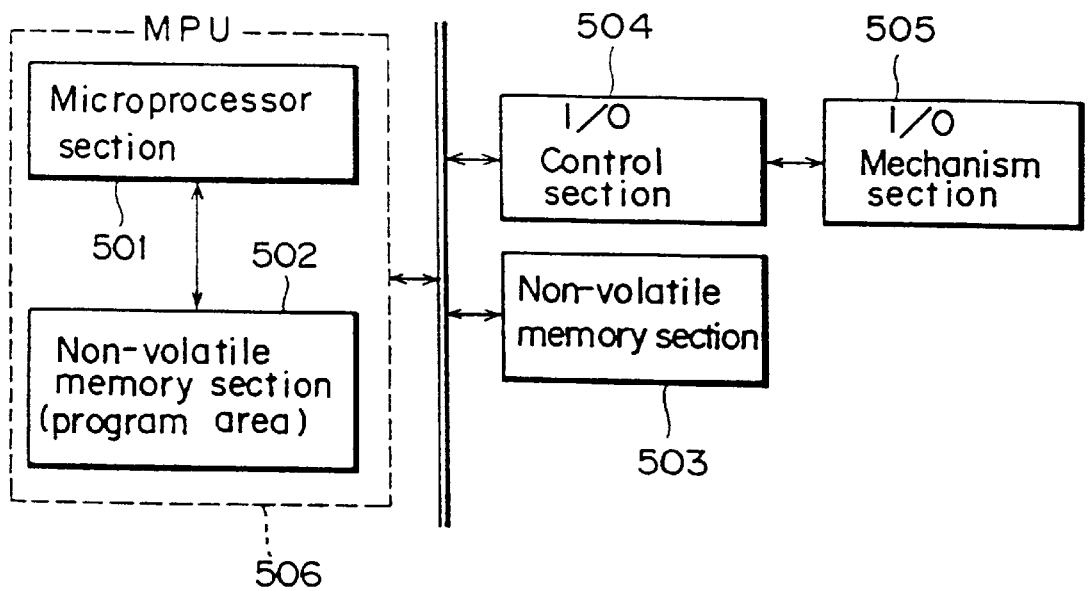
FIG. 49 is a block diagram of a conventional microcomputer.

An exemplary one of conventional microcomputers which are used for such discrimination is shown in FIG. 49. Referring to FIG. 49, reference numeral 501 denotes a microprocessor section, reference numerals 502 and 503 denote each a non-volatile memory section, reference numeral 504 denote an I/O control section, and 505 an I/O mechanism section. The microprocessor section 501 and the non-volatile memory section 502 constitute a one-chip MPU (microprocessor unit).

Since the non-volatile memory section 502 of the conventional microcomputer is not divided into a plurality of sectors in this manner, the non-volatile memory section 503 is required outside the MPU 506 in order to write setting information of the apparatus and some other necessary information into it. Then, micro programs are written in the non-volatile section 502 in the MPU 506. Accordingly, the conventional microcomputer is disadvantageous in that the non-volatile memory section 503 is required outside the MPU 506, which complicates the construction of the microcomputer.

The following embodiments of the present invention are provided in order to achieve reduction in cost, number of parts and overall size.

Figure 50:
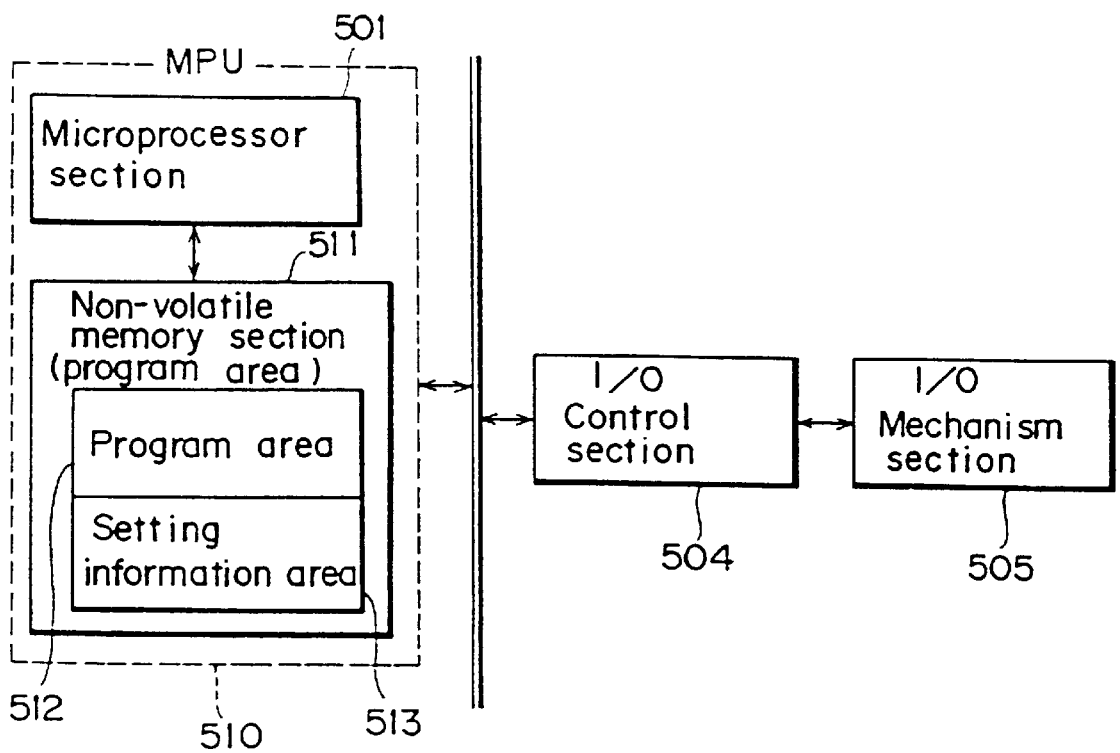
FIGS. 50 and 51 are block diagrams of microcomputers according to the present invention.

FIG. 50 is a block diagram of a microcomputer to which the present invention is applied. Referring to FIG. 50, the microcomputer shown is common in structure to that of FIG. 49 in that an MPU 510 thereof has a microprocessor section 501 and a non-volatile memory section 511 built therein, but is characterized, comparing with the construction of FIG. 49, in that the non-volatile memory section 511 is divided into a program area 512 and a setting information area 513.

Figure 51:
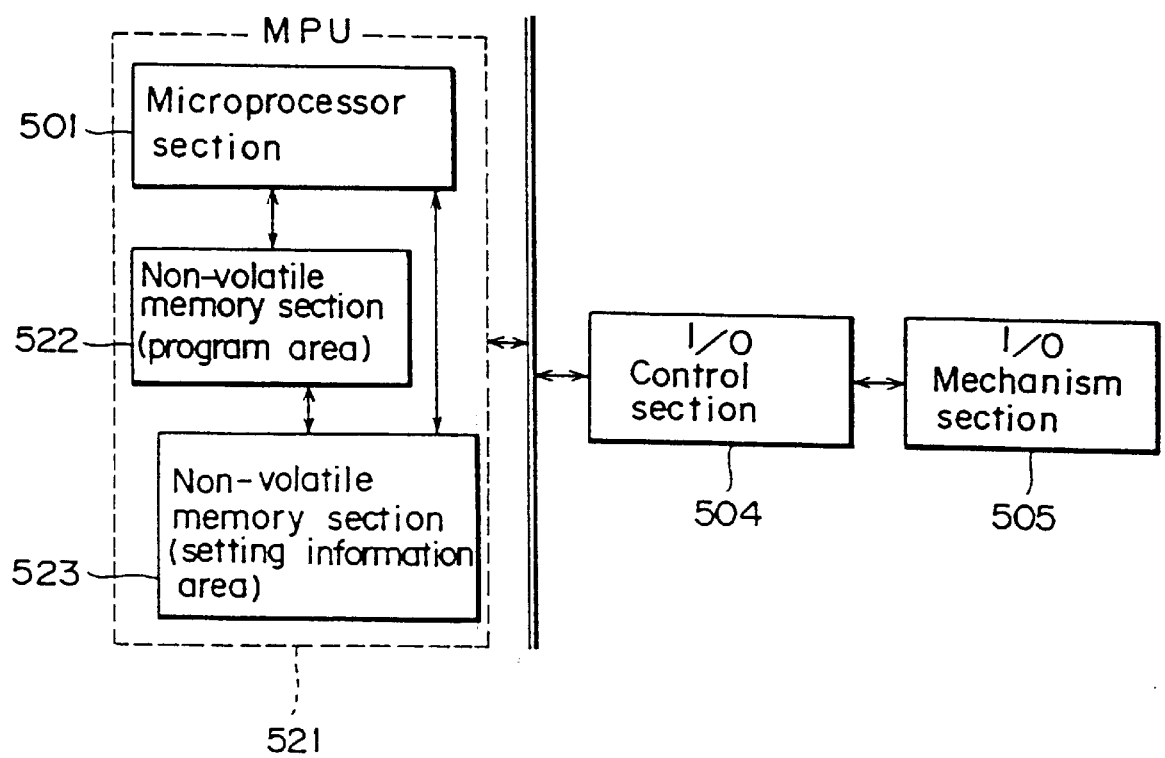

FIG. 51 is a block diagram of another microcomputer to which the present invention is applied. Referring to FIG. 51, the microcomputer shown has built therein a microprocessor section 501, a first non-volatile memory section 522 in which a program area is set, and a second non-volatile memory section 523 in which a setting information area is set.

According to the constructions of FIGS. 50 and 51, no non-volatile memory section is required outside the MPU 521, and accordingly, reduction in cost, number of parts and overall size can be achieved.

The non-volatile memory section is, for example, a flash memory. A flash memory has a single transistor cell structure and includes a single power source. The inside of the flash memory is divided into 8 sectors of 16 Kbytes, and short programming/re-programming of a sector can be performed for an arbitrarily selected one of the first to seventh sectors, but also batch erasure for all sectors is possible. If such flash memory is used, then it is possible for the non-volatile memory section to have a program area and a setting information area. Further, when necessary, micro programs can be read out from the program area and setting information can be read out from or written into the setting information area by the microprocessor section.

While specific embodiments of the present invention have been described in the foregoing description, the present invention is not limited to details of the embodiments. The spirit and scope of the present invention is defined in the appended claims, and all alterations and modifications which belong to the scope of equivalency of the claims shall be included in the scope of the present invention.

What is claimed is:

1. A library apparatus having a motor driving control circuit, said motor driving control circuit comprising:

a processor for executing various controls for driving of a motor;

a motor driver circuit for receiving a supply of power from a DC power source and driving said motor in response to an instruction of said processor;

a relay for opening or closing a power source circuit of said motor driver circuit;

a motor abnormal condition detection circuit connected to said motor driver circuit for detecting an abnormal condition of at least one of said motor and said motor driver circuit and outputting a motor abnormal condition detection signal;

a current control circuit including a current limiting resistor connected between said relay and said motor driver circuit, said current limiting resistor being used to control the current to flow through said motor driver circuit in response to the motor abnormal condition detection signal;

an excess current detection circuit connected to said current control circuit for detecting that the current flowing through said motor driver circuit is increased to an excess current and outputting an excess current detection signal; and an abnormal current monitor circuit for monitoring the motor abnormal condition detection signal, the excess current detection signal and a control signal from said processor, and controlling control the opening/closing operation of said relay.

2. A library apparatus according to claim 1, wherein said motor driver circuit includes a motor abnormal condition detecting resistor connected in parallel to said motor, and said motor abnormal condition detection circuit includes conversion means for converting a voltage produced with said motor abnormal condition detecting resistor into another corresponding voltage value, and comparison means for comparing the voltage obtained from said conversion means with a preset reference value and outputting the motor abnormal condition detection signal.

3. A library apparatus according to claim 1, wherein said current control circuit includes a pair of switching elements which are connected in parallel to each other and controlled by the motor abnormal condition detection signal so that one of said switching elements presents an on-state while the other switching element presents an off-state, and said current control circuit further includes an excess current detecting resistor and a current controlling resistor connected in series to one of said switching elements, said current detecting resistor detecting an excess current which may flow through the circuitry, said current controlling resistor controlling the current to flow through said motor driver circuit.

4. A library apparatus circuit according to claim 1, wherein said current control circuit is changed over, when an abnormal condition of at least one of said motor and said motor driver circuit is detected by said motor abnormal condition detection circuit, into a current control mode without interrupting the current flowing through said motor driver circuit in response to the motor abnormal condition detection signal so that the current to flow through said motor driver circuit is attenuated.

5. A library apparatus according to claim 1, wherein said abnormal current monitor circuit turns off, when it detects the motor abnormal condition detection signal and the excess current detection signal at a time while said motor is being driven by said motor driver circuit, said relay to interrupt the current to flow through said motor driver circuit.

* * * * *

UNITED STATES PATENT AND TRADEMARK OFFICE
CERTIFICATE OF CORRECTION

PATENT NO.  : 5,982,120
DATED       : November 9, 1999
INVENTOR(S) : Akiyama et al.

It is certified that error appears in the above-indentified patent and that said Letters Patent is hereby corrected as shown below:

On the title page, item
(30) Foreign Application Priority Data

| May 12, 1992  | (JP) Japan | 4-118793/92 |
| May 21, 1992  | (JP) Japan | 4-128813/92 |
| Feb. 26, 1993 | (JP) Japan | 5-37863/93  |
| Mar. 1, 1993  | (JP) Japan | 5-39747/93  |
| Mar. 15, 1993 | (JP) Japan | 5-53535/93  |

Signed and Sealed this

Nineteenth Day of December, 2000

Attest:

Q. TODD DICKINSON

*Attesting Officer*       *Commissioner of Patents and Trademarks*